(12) United States Patent
Harris, Jr. et al.

(10) Patent No.: US 6,481,379 B1
(45) Date of Patent: Nov. 19, 2002

(54) METHODS FOR RAISING PRE-ADULT ANADROMOUS FISH

(75) Inventors: H. William Harris, Jr., Portland, ME (US); David R. Russell, Alfred, ME (US); Jacqueline Nearing, N. Yarmouth, ME (US); Marlies Betka, Portland, ME (US)

(73) Assignee: MariCal, LLC, Portland, ME (US)

( * ) Notice: Subject to any disclaimer, the term of this patent is extended or adjusted under 35 U.S.C. 154(b) by 9 days.

(21) Appl. No.: 09/687,372

(22) Filed: Oct. 12, 2000

(51) Int. Cl.[7] .............................................. A01K 61/00
(52) U.S. Cl. ..................... 119/230; 119/214; 119/231
(58) Field of Search ................................ 119/230, 231, 119/215; 426/2

(56) References Cited

U.S. PATENT DOCUMENTS

| | | | |
|---|---|---|---|
| 377,709 A | * 2/1888 | Anderson et al. | 24/183 |
| 3,406,662 A | * 10/1968 | Vik et al. | 119/217 |
| 3,777,709 A | 12/1973 | Anderson et al. | |
| 4,703,008 A | 10/1987 | Lin | 435/240.2 |
| 5,128,153 A | * 7/1992 | Axelrod | 119/230 |
| 5,351,651 A | 10/1994 | Ushio et al. | 119/231 |
| 5,688,938 A | 11/1997 | Brown et al. | 536/23.5 |
| 5,763,569 A | 6/1998 | Brown et al. | 530/324 |
| 5,858,684 A | 1/1999 | Nemeth et al. | 435/7.2 |
| 5,962,314 A | 10/1999 | Brown et al. | 435/320 |
| 5,981,599 A | 11/1999 | Moe et al. | 514/654 |
| 6,001,884 A | 12/1999 | Nemeth et al. | 514/699 |
| 6,016,770 A | * 1/2000 | Fisher | 119/215 |

FOREIGN PATENT DOCUMENTS

| | | |
|---|---|---|
| EP | 0801904 A1 | 4/1997 |
| WO | WO 97/35977 | 3/1997 |
| WO | WO 97/35977 | 10/1997 |
| WO | WO 98/15627 | 4/1998 |
| WO | WO 00/64274 | 4/1999 |

OTHER PUBLICATIONS

Japan Economic Newswire, New 'water' allows freshwater, saltwater fish to coexist, Kyoto News Service (Aug. 1994).*

Nearing, J, et al., "Cloning and expression of a homologue of the calcium (Ca2+)/polyvalent cation receptor (CaR) protein that acts as a magnesium (Mg2+) sensor in dogfish shark (*Squallus acanthias*) kidney." *Journal of The American Society of Nephrology*, 8: 40A. (From ASN Program and Abstracts, 1997, Abstract No. A0194) (1997).

Sands, J. M., et al., "An extracellular calcium polyvalent cations–sensing receptor (CaR) localized to endosomes containing aquaporin 2 water channels modulates vasopressin–elicited water permeabiity in rat kidney inner medullary collecting duct," *J Clinical Investigation* 99:1399–1405 (1997).

Ward, D. T., et al., "Disulfide–bonds in the Extracellular Calcium–polyvalent Cation Sensing Receptor Mediate Dimer Formation and its Response to Divalent Cations in Vitro," *J. Biol. Chem.* 273:14476–14483 (1998).

(List continued on next page.)

Primary Examiner—Robert P. Swiatek
Assistant Examiner—Floris C Copier
(74) Attorney, Agent, or Firm—Hamilton, Brook, Smith & Reynolds, P.C.

(57) ABSTRACT

The invention relates to methods, compositions and kits for improving the raising of pre-adult anadromous fish, or preparing pre-adult anadromous fish for transfer to seawater. The methods involve adding PVCR modulators (e.g., calcium and/or magnesium) to the freshwater in an amount sufficient to increase expression and/or sensitivity of at least one PVCR; and adding feed for fish consumption to the freshwater, wherein the feed contains an amount of NaCl sufficient to contribute to a significantly increased level of the PVCR modulator in serum of the pre-adult anadromous fish.

39 Claims, 25 Drawing Sheets

FRESHWATER

H₂O

NO DRINKING

SALT UPTAKE

DILUTE URINE WITH MINIMAL Na⁺, Ca²⁺ AND Mg²⁺ SALTS

SEAWATER

H₂O

DRINKING

SOLUTE-RICH URINE WITH CONCENTRATED Na⁺, Ca²⁺ AND Mg²⁺ SALTS

NaCl EXCRETION

OTHER PUBLICATIONS

Riccardi, D., et al., "Cloning and Functional Expression of a Rat Kidney Extracellular Calcium/Polyvalent CationSensing Receptor," *Proc. Natl. Acad. Sci. USA* 92:131–135 (1995).

Zaugg, W.S., et al., "Increased Seawater Survival And Contribution To The Fishery of Chinook Salmon (*Oncorhynchus Tshawytscha*) By Supplemental Dietary Salt," *Aquaculture,* 32:183–188 (1983).

Shaw, H.M., et al., "Effect of Dietary Sodium Chloride on Growth of Atlantic Salmon (*Salmo salar*)," *J. Fish. Res. Board Can.,* 32(10) 1813–1819 (1975).

MacLeod, M.G., "Relationships Between Dietary Sodium Chloride, Food Intake and Food Conversion in the Rainbow Trout," *J. Fish Biol.,* 13: 73–78 (1978).

Stickney, R. R., "Nonconservative Aspects of Water Quality; Conservative Aspects of Water Quality and Physical Aspects of the Culture Environment; and Feed, Nutrition, and Growth. (Chapters 4, 5, 6." Principles of Aquaculture, (John Wiley & Sons, Inc.), pp. 146–351 (1994).

Folmar, Leroy C. and Dickhoff, Walton W., "The Parr–Smolt Transformation (Smoltification) And Seawater Adaptation In Salmonids," *Aquaculture,* 21: 1–37 (1980).

Williams, S., et al., "A comparison of underyearling growth and smoltification between hatchery reared Maine landlocked Atlantic salmon, *Salmo salar,* and a commercially available strain of Norwegian *Salmo salar.*" *World Aquaculture Association Book of Abstracts,* p. 584(1998).

Brown, E.M., et al., "A comparsion of the effects of divalent and trivalent cations on parathyroid hormones release," *Endocrinol.,* 127:1064–1071 (1990).

Ward, P.T. et al., "Disulfide Bonds in the Extracellular Calcium–polyvalent Cation–sensing Receptor Correlate with Dimer Formation and its Response to Divalent Cations in Vitro," *Am Soc. Biochem. Mol. Bio.,* 272:23; 14478–14483 (1998).

Forsberg, James A., et al., "Survival and Growth of Red Drum *Sciaenops ocellatus* in Saline Groundwaters of West Texas, USA," *Journal of the World Aquaculture Society,* 27(4): 462–474 (1996).

Garrett, J.E., et al., "Molecular Cloning and Functional Expression of Human Parathyroid Calcium Receptor cDNAs," *The Journal of Biological Chemistry,* 270(21) :12919–12925 (1995).

Brown, E.M., et al., "Cloning and Characterization of an Extracellular $Ca^{2+}$–Sensing Receptor from Bovine Parathyroid," *Nature,* 366:575–580 (1993).

Grau, E.G., et al., "Lunar phasing of the thryoxin surge preparatory to seaward migration of salmonid fish," *Science* 211(4482): 607–609 (1981).

Hedemann, L., et al., "The Familial Magnesium–losing Kidney," *Acta Med Scand* 219(1):133–6 (1986).

Young, B., et al., "Smoltification and seawater adaptation in coho salmon (*Oncorhynchus kisutsch*): plasma prolactin, growth hormone thryoid hormones and coritsol," *Gen. Comp. Endocrinology,* 74: 335–345 (1989).

Zaugg, W.S., et al., "Changes in Gill adenosine–triphosphatase activity associated with parr–smolt transformation in stellhead trout, coho and spring chinook salmon,"*J.. Fish. Res. Bd. Can.,* 29(2): 167–171 (1972).

Holmes, W. N., et al., "The Body Compartments and the Distribution of Electrolytes," *Fish Physiology,* 1: 1–88 (1969).

Clarke, W.C., et al., "A seawater challenge test to measure smolting in juvenile salmon." *Fisheries and Marine Service Research Dir. Tech. Report* 705, Ottawa (1977).

Preston, Gregory M., "Polymerase Chain Reaction with Degenerate Oligonucleotide Primers to Clone Gene Family Members," *In Methods in Molecular Biology, vol. 58: Basic DNA and RNA Protocols,* A. Harwood, eds. (NJ: Humana Press Inc.) Chapter 36,pp. 303–312 (1993).

Usher, M.L., et al., "Intestinal Water Transport in Juvenile Atlantic Salmon (*Salmo salar L.*) During Smolting and Following Transfer to Seawater," *Comp. Biochem. Physiol.,* 100A(4): 813–818 (1991).

Salman, N.A., and Eddy, F.B., "Kidney Function in Response to Salt Feeding in Rainbow Trout (*Salmo Gairdneri Richardson*)," *Comp. Biochem. Physiol.,* 89A (4):535–539 (1988).

Nilssen, K.J., et al., "Summer osmoregulatory capacity of the world's northermost living salmonid," *Am. J. Physiol.,* 272: R743–R749 (1997).

Siner, J., "Cloning of an Aquaporin Homologue Present in Water Channel Containing Endosomes of Toad Urinary Bladder," *Am. J. Physiol.* 270:C372–C381 (1996).

Targovnik, J.H., et al., "Regulation of Parathyroid Hormone Secretion in Vitro: Quantitative Aspects of Calcium and Magnesium Ion Control," *Endocrinology* 88:1477–1482 (1971).

Taufield, P.A., et al., "Hypocalciuria in Preeclampsia," *N Engl J Med* 316(12):715–718 (1987).

Yamagami, K., et al., "Molecular and Cellular Basis of Formation, Hardening, and Breakdown of the Egg Envelope in Fish," *International Review of Cytology,* 136:51–92 (1992).

Spellman, P.T., et al., "Comprehensive Identification of Cell Cycle–regulated Genes of the Yeast *Saccharomyces cerevisiae* by Microarray Hybridization," *Molecular Biology of the Cell,* 9: 3273–3297 (1998).

Smith, L.C., "Anatomy and Special Physiology of Salmonids." *In Fish Medicine,* M.K. Stopkopf, eds. (WB Saunders), Chapter 31: 321–327 (1993).

Guo, L., et al., "extracellular $Ca^{2+}$Increases Cytosolic Free $Ca^{2+}$in Freshly Isolated Rat Odontoblasts," *J. Bone Miner Res.,* 14:1357–1366 (1999).

Zadunaisky, J.A., et al., "Osmolarity and Cell Volume Changes of Chloride Cells: The Nature of the Rapid Signal for Adaptation to Salinities of *Fundulus Heteroclitus,"* *Bull. MDI Biol. Lab.,* 32:152–156 (1992).

Cole, et al., "Isolation and Characterization of Pleurociden, an Antimicrobial Peptide in the Skin Secretions of Winter Flounder," *J. Biol. Chem.* 272:12008–12013 (1997).

Forster, R. P., et al., "Formation of excretory products," Chapter 5 of Fish Physiology, Academic Press, New York, NY, pp. 313–345 (1969).

Elger, E.B. et al., "Adaption of renal function to hypotonic medium in winter flounder," *J. Comp. Physio.* B157:21–30 (1987).

Bai, M., et al., "Expression and characterization of inactivating and activating mutations in human $Ca^{2+}$Sensing Receptor," *J. Biol. Chem.,* 32:19537–19545 (1996).

Evans, D.H., "Osmotic and Ionic Regulation," Chapter 11 in *The Physiology of Fishes,* (CRC Press, Boca Raton, FL) pp. 315–341 (1993).

Prunet, P., et al., "Effects of growth hormone on gill chloride cells in juvenile Atlantic salmon (*Salmo salar*)," *Am. J. Physiol.,* 266: R850–R857 (1994).

Naito, T. et al., "Putative pheromone receptors related to the $Ca^{2+}$-sensing receptor in *Fugu*," *Proc. Natl. Acad. Sci.*, 95:5178–5181 (Apr. 1998).

Hew, C.L., Antifreeze Protein Gene Transfer in Atlantic Salmon, *Molecular Marine Biology and Biotech.*, 1(4/5): 309–317 (1992).

Ryba, N.J., et al., "A New Multigene Family of Putative Pheromone Receptors," *Neuron*, 19(2):371–379 (1997).

Yamaguchi, Toru, et al., "G Protein–Coupled Extracellular $Ca^{2+}(Ca^{2+}_o)$–Sensing Receptor (CaR) : Roles in Cell Signaling and Control of Diverse Cellular Functions." In *Advances in Pharmacology,Hormones and Signaling*, Bert w. O'Malley, et al., eds. (Academic Press) 48: 209–253 (2000).

Zaidi, M., et al., "Emerging insights into the role of calcium ions in osteoclast regulation," *J. Bone Miner Res.*, 14: 669–674 (1999).

Mykles, Donald L., "Proteolytic Processes Underlying Molt–Induced Claw Muscle Atrophy in Decapod Crustaceans." *Amer. Zool.*, 39: 541–551 (1999).

Borgatti, A.R., et al., "Gill (NA+K+) ATPase involvement and regulation during salmonid adaptation to salt water," *Comp. Biochem. Physiol.* 102: 637–643 (1992).

Frenkel, Y., et al., "Hypocalciuria of Preeclampsia Is Independent of Parathyroid Hormone Level," *Obstetrics & Gynecology*, 77(5):689–691 (1991).

Kawamura, T., and Yamashira, S., "Chemical Sensitivity of Lateral Line Organs in the Goby. Gobus Giurinus," *Comp. Biochem., Physiol.*, 72A: 253–257 (1981).

Fauci, A.S., et al., "Cardinal Manifestations and Presentation of Diseases," *Principles of Internal Medicine*, 14th Edition:p. 260 (1998).

Stahl, Christopher J., et al., "Optimization of Dissolved Solids for the Intensive Culture of Juvenile Red Drum *Sciaenops ocellatus*," *Journal Of the World Aquaculture Society*, 26(3): 323–326 (1995).

Forsberg, James A., and Neill, William H., "Saline Groundwater As An Aquaculture Medium: Physiological Studies On The Red Drum, *Sciaenops ocellatus*," *Environmental Biology of Fishes.*, 49: 119–128 (1997).

Xu, B., et al., "Osmoregulatory Actions of Growth Hormone In Juvenile Tilapia (*Oreochromis niloticus*)," *Fish Physiology and Biochemistry*, 17: 295–301 (1997).

Rydevik, Magnus, et al., "Plasma Growth Hormone Levels Increase During Seawater Exposure of Sexually Mature Atlantic Salmon Parr (*Salmo salar L.*)," *General and Comparative Endocrinology*, 80: 9–15 (1990).

Walton, M. J., et al., "The effects of dietary tryptophan levels on growth and metabolism of rainbow trout (*Salmo gairdneri*)," *The British Journal of Nutrition* 51:279–287(1984).

Veldhuis, J. D., et al., "Divergent Influences of Calcium Ions on Releasing Factor–Stimulated Anterior Pituitary Hormone Secretion in Normal Man," *Journal of Clinical Endocrinology and Metabolism*, 59(1): 56–61. (1984).

Gamba, G., et al., Primary Structure and Functional Expression of a cDNA Encoding the Thiazide–Sensitive, Electroneutral Sodium–Chloride Cotransporter, *Proc. Natl. Acad. Sci.* 90:2749–2753 (1993).

Gardner, W.D., et al., "Genitourinary System." In *Structure of the Human Body*,(W.B. Saunders Company) pp. 365–366 (1967).

El–Mowafi, A.F.A., et al., "Magnesium requirement of Atlantic salmon (*Salmo salar L.*) Parr in seawater–treated fresh water," *Aquaculture Nutrition*, 4(1) 31–38(1998).

Conigrave, A.D., et al., "L–Amino acid sensing by the extracellular $Ca^{2+}$–sensing receptor." *Proc Natl Acad Sci*, 97(9) 4419–4819 (2000).

Ogino, Chinkichi, and Chiou, Jiing Y., "Mineral Requirements in Fish–II Magnesium Requirement of Carp," *Bulletin of the Japanese Society of Scientific Fisheries*, 42(1): 71–75 (1976).

Raloff, J., "Downtown Fisheries? Advances May Make Fish Farming a Healthy Prospect, Even For Inner Cities," *Science News*, 157(20): 314–316 (2000).

Folmar, L.C. et al., "Evaluation of some physiological parameters as predictive indices of smoltification," *Aquaculture* 23:309–324 (1981).

Alberts, B., et al., "Cell Junctions, Cell Adhesion, and the Extracellular Matrix." In *Molecular Biology of The Cell*, 3rd ed., (Garland Publishing), pp. 950–954 (1994).

Baum, M. A., et al., "Recent Insights Into the Coordinate Regulation of Body Water and Divalent mineral Ion Metabolism," *The American Journal of the Medical Sciences.*, 316(5) : 321–328 (1998).

Brown, E. M., et al., "Neomycin Mimics the Effects of High Extracellular Calcium Concentrations on Parathyroid Function in Dispersed Bovine Parathyroid Cells," *Endocrinology*, 128(6):3047–3054 (1991).

Wendelaar Bonga, S., et al., "The Stress Response in Fish," *Physiological Reviews*, 77(3): 591–625 (1997).

Elger, B., et al., "Effect of adrenergic blockage with bretylium and phentolamine on glomerular filtration rate in the rainbow trout, *Salmo gairdneri* Rich., adapting to saline water," *J. Biochem. Physiol., C.* 75: 253–258 (1983).

Chen, T. T., et al., "Transgenic fish," *Trends in Biotechnology*, 8: 209–215 (1990).

Chattopadhyay, N., et al., "Calcium–sensing receptor in the rat hippocampus: a developmental study," *Developmental Brain Research*, 100 pp. 13–21 (1997).

Marshall, W.S., "On the involvement of mucous secretion in teleost osmoregulation," *Can. J. Zool.*, 56: 1088–1091 (1978).

Dabrowska, H., et al., "Magnesium status in freshwater fish, common carp (*Cyprinus carpio, L.*) And the dietary protein––magnesium interaction," *Fish Physiology and Biochemistry*, 9(2) 165–172 (1991).

Fuleihan, G. E., et al., "Calcium Modulation of Adrenocorticotropin Levels in Women–A Clinical Research Center Study," *The Journal of Clinical Endocrinology & Metabolism*, 81(3): 932–936 (1996).

Darnell, J., et al., "The Plasma Membrane," Chapter 13 in *Molecular Cell Biology*, 516–520 (1990).

Davenport, J., "Synopsis of Biological Data on the Lumpsucker," *Food and Agriculture Organization of the United Nations*, Synopsis No. 147 pp. 1–19 (1985).

Hocking, P.J., "Effects of Sodium and Potassium Chlorides on the Growth and Accumulation of Mineral Ions by *Cyperus Involucratus* Rottb," *Aquatic Botany*, 21: 201–217 (1985).

Howells, G.D., et al., "Effects of Acidity, Calcium, and Aluminium on fish Survival and Productivity–A Review," *J. Sci. food Agric.* 34: 559–570 (1983).

Köhl, K.I., "The effect of NaCl on growth, dry matter allocation and ion uptake in salt marsh and inland populations of *Armeria maritima*," *The New Phytologist*, 135:213–225 (1997).

Looby, D., et al., "Immobilization of animal cells in porous carrier culture," *Trends in Biotechnology*, 8(8): 204–209 (1990).

Lee, Sang–Min, et al., "Influence of P, Ca, Zn, Mg, Fe, K, Mn, or Se in the Dietary Mineral Premix on Growth and Body Composition of Korean Rockfish (*Sebastes schlegeli*)," *J. Korean Fish Society*, Abstract in English, 31(2): 245–251 (1998).

Leatherland, J.F., et al., "Effect of Dietary Mirex and PCBs On Calcium and Magnesium Metabolism in Rainbow Trout, . . . ," *Comparative Biochemistry and Physiology*, 69C: 345–351 (1981).

Weatherley, A.H., et al., "Growth." *In Physiological Ecology of Pacific Salmon*, Groot, C. et al., eds. (UBC Press/Vancouver), pp. 103–158 (1995).

Mount, D.R., et al., "Effect of Long–Term Exposure to Acid, Aluminum, and Low Calsium on Adult Brook Trout (*Salvelinus fontinalis*). 2. Vitellogenesis and Osmoregulation," *Canadian Journal of Fisheries and Aquatic Sciences*, 45(9):1633–1642 (1988).

Naito, T., et al., "Putative pheromone receptors related to the $Ca^{2+}$–sensing receptor in *Fugu*," *Proc. natl. Acad. Sci.*, 95: 5178–5181 (1998).

Norris, D.O., "Endocrine Regulation of Iono–Osmotic Balance in Teleosts," Chapter 16 in *Vertebrate Endocrinology*, Lea and Fabiger, eds. (Philadelphia, PA) pp. 425–443 (1985).

Nemeth, E.F., et al., "Calcimimetics with potent and selective activity on the parathyroid calcium receptor," *Proc. Natl. Acad. Sci.*, 95: 4040–4045 (1998).

Evans, G.H., et al., "Association of Magnesium Deficiency with the Blood Pressure–Lowering Effects of Calcium," *Journal of Hypertension*, 8(4):327–337 (1990).

Parry, G., "Size and Osmoregulation in Salmonid Fishes," *Nature*, 181(4617): 1218–1219 (1958).

Quinn, S. J. , et al., "The $Ca^{2+}$–sensing receptor: a target for polyamines," *American Journal of Physiology*, 273(4): C1315–C1323 (1997).

Renfro, J. L., et al., "Water and ion transport by the urinary bladder of the teleost *Pseudopleuronectes americanus*," *American Journal of Physiology*, 228(1): 52–61 (1995).

Veillette, P.A., et al., "Cortisol Mediates the Increase in Intestinal Fluid Absorption in Atlantic Salmon During Parr–Smolt Transformation," *General and Comparative Endocrinology*, 97: 250–258 (1995).

Rogers, K.V., et al., "Localization of calcium receptor mRNA in the adult rat central nervous system by in situ hybridization," *Brain Research* , 744(1): 47–56 (1997).

Ruat, M., et al., "Calcium sensing receptor: Molecular cloning in rat and localization to nerve terminals," *Proc. Natl. Acad. Sci.*, (92) : 3161–3165 (1995).

Anast, C.S., et al., "Evidence for Parathyroid Failure in Magnesium Deficiency," *Science*, 177: 606–608 (1972).

Satoh, S., et al., "Effects on Growth and Mineral Composition of Carp of Deletion of Trace elements or Magnesium from Fish Meal Diet," *Bulletin of the Japanese Society of Scientific Fisheries*, 49(3): 431–435 (1983).

Shehadeh, Z.H., et al., "The Role of the Intestine in Salinity Adaptation of the Rainbow Trout, *Salmo Gairdneri*," *Comp. Biochem. Physiol.*, 30: 397–418 (1969.).

Simpson, J.B., et al., "Subfornical organ lesions reduce intravenous angiotensin–induced drinking," *Brain Research*, 88: 154–161 (1975).

Siner, J., et al., "Cloning of an aquaporin homologue present in water channel containing endosomes of toad urinary bladder," *Am. J. Physiol.*, 270 (*Cell Physiol. 39*): C372–C381 (1996).

Stradmeyer, L., "Smolts—Is feeding 'non–starters' a waste of time?," *Fish Farmer*, pp. 12–13 (1991).

Tacon, A.G.J., et al., "Effect of Different dietary Levels of Salt–mixtures on Growth and Body Composition in Carp," *Bulletin of the Japanese Society of Scientific Fisheries*, 50(7): 1217–1222 (1984).

Du, S.J., et al., "Growth Enhancement in Transgenic Atlantic Salmon by the Use of and "All Fish" Chimeric Growth Hormone Gene Construct," *Bio/Technology* 10:176–181 (1992).

Usher, M.L., et al., "Effects of transfer to seawater on growth and feeding in Atlantic salmon smolts (*Salmo salar L.* )," *Aquaculture*, 94: 309–326 (1991).

Lonning, S., et al., "A Comparative Study of Pelagic and Demersal Eggs from Common Marine Fishes in Northern Norway," *Sarsia*, 73:49–60 (1988).

Norris, D.O., "Endocrine Regulation of Iono–Osmotic Balance in Teleosts," Chapter 16 in *Vertebrate Endocrinology*, Lea and Fabiger, eds. (Philadelphia, PA) pp. 425–443 (1985).

Ward, D. T., et al., "Disulfide bonds in the Extracellular Calcium–Polyvalent Cation–sensing Receptor Correlate with dimer formation and Its Response to Divalent Cations in Vitro," *The Journal of Biological Chemistry*, 275(23):14476–14483 (1998).

Willoughby, S., "Production Life Cycle." In *Manual of Salmonid Farming*. Blackwell Science Ltd., eds., (Fishing News Books), pp. 82–122 (1999).

Van Der Velden, J.A., et al., "Growth rate and tissue magnesium concentration in adult freshwater tilapia, *Oreochromis mossambicus* (Peters), fed diets differing in magnesium content," *Journal of Fish Biology*, 39:83–91 (1991).

Zadunaisky , J.A., et al., "Osmolarity and Cell volume Changes of Chloride Cells: The Nature of the Rapd signal for Adaptation to Salinities of Fundulus Heteroclitus," *Biological Labs*, 32: 152–156 (1995).

Yanez, J. R., et al., "The neuronal system of the saccus vasculosus of trout (*Salmo trutta fario* and *oncorhynchus mykiss*): an immunocytochemical and nerve tracing study," *Cell Tissue Res.*, 288: 497–507 (1997).

Renfro. K. J., "Relationship between renal fluid and Mg secretion in a glomerular marine teleost." *Am. J. Physiol* 238: F92–F98 (1980).

Harmin, S. A., et al., "Plasma sex steroid profiles and the seasonal reproductive cycle in male and female winter flounder, *Pleuronectes americanus*," *Marine Biology* 121: 601–610 (1995).

Wendelarr Bonga, S. E. W., et al., "Endocrinology, Chapter 15." *In The Physiology of Fishes*, DH. Evans, eds., (CRC Press Inc.) pp. 469–534 (1993).

Mayer–Gostan, M. et al., "Mechanisms of hormone actions on gill transport in Vertebrate Endocrinology." *In Fundamentals and Medical Implications*, PKT Pang, et al., eds., (Academic Press) 2: 211–246 (1987).

Madsen, S.S., "The Role of Cortisol and Growth Hormone in Seawater Adaptation and Development of Hypoosmoregularity Mechanisms in Sea Trout Parr," *Gen. Comp. Endocrinology*, 79: 1–23 (1990).

Hirano, T., "The Spectrum of Prolactin Actions in Teleosts." *In Comparative Endocrinology, Developments and Directives,* CL Ralph, eds., (Alan Liss, Inc.) pp. 53–61 (1986).

Wendelaar Bonga, S., et al., "Control of Calcium regulating hormones in vertebrates: parathyroid hormone, calcitonin, prolactin and stanniocalcin," *Int. Rev. Cytol.,* 128: 139–149 (1991).

Wendalaar Bonga, S., et al., "Pituitary hormones, in Vertebrate Endocrinology." *In Fundamentals and Biochemical Implications,* 3: 105–124 (1989).

Forserg, J.A., et al., "Survival and growth of red drum in saline groundwaters of west Texas, USA," *J. of World Aquaculture Society* 27: 462–474 (1966).

Gatlin, D.M., et al., "Effects of dietary sodium chloride on red drum juveniles in waters of various salinities," *The Prog. Fish–Culturist,* 54: 220–227 (1992).

Shearer, K.D., "Dietary potassium requirement of juvenile chinook salmon," *Aquaculture,* 73: 119–129 (1988).

Brown, E.M., et al., "Calcium–Ion–Sensing Cell–Surface Receptors," *The New England Journal of Medicine,* 333(4):234–240 (1995).

Iyer, V.R., et al., "The Transcriptional Program in the Program in the Response of Human Fibroblasts to Serum," *Science,* 283: 83–87 (1999).

Quinn, S.J., et al., "Sodium and ionic strength sensing by the calcium receptor," *J. Biol. Chem.,* 273 (31): 19579–19586 (1998).

Brown, A.J., et al., "Rat calcium–receptor is regulated by vitamin D but not by calcium," *Am. J. Physiol.,* 270: F454–F460 (1996).

Olszak, I., et al., "Extracellular calcium elicits a chemokinetic response from monocytes in vitro and in vivo," *J. Clin Invest.,* 105(9): 1299–1305 (2000).

Plotkin, M.D., et al., "Localization of the Thiazide Sensitive NA–CL Cotransporter (TSC) in the Mammalian Kidney," *J. Am. Soc. Nephrol.,* 6:349A Abstract No.: 1717(1995).

Knox, D., et al., "Studies on the nutrition of rainbow trout (*Salmo gairdneri*)," *British Journal of Nutrition,* 50: 121–127 (1983).

House, M.G., et al., "Expression of an extracellular calcium–sensing receptor in human bone marrow cells." *J. Bone Mineral Res.:* 12:1959–1970 (1997).

Anh, D.J., et al., "Skeletal alkaline phosphatase activity is primarily released from human ossteoblasts in an insoluble form, and the net release is inhibited by calcium and skeletal growth factors," *Calcif Tissue In.:* 62: 332–340 (1998).

Bornefalk, E., et al., "Regulation of interleukin–6 secretion from mononuclear blood cells by extracellular calcium," *J. Bone Miner. Res.,* 12: 228–233 (1997).

Nielsen, P. K., et al., "Inhibition of PTH secretion by interleukin–1 beta in bovine parathyroid glands in vitro is associated with an up–regulation of the calcium–sensing receptor mRNA," *Biochem Biophys Res Commun.,* 238: 880–885 (1997).

Chang, W., et al., "Calcium Sensing in Cultured Chondrogenic RCJ3. 1c5.18 Cells," *Endocrinology* 140: 1911–1919 (1999).

Eklou–Kalonji, E., et al., "Effects of extracellular calcium on the proliferation and differentiation of porcine osteoblasts in vitro," *Cell Tissue Res.,* 292: 163–171 (1998).

Emanuel, R. L., et al., "Calcium–sensing receptor expression and regulation by extracellular calcium in the atT–20 pituitary cell line," *Mol Endocrinology,* 10: 555–565 (1996).

Godwin, S.L., et al., "Extracellular calcium and platelet-derived growth factor promote receptor–mediated chemotaxis in osteoblasts through different signaling pathways," *J. Biol. Chem.,* 272(17): 11307–11312 (1997).

Gundberg, C.M., et al., "Acute changes in serum osteocalcin during induced hypocalcemia in humans," *J. Clin. Endocrinology Metabolism,* 72: 438–443 (1991).

Honda, Y., et al., "Effects of extracellular calcium on insulin-–like growth factor II in human bone cells," *J. Bone Miner Res.,* 10: 1660–1665 (1995).

Jin, H.J., et al., "Fusion of mouse alveloar macrophages induced by 1–alpha, 25–dihydroxyvitamin D3 involves extracellular, but not intracellular, calcium, " *J. Cell. Physiol.,* 142: 434–439 (1990).

Kanatani, M., et al., "Effect of elevated extracellular calcium on the proliferation of osteoblastic MC3T3–E1 cells: its direct and indirect effects via monocytes," *Biochem. Biophys. Res. Commun.,* 181: 1425–1430 (1991).

Kanatani, M., et al., "High extracellular Calcium Inhibits Osteoclast–like Cell formation by Directly Acting on the Calcium–Sensing Receptor Existing in Osteoclast Precursor Cells," *Biochem. Biophys. Res. Commun.,* 261: 144–148 (1999).

Lajeunesse, D., et al., "Regulation of osteocalcin secretion by human primary bone cells and by the human osteosarcoma cell line MG–63," *Bone Miner,* 14; 237–250 (1991).

Malgaroli, A., et al., "Control of cytosolic free calcium in rat and chicken osteoclasts. The role of extracellular calcium and calcitonin," *J. Biol. Chem.,* 264:14342–14349 (1989).

Quarles, L.D., "Cation–sensing receptors in bone: A novel paradigm for regulating bone remodeling ?," *J. Bone Miner. Res.,* 12: 1971–1974 (1997).

Sugimoto, T., et al., "Effects of high calcium concentration on the functions and interactions of osteoblastic cells and monocytes and on the formation of osteoclast–like cells," *J. Bone Miner Res.,* 8: 1445–1452 (1993).

Yamaguchi, T., et al., "Extracellular Calcium ($Ca2+_o$)–sensing Receptor in a Murine Bone Marrow–Derived Stromal Cell Line (ST2) : Potential Mediator of the Actions of $Ca2+_o$ on the Function of ST2 Cells," *Endocrinology,* 139: 3561–3568 (1998).

Yamaguchi, T., et al., "Mouse osteoblastic cell line (MC3T3–E1) expresses extracellular calcium ($Ca2+_o$)–sensing receptor and its agonists stimulate chemotaxis and proliferation of MC3T3–E1 cells," *J Bone Miner Res.,* 13: 1530–1538 (1998).

Yamaguchi, T., et al., "Extracellular calcium ($Ca2+o$)–sensing receptor in a mouse monocyte–macrophage cell line (J774): Potential mediator of the actions of $Ca2+o$ on the function of J774 cells," *J Bone Miner Res.,* 13: 1390–1397 (1998).

Yamaguchi, T., et al., "Expression of extracellular calcium ($Ca2+o$)–sensing receptor in human peripheral blood monocytes," *Biochem. Biophys. Res. Commun.,* 246: 501–506 (1998).

Roberts, J.M., "Prevention or Early Treatment of Preeclampsia," *The New England Journal of Medicine* 337:124–125 (1997).

Rokaw, M., et al., Rapamycin(RAP) Stimulates Sodium Transport in A6 Cells Through Inhibition of Protein Kinase C (PKC), *J. Am. Soc. Nephrol* 6:349A (1995).

Cim, R. R., et al., "Identification and functional assay of an extracellular calcium–sensing receptor in Necturus gastric mucosa," *American Journal of Physiology* 273: G1051–G1060 (1997).

Sands, A.T., et al., "High Susceptibility to Ultraviolet–Induced Carcinogenesis in Mice Lacking XPC," *Nature* 377:162–165 (1995).

Ramos, L.S., et al., "Urinary Calcium As an Early Marker for Preeclampsia," *Obstetrics & Gynecology*, 77(5):685–688 (1991).

Saksena, D.N., "Histopathology of the saccus vasculosus of the Indian freshwater goby *glossogobisu giuris* Ham. (Teleostei). Folia Morphol. (Praha)," 37: 249–252 (1989).

Aida, K., et al., "Molecular Cloning of a Putative $Ca^{2+}$ Sensing Receptor cDNA from Human Kidney," *Biochemical and Biophysical Research Communications*, 214(2):524–529 (1995).

Gatlin, D. M., et al., "Effects of Dietary Sodium Chloride on Red Drum Juveniles in Waters of Various Salinities," *The Progressive Fish Culturist*, 54:220–227 (1992).

Park, G., et al., "The Effects of Residual Salts and Free Amino Acids in Musid Meal on Growth of Juvenile Japanese Flounder *Paralichthys olivaceus*," Nippon Suisan Gakkaishi, 66(4): 697–704 (2000). Abstract in English.

* cited by examiner

```
cttggcatta tgctctgtgc tgggggtatt cttgacagca ttcgtgatgg gagtgtttat 60
caaatttcgc aacaccccaa ttgttaaggc cacaaacaga gagctatcct acctcctcct 120
gttctcactc atctgctgtt tctccagttc cctcatcttc attggtgaac cccaggactg 180
gacatgccgt ctacgccagc ctgcattcgg gataagtttt gttctctgca tctcctgcat 240
cctggtaaaa actaaccgag tacttctagt gttcgaagcc aagatcccca ccagtctcca 300
tcgtaagtgg tgggggctaa acttgcagtt cctgttagtg ttcctgttca catttgtgca 360
agtgatgata tgtgtggtct ggctttacaa tgctcctccg gcgagctaca ggaaccatga 420
cattgatgag ataattttca ttacatgcaa tgagggctct atgatggcgc ttggcttcct 480
aattgggtac acatgcctgc tggcagccat atrcttcttc tttgcattta aatcacgaaa 540
actgccagag aactttactg aggctaagtt catcaccttc agcatgctca tctt        594
```

```
Leu Ala Leu Cys Ser Val Leu Gly Val Phe Leu Thr Ala Phe Val Met
 1           5                  10                 15
Gly Val Phe Ile Lys Phe Arg Asn Thr Pro Ile Val Lys Ala Thr Asn
            20                  25                 30
Arg Glu Leu Ser Tyr Leu Leu Leu Phe Ser Leu Ile Cys Cys Phe Ser
         35                  40                 45
Ser Ser Leu Ile Phe Ile Gly Glu Pro Gln Asp Trp Thr Cys Arg Leu
    50                  55                 60
Arg Gln Pro Ala Phe Gly Ile Ser Phe Val Leu Cys Ile Ser Cys Ile
65              70                  75                  80
Leu Val Lys Thr Asn Arg Val Leu Leu Val Phe Glu Ala Lys Ile Pro
                85                  90                  95
Thr Ser Leu His Arg Lys Trp Trp Gly Leu Asn Leu Gln Phe Leu Leu
               100                 105                110
Val Phe Leu Phe Thr Phe Val Gln Val Met Ile Cys Val Val Trp Leu
           115                 120                 125
Tyr Asn Ala Pro Pro Ala Ser Tyr Arg Asn His Asp Ile Xaa Asp Glu
       130                 135                 140
Ile Ile Phe Ile Thr Cys Asn Glu Gly Ser Met Met Ala Leu Gly Phe
145                 150                 155                 160
Leu Ile Gly Tyr Thr Cys Leu Leu Ala Ala Ile Xaa Phe Phe Phe Ala
               165                 170                 175
Phe Lys Ser Arg Lys Leu Pro Glu Asn Phe Thr Glu Ala Lys Phe Ile
           180                 185                 190
Thr Phe Ser Met Leu Ile Phe
           195
```

Xaa=any amino acid

FIG. 1

```
cttggcatta tgctctgtgc tgggggtatt cttgacagca ttcgtgatgg gagtgtttat 60
cagatttcgc aacaccccaa ttgttaaggc cacaaacaga gagctatcct acctcctcct 120
gttctcactc atctgctgtt tctccagctc cctcatcttc attggtgaac cccaggactg 180
gacatgccgt ctacgccagc ctgcattcgg gataagtttt gttctctgca tctcctgcat 240
cctggtcaaa actaaccgag tacttctagt gttcaagcc aagatcccca ccagtctcca 300
tcgtaagtgg tggggctaa acttgcagtt cctgttggtg ttcctgttca catttgtgca 360
agtgatgata tgtgtggtct ggctttacaa tgctcctccg gcgagctaca ggaaccatga 420
cattgatgag ataattttca ttacatgcaa tgagggctct atgatggcgc tcggcttcct 480
aattgggtac acatgcctgc tggcagccat atgcttcttc tttgcattta atcacgaaa 540
actgccagag aactttaccg aggctaagtt catcaccttc agcatgctca tctt        594
```

```
Leu Ala Leu Cys Ser Val Leu Gly Val Phe Leu Thr Ala Phe Val Met
 1           5                   10                  15
Gly Val Phe Ile Arg Phe Arg Asn Thr Pro Ile Val Lys Ala Thr Asn
            20                  25                  30
Arg Glu Leu Ser Tyr Leu Leu Leu Phe Ser Leu Ile Cys Cys Phe Ser
        35                  40                  45
Ser Ser Leu Ile Phe Ile Gly Glu Pro Gln Asp Trp Thr Cys Arg Leu
    50                  55                  60
Arg Gln Pro Ala Phe Gly Ile Ser Phe Val Leu Cys Ile Ser Cys Ile
65                  70                  75                  80
Leu Val Lys Thr Asn Arg Val Leu Leu Val Phe Glu Ala Lys Ile Pro
                85                  90                  95
Thr Ser Leu His Arg Lys Trp Trp Gly Leu Asn Leu Gln Phe Leu Leu
            100                 105                 110
Val Phe Leu Phe Thr Phe Val Gln Val Met Ile Cys Val Val Trp Leu
        115                 120                 125
Tyr Asn Ala Pro Pro Ala Ser Tyr Arg Asn His Asp Ile Xaa Asp Glu
    130                 135                 140
Ile Ile Phe Ile Thr Cys Asn Glu Gly Ser Met Met Ala Leu Gly Phe
145                 150                 155                 160
Leu Ile Gly Tyr Thr Cys Leu Leu Ala Ala Ile Cys Phe Phe Phe Ala
                165                 170                 175
Phe Lys Ser Arg Lys Leu Pro Glu Asn Phe Thr Glu Ala Lys Phe Ile
            180                 185                 190
Thr Phe Ser Met Leu Ile Phe
            195
```

Xaa = Any amino acid

FIG. 2

```
ttggcattat gctctgtgct gggggtattc ttgacagtat tcgtgatggg agtgtttatc  60
agatttcgca acacccaat tgttaaggcc acaaacagag agctatccta cctcctcctg  120
ttctcactta tctgctgttt ctccagctcc ctcatcttca ttggtgaacc ccaggactgg  180
acatgccgtc tacgccagcc tgcattcggg ataagttttg ttctctgcat ctcctgcatc  240
ctggtcaaaa ctaaccgagt acttctagtg ttcgaagcaa agatcccac cagtctccat  300
cgtaagtggt gggggctaaa cttgcagttc ctgttggtgt tcctgttcac atttgtgcaa  360
gtgatgatat gtgtggtctg gctttacaat gctcctccgg cgagctacag gaaccatgac  420
attgatgaga tcattttcat tacatgcaat gagggctcta tgatggcgct tggcttccta  480
attgggtaca catgcctgct ggcagccata tgcttcttct ttgcatttaa atcacgaaaa  540
ctgccagaga attttaccga ggctaagttc atcaccttca gcatgctcat ctt         593
```

```
Leu Ala Leu Cys Ser Val Leu Gly Val Phe Leu Thr Val Phe Val Met
 1           5                  10                 15
Gly Val Phe Ile Arg Phe Arg Asn Thr Pro Ile Val Lys Ala Thr Asn
           20                  25                 30
Arg Glu Leu Ser Tyr Leu Leu Leu Phe Ser Leu Ile Cys Cys Phe Ser
           35                  40                 45
Ser Ser Leu Ile Phe Ile Gly Glu Pro Gln Asp Trp Thr Cys Arg Leu
           50                  55                 60
Arg Gln Pro Ala Phe Gly Ile Ser Phe Val Leu Cys Ile Ser Cys Ile
65                  70                  75                 80
Leu Val Lys Thr Asn Arg Val Leu Leu Val Phe Glu Ala Lys Ile Pro
                  85                  90                 95
Thr Ser Leu His Arg Lys Trp Trp Gly Leu Asn Leu Gln Phe Leu Leu
                 100                 105                110
Val Phe Leu Phe Thr Phe Val Gln Val Met Ile Cys Val Val Trp Leu
           115                 120                125
Tyr Asn Ala Pro Pro Ala Ser Tyr Arg Asn His Asp Ile Xaa Asp Glu
           130                 135                140
Ile Phe Ile Thr Cys Asn Glu Gly Ser Met Met Ala Leu Gly Phe
145                 150                 155                160
Leu Ile Gly Tyr Thr Cys Leu Leu Ala Ala Ile Cys Phe Phe Phe Ala
                 165                 170                175
Phe Lys Ser Arg Lys Leu Pro Glu Asn Phe Thr Glu Ala Lys Phe Ile
                 180                 185                190
Thr Phe Ser Met Leu Ile Phe
                 195
```

Xaa = Any amino acid

FIG. 3

|             |                                                                                                                                    |     |
|-------------|------------------------------------------------------------------------------------------------------------------------------------|-----|
| SKCaR ORF       | Leu Thr Ile Phe Ala Val Leu Gly Ile Leu Ile Thr Ser Phe Val Leu Gly Val Phe Ile | 58 |
| Salmon ORF      | Leu Ala Leu Cys Ser Val Leu Gly Val Phe Leu Thr Ala Phe Val Met Gly Val Phe Ile | 58 |
| Arctic char ORF | Leu Ala Leu Cys Ser Val Leu Gly Val Phe Leu Thr Ala Phe Val Met Gly Val Phe Ile | 58 |
| R. Trout ORF    | Leu Ala Leu Cys Ser Val Leu Gly Val Phe Leu Thr Val Phe Val Met Gly Val Phe Ile | 58 |

| SKCaR ORF       | Lys Phe Arg Asn Thr Pro Ile Val Lys Ala Thr Asn Arg Glu Leu Ser Tyr Leu Leu Leu | 118 |
| Salmon ORF      | Lys Phe Arg Asn Thr Pro Ile Val Lys Ala Thr Asn Arg Glu Leu Ser Tyr Leu Leu Leu | 118 |
| Arctic char ORF | Arg Phe Arg Asn Thr Pro Ile Val Lys Ala Thr Asn Arg Glu Leu Ser Tyr Leu Leu Leu | 118 |
| R. Trout ORF    | Arg Phe Arg Asn Thr Pro Ile Val Lys Ala Thr Asn Arg Glu Leu Ser Tyr Leu Leu Leu | 118 |

| SKCaR ORF       | Phe Ser Leu Ile Cys Cys Phe Ser Ser Ser Leu Ile Phe Ile Gly Glu Pro Arg Asp Trp | 178 |
| Salmon ORF      | Phe Ser Leu Ile Cys Cys Phe Ser Ser Ser Leu Ile Phe Ile Gly Glu Pro Gln Asp Trp | 178 |
| Arctic char ORF | Phe Ser Leu Ile Cys Cys Phe Ser Ser Ser Leu Ile Phe Ile Gly Glu Pro Gln Asp Trp | 178 |
| R. Trout ORF    | Phe Ser Leu Ile Cys Cys Phe Ser Ser Ser Leu Ile Phe Ile Gly Glu Pro Gln Asp Trp | 178 |

| SKCaR ORF       | Thr Cys Arg Leu Arg Gln Pro Ala Phe Gly Ile Ser Phe Val Leu Cys Ile Ser Cys Ile | 238 |
| Salmon ORF      | Thr Cys Arg Leu Arg Gln Pro Ala Phe Gly Ile Ser Phe Val Leu Cys Ile Ser Cys Ile | 238 |
| Arctic char ORF | Thr Cys Arg Leu Arg Gln Pro Ala Phe Gly Ile Ser Phe Val Leu Cys Ile Ser Cys Ile | 238 |
| R. Trout ORF    | Thr Cys Arg Leu Arg Gln Pro Ala Phe Gly Ile Ser Phe Val Leu Cys Ile Ser Cys Ile | 238 |

| SKCaR ORF       | Leu Val Lys Thr Asn Arg Val Leu Leu Val Phe Glu Ala Lys Ile Pro Thr Ser Leu His | 298 |
| Salmon ORF      | Leu Val Lys Thr Asn Arg Val Leu Leu Val Phe Glu Ala Lys Ile Pro Thr Ser Leu His | 298 |
| Arctic char ORF | Leu Val Lys Thr Asn Arg Val Leu Leu Val Phe Glu Ala Lys Ile Pro Thr Ser Leu His | 298 |
| R. Trout ORF    | Leu Val Lys Thr Asn Arg Val Leu Leu Val Phe Glu Ala Lys Ile Pro Thr Ser Leu His | 298 |

| SKCaR ORF       | Arg Lys Trp Val Gly Leu Asn Leu Gln Phe Leu Leu Val Phe Leu Cys Ile Leu Val Gln | 358 |
| Salmon ORF      | Arg Lys Trp Trp Gly Leu Asn Leu Gln Phe Leu Leu Val Phe Leu Phe Thr Phe Val Gln | 358 |
| Arctic char ORF | Arg Lys Trp Trp Gly Leu Asn Leu Gln Phe Leu Leu Val Phe Leu Phe Thr Phe Val Gln | 358 |
| R. Trout ORF    | Arg Lys Trp Trp Gly Leu Asn Leu Gln Phe Leu Leu Val Phe Leu Phe Thr Phe Val Gln | 358 |

| SKCaR ORF       | Ile Val Thr Cys Ile Ile Trp Leu Tyr Thr Ala Pro Pro Ser Ser Tyr Arg Asn His Glu | 418 |
| Salmon ORF      | Val Met Ile Cys Val Val Trp Leu Tyr Asn Ala Pro Pro Ala Ser Tyr Arg Asn His Asp | 418 |
| Arctic char ORF | Val Met Ile Cys Val Val Trp Leu Tyr Asn Ala Pro Pro Ala Ser Tyr Arg Asn His Asp | 418 |
| R. Trout ORF    | Val Met Ile Cys Val Val Trp Leu Tyr Asn Ala Pro Pro Ala Ser Tyr Arg Asn His Asp | 418 |

| SKCaR ORF       | Leu Glu Asp Glu Val Ile Phe Ile Thr Cys Asp Glu Gly Ser Leu Met Ala Leu Gly Phe | 478 |
| Salmon ORF      | Ile  -  Asp Glu Ile Ile Phe Ile Thr Cys Asn Glu Gly Ser Met Met Ala Leu Gly Phe | 475 |
| Arctic char ORF | Ile  -  Asp Glu Ile Ile Phe Ile Thr Cys Asn Glu Gly Ser Met Met Ala Leu Gly Phe | 475 |
| R. Trout ORF    | Ile  -  Asp Glu Ile Ile Phe Ile Thr Cys Asn Glu Gly Ser Met Met Ala Leu Gly Phe | 475 |

FIG. 4A

```
                              170                                    180
SKCaR ORF      |Leu Ile Gly Tyr Thr Cys Leu Leu Ala Ala Ile Cys Phe Phe Phe Ala Phe Lys Ser Arg| 538
Salmon ORF     |Leu Ile Gly Tyr Thr Cys Leu Leu Ala Ala Ile Ser Phe Phe Phe Ala Phe Lys Ser Arg| 535
Arctic char ORF|Leu Ile Gly Tyr Thr Cys Leu Leu Ala Ala Ile Cys Phe Phe Phe Ala Phe Lys Ser Arg| 535
R. Trout ORF   |Leu Ile Gly Tyr Thr Cys Leu Leu Ala Ala Ile Cys Phe Phe Phe Ala Phe Lys Ser Arg| 535

190
SKCaR ORF      |Lys Leu Pro Glu Asn Phe Asn Glu Ala Lys Phe Ile Thr Phe Ser Met Leu Ile Phe| 595
Salmon ORF     |Lys Leu Pro Glu Asn Phe Thr Glu Ala Lys Phe Ile Thr Phe Ser Met Leu Ile Phe| 592
Arctic char ORF|Lys Leu Pro Glu Asn Phe Thr Glu Ala Lys Phe Ile Thr Phe Ser Met Leu Ile Phe| 592
R. Trout ORF   |Lys Leu Pro Glu Asn Phe Thr Glu Ala Lys Phe Ile Thr Phe Ser Met Leu Ile Phe| 592
```

Decoration 'Decoration #1': Box residues that match SKCaR ORF exactly.

FIG. 4B

```
                    10                  20                  30                  40
C T T G G C A T T A T G C T C T G T G C T G G G G G T A T T C T T G A C A G C A  Atlantic Salmon
C T T G G C A T T A T G C T C T G T G C T G G G G G T A T T C T T G A C A G C A  Char
C T T G G C A T T A T G C T C T G T G C T G G G G G T A T T C T T G A C A G C A  Chum Salmon
C T T G G C A T T A T G C T C T G T G C T G G G G G T A T T C T T G A C A G   A  Coho Salmon
C T T G G C A T T A T G C T C T G T G C T G G G G G T A T T C T T G A C A G C A  King Salmon
C T T G G C A T T A T G C T C T G T G C T G G G G G T A T T C T T G A C A G C    Pink Salmon
C T T G G C A T T A T G C T C T G T G C T G G G G G T A T T C T T G A C A G C A  Sockeye Salmon
C T T G G C A T T A T G C T C T G T G C T G G G G G T A T T C T T G A C A G   A  Trout 50                  60                  70                  80
T T C G T G A T G G G A G T G T T T A T C A   A T T T C G C A A C A C C C C A A  Atlantic Salmon
T T C G T G A T G G G A G T G T T T A T C A G A T T T C G C A A C A C C C C A A  Char
T T C G T G A T G G G A G T G T T T A T C A G A T T T C G C A A C A C C C C A A  Chum Salmon
T T C G T G A T G G G A G T G T T T A T C A G A T T T C G C A A C A C C C C A A  Coho Salmon
T T C G T G A T G G G A G T G T T T A T C A G A T T T C G C A A C A C C C C A A  King Salmon
T T C G T G A T G G G A G T G T T T A T C A G A T T T C G C A A C A C C C C A A  Pink Salmon
T T C G T G A T G G G A G T G T T T A T C A G A T T T C G C A A C A C C C C A A  Sockeye Salmon
T T C G T G A T G G G A G T G T T T A T C A G A T T T C G C A A C A C C C C A A  Trout 90                  100                 110                 120
T T G T T A A G G C C A C A A A C A G A G A G C T A T C C T A C C T C C T C C T  Atlantic Salmon
T T G T T A A G G C C A C A A A C A G A G A G C T A T C C T A C C T C C T C C T  Char
T T G T T A A G G C C A C A A A C A G A G A G C T A T C C T A C C T C C T C C T  Chum Salmon
T T G T T A A G G C C A C A A A C A G A G A G C T A T C C T A C C T C C T C C T  Coho Salmon
T T G T T A A G G C C A C A A A C A G A G A G C T A T C C T A C C T C C T C C T  King Salmon
T T G T T A A G G C C A C A A A C A G A G A G C T A T C C T A C C T C C T C C T  Pink Salmon
T T G T T A A G G C C A C A A A C A G A G A   C T A T C C T A C C T C C T C C T  Sockeye Salmon
T T G T T A A G G C C A C A A A C A G A G A G C T A T C C T A C C T C C T C C T  Trout 130                 140                 150                 160
G T T C T C A C T   A T C T G C T G T T T   T C C A G   T C C C T C A T C T T C  Atlantic Salmon
G T T C T C A C T   A T C T G C T G T T T   T C C A G C T C C C T C A T C T T C  Char
G T T C T C A C T T A T C T G C T G T T T T T C C A G C T C C C T C A T C T T C  Chum Salmon
G T T C T C A C T T A T C T G C T G T T T   T C C A G C T C C C T C A T C T T C  Coho Salmon
G T T C T C A C T T A T C T G C T G T T T T T C C A G C T C C C T C A T C T T C  King Salmon
G T T C T C A C T T A T C T G C T G T T T T T C C A G C T C C C T C A T C T T C  Pink Salmon
G T T C T C A C T T A T C T G C T G T T T T T C C A G C T C C C T C A T C T T C  Sockeye Salmon
G T T C T C A C T T A T C T G C T G T T T   T C C A G C T C C C T C A T C T T C  Trout 170                 180                 190                 200
A T T G G T G A A C C C C A G G A C T G G A C A T G C C G T C T A C G C C A G C  Atlantic Salmon
A T T G G T G A A C C C C A G G A C T G G A C A T G C C G T C T A C G C C A G C  Char
A T T G G T G A A C C C C A G G A C T G G A C A T G C C G T C T A C G C C A G C  Chum Salmon
A T T G G T G A A C C C C A G G A C T G G A C A T G C C G T C T A C G C C A G C  Coho Salmon
A T T G G T G A A C C C C A G G A C T G G A C A T G C C G T C T A C G C C A G C  King Salmon
A T T G G T G A A C C C C A G G A C T G G A C A T G C C G T C T A C G C C A G C  Pink Salmon
A T T G G T G A A C C C C A G G A C T G G A C A T G C C G T C T A C G C C A G C  Sockeye Salmon
A T T G G T G A A C C C C A G G A C T G G A C A T G C C G T C T A C G C C A G C  Trout
```

FIG. 20A

```
         210              220              230              240
C T G C A T T C G G G A T A A G T T T T G T T C T C T G C A T C T C C T G C A T  Atlantic Salmon
C T G C A T T C G G G A T A A G T T T T G T T C T C T G C A T C T C C T G C A T  Char
C T G C A T T C G G G A T A A G T T T T G T T C T C T G C A T C T C C T G C A T  Chum Salmon
C T G C A T T C G G G A T A A G T T T T G T T C T C T G C A T C T C C T G C A T  Coho Salmon
C T G C A T T C G G G A T A A G T T T T G T T C T C T G C A T C T C C T G C A T  King Salmon
C T G C A T T C G G G A T A A G T T T T G T T C T C T G C A T C T C C T G C A T  Pink Salmon
C T G C A T T C G G G A T A A G T T T T G T T C T C T G C A T C T C C T G C A T  Sockeye Salmon
C T G C A T T C G G G A T A A G T T T T G T T C T C T G C A T C T C C T G C A T  Trout 250              260              270              280
C C T G G T ▓ A A A A C T A A C C G A G T A C T T C T A G T G T T C G A A G C ▓  Atlantic Salmon
C C T G G T C A A A A C T A A C C G A G T A C T T C T A G T G T T C G A A G C ▓  Char
C C T G G T C A A A A C T A A C C G A G T A C T T C T A G T G T T C G A A G C A  Chum Salmon
C C T G G T C A A A A C T A A C C G A G T A C T T C T A G T G T T C G A A G C A  Coho Salmon
C C T ▓ G T C A A A A C T A A C C G A G T A C T T C T A G T G T T C G A A G C A  King Salmon
C C T G G T C A A A A C T A A C C G A G T A C T T C T A G T G T T C G A A G C A  Pink Salmon
C C T ▓ G T C A A A A C T A A C C G A G T A C T T C T A G T G T T C G A A G C A  Sockeye Salmon
C C T G G T C A A A A C T A A C C G A G T A C T T C T A G T G T T C G A A G C A  Trout 290              300              310              320
A A G A T C C C C A C C A G T C T C C A T C G T A A G T G G T G G G G G C T A A  Atlantic Salmon
A A G A T C C C C A C C A G T C T C C A T C G T A A G T G G T G G G G G C T A A  Char
A A G A T C C C C A C C A G T C T C C A T C G T A A G T G G T G G G G G C T A A  Chum Salmon
A A G A T C C C C A C C A G T C T C C A T C G T A A G T G G T G G G G G C T A A  Coho Salmon
A A G A T C C C C A C C A G T C T C C A T C G T A A G T G G T G G G G G C T A A  King Salmon
A A G A T C C C C A C C A G T C T C C A T C G T A A G T G G T G G G G G C T A A  Pink Salmon
A A G A T C C C C A C C A G T C T C C A T C G T A A G T G G T G G G G G C T A A  Sockeye Salmon
A A G A T C C C C A C C A G T C T C C A T C G T A A G T G G T G G G G G C T A A  Trout 330              340              350              360
A C T T G C A G T T C C T G T T ▓ G T G T T C C T G T T C A C A T T T G T G C A  Atlantic Salmon
A C T T G C A G T T C C T G T T G G T G T T C C T G T T C A C A T T T G T G C A  Char
A C T T G C A G T T C C T G T T G G T G T T C C T G T T C A C A T T T G T G C A  Chum Salmon
A C T T G C A G T T C C T G T T G G T G T T C C T G T T C A C A T T T G T G C A  Coho Salmon
A C T T G C A G T T C C T G T T G G T G T T C C T G T T C A C A T T T G T G C A  King Salmon
A C T T G C A G T T C C T G T T G G T G T T C C T G T T C A C A T T T G T G C A  Pink Salmon
A C T T G C A G T T C C T G T T G G T G T T C C T G T T C A C A T T T G T G C A  Sockeye Salmon
A C T T G C A G T T C C T G T T G G T G T T C C T G T T C A C A T T T G T G C A  Trout 370              380              390              400
A G T G A T G A T A T G T G T G G T C T G G C T T T A C A A T G C T C C T C C G  Atlantic Salmon
A G T G A T G A T A T G T G T G G T C T G G C T T T A C A A T G C T C C T C C G  Char
A G T G A T G A T A T G T G T G G T C T G G C T T T A C A A T G C T C C T C C G  Chum Salmon
A G T G A T G A T A T G T G T G G T C T G G C T T T A C A A T G C T C C T C C G  Coho Salmon
A G T G A T G A T A T G T G T G G T C T G G C T T T A C A A T G C T C C T C C ▓  King Salmon
A G T G A T G A T A T G T G T G G T C T G G C T T T A C A A T G C T C C T C C G  Pink Salmon
A G T G A T G A T A T G T G T G G T C T G G C T T T A C A A T G C T C C T C C ▓  Sockeye Salmon
A G T G A T G A T A T G T G T G G T C T G G C T T T A C A A T G C T C C T C C G  Trout
```

FIG. 20B

|     | 410 | 420 | 430 | 440 |     |
|-----|-----|-----|-----|-----|-----|
| G C G A G C T A C A G G A A C C A T G A C A T T G A T G A G A T A A T T T T C A | | | | | Atlantic Salmon |
| G C G A G C T A C A G G A A C C A T G A C A T T G A T G A G A T A A T T T T C A | | | | | Char |
| G C G A G C T A C A G G A A C C A T G A C A T T G A T G A G A T C A T T T T C A | | | | | Chum Salmon |
| G C G A G C T A C A G G A A C C A T G A C A T T G A T G A G A T C A T T T T C A | | | | | Coho Salmon |
| G C G A G C T A C A G G A A T C A T G A C A T T G A T G A G A T C A T T T T C A | | | | | King Salmon |
| G C G A G C T A C A G G A A C C A T G A C A T T G A T G A G A T C A T T T T C A | | | | | Pink Salmon |
| G C G A G C T A C A G G A A T C A T G A C A T T G A T G A G A T A A T T T T C A | | | | | Sockeye Salmon |
| G C G A G C T A C A G G A A C C A T G A C A T T G A T G A G A T C A T T T T C A | | | | | Trout |

|     | 450 | 460 | 470 | 480 |     |
|-----|-----|-----|-----|-----|-----|
| T T A C A T G C A A T G A G G G C T C T A T G A T G G C G C T T G G C T T C C T | | | | | Atlantic Salmon |
| T T A C A T G C A A T G A G G G C T C T A T G A T G G C G C T G G G C T T C C T | | | | | Char |
| T T A C A T G C A A T G A G G G C T C T A T G A T G G C G C T T G G C T T C C T | | | | | Chum Salmon |
| T T A C A T G C A A T G A G G G C T C T A T G A T G G C G C T T G G C T T C C T | | | | | Coho Salmon |
| T T A C A T G C A A T G A G G G C T C T A T G A T G G C G C T T G G C T T C C T | | | | | King Salmon |
| T T A C A T G C A A T G A G G G C T C T A T G A T G G C G C T T G G C T T C C T | | | | | Pink Salmon |
| T T A C A T G C A A T G A G G G C T C T A T G A T G G C G T T T G G C T T C C T | | | | | Sockeye Salmon |
| T T A C A T G C A A T G A G G G C T C T A T G A T G G C G C T T G G C T T C C T | | | | | Trout |

|     | 490 | 500 | 510 | 520 |     |
|-----|-----|-----|-----|-----|-----|
| A A T T G G G T A C A C A T G C C T G C T G G C A G C C A T A T G C T T C T T C | | | | | Atlantic Salmon |
| A A T T G G G T A C A C A T G C C T G C T G G C A G C C A T A T G C T T C T T C | | | | | Char |
| A A T T G G G T A C A C A T G C C T G C T G G C A G C C A T A T G C T T C T T C | | | | | Chum Salmon |
| A A T T G G G T A C A C A T G C C T G C T G G C A G C C A T A T G C T T C T T C | | | | | Coho Salmon |
| A A T T G G G T A C A C G T G C C T G C T G G C A G C C A T A T G C T T C T T C | | | | | King Salmon |
| A A T T G G G T A C A C A T G C C T G C T G G C A G C C A T A T G C T T C T T C | | | | | Pink Salmon |
| A A T T G G G T A C A C G T G C C T G C T G G C A G C C A T A T G C T T C T T C | | | | | Sockeye Salmon |
| A A T T G G G T A C A C A T G C C T G C T G G C A G C C A T A T G C T T C T T C | | | | | Trout |

|     | 530 | 540 | 550 | 560 |     |
|-----|-----|-----|-----|-----|-----|
| T T T G C A T T T A A A T C A C G A A A A C T G C C A G A G A A T T T T A C C G | | | | | Atlantic Salmon |
| T T T G C A T T T A A A T C A C G A A A A C T G C C A G A G A A T T T T A C C G | | | | | Char |
| T T T G C A T T T A A A T C A C G A A A A C T G C C A G A G A A T T T T A C C G | | | | | Chum Salmon |
| T T T G C A T T T A A A T C A C G A A A A C T G C C A G A G A A T T T T A C C G | | | | | Coho Salmon |
| T T T G C A T T T A A A T C A C G A A A A C T G C C A G A G A A T T T T A C C G | | | | | King Salmon |
| T T T G C A T T T A A A T C A C G A A A A C T G C C A G A G A A T T T T A C C G | | | | | Pink Salmon |
| T T T G C A T T T A A A T C A C G A A A A C T G C C A G A G A A T T T T A C A G | | | | | Sockeye Salmon |
| T T T G C A T T T A A A T C A C G A A A A C T G C C A G A G A A T T T T A C C G | | | | | Trout |

|     | 570 | 580 | 590 |     |
|-----|-----|-----|-----|-----|
| A G G C T A A G T T C A T C A C C T T C A G C A T G C T C A T C T T | | | | Atlantic Salmon |
| A G G C T A A G T T C A T C A C C T T C A G C A T G C T C A T C T T | | | | Char |
| A G G C T A A G T T C A T C A C C T T C A G C A T G C T C A T C T T | | | | Chum Salmon |
| A G G C T A A G T T C A T C A C C T T C A G C A T G C T C A T C T T | | | | Coho Salmon |
| A G G C T A A G T T C A T T A C C T T C A G C A T G C T C A T C T T | | | | King Salmon |
| A G G C T A A G T T C A T C A C C T T C A G C A T G C T C A T C T T | | | | Pink Salmon |
| A G G C T A A G T T C A T C A C C T T C A G C A T G C T C A T C T T | | | | Sockeye Salmon |
| A G G C T A A G T T C A T C A C C T T C A G C A T G C T C A T C T T | | | | Trout |

Decoration 'Decoration #1': Shade (with black at 40% fill) residues that differ from the Consensus.

FIG. 20C

|     |                                                                                                     |                    |
|-----|-----------------------------------------------------------------------------------------------------|--------------------|
|     | 10                                                           20                                    |                    |
| 1   | Leu Ala Leu Cys Ser Val Leu Gly Val Phe Leu Thr Ala Phe Val Met Gly Val Phe Ile                    | Atlantic Salmon ORF |
| 1   | Leu Ala Leu Cys Ser Val Leu Gly Val Phe Leu Thr Ala Phe Val Met Gly Val Phe Ile                    | Char ORF           |
| 1   | Leu Ala Leu Cys Ser Val Leu Gly Val Phe Leu Thr Ala Phe Val Met Gly Val Phe Ile                    | Chum Salmon ORF    |
| 1   | Leu Ala Leu Cys Ser Val Leu Gly Val Phe Leu Thr Ala Phe Val Met Gly Val Phe Ile                    | Coho Salmon ORF    |
| 1   | Leu Ala Leu Cys Ser Val Leu Gly Val Phe Leu Thr Ala Phe Val Met Gly Val Phe Ile                    | King Salmon ORF    |
| 1   | Leu Ala Leu Cys Ser Val Leu Gly Val Phe Leu Thr Ala Phe Val Met Gly Val Phe Ile                    | Pink Salmon ORF    |
| 1   | Leu Ala Leu Cys Ser Val Leu Gly Val Phe Leu Thr Ala Phe Val Met Gly Val Phe Ile                    | Sockeye Salmon ORF |
| 1   | Leu Ala Leu Cys Ser Val Leu Gly Val Phe Leu Thr Val Phe Val Met Gly Val Phe Ile                    | Trout ORF          |

|     |                                                                                                     |                    |
|-----|-----------------------------------------------------------------------------------------------------|--------------------|
|     | 30                                                           40                                    |                    |
| 61  | Lys Phe Arg Asn Thr Pro Ile Val Lys Ala Thr Asn Arg Glu Leu Ser Tyr Leu Leu Leu                    | Atlantic Salmon ORF |
| 61  | Arg Phe Arg Asn Thr Pro Ile Val Lys Ala Thr Asn Arg Glu Leu Ser Tyr Leu Leu Leu                    | Char ORF           |
| 61  | Arg Phe Arg Asn Thr Pro Ile Val Lys Ala Thr Asn Arg Glu Leu Ser Tyr Leu Leu Leu                    | Chum Salmon ORF    |
| 61  | Arg Phe Arg Asn Thr Pro Ile Val Lys Ala Thr Asn Arg Glu Leu Ser Tyr Leu Leu Leu                    | Coho Salmon ORF    |
| 61  | Arg Phe Arg Asn Thr Pro Ile Val Lys Ala Thr Asn Arg Glu Leu Ser Tyr Leu Leu Leu                    | King Salmon ORF    |
| 61  | Arg Phe Arg Asn Thr Pro Ile Val Lys Ala Thr Asn Arg Glu Leu Ser Tyr Leu Leu Leu                    | Pink Salmon ORF    |
| 61  | Arg Phe Arg Asn Thr Pro Ile Val Lys Ala Thr Asn Arg Glu Leu Ser Tyr Leu Leu Leu                    | Sockeye Salmon ORF |
| 61  | Arg Phe Arg Asn Thr Pro Ile Val Lys Ala Thr Asn Arg Glu Leu Ser Tyr Leu Leu Leu                    | Trout ORF          |

|     |                                                                                                     |                    |
|-----|-----------------------------------------------------------------------------------------------------|--------------------|
|     | 50                                                           60                                    |                    |
| 121 | Phe Ser Leu Ile Cys Cys Phe Ser Ser Ser Leu Ile Phe Ile Gly Glu Pro Gln Asp Trp                    | Atlantic Salmon ORF |
| 121 | Phe Ser Leu Ile Cys Cys Phe Ser Ser Ser Leu Ile Phe Ile Gly Glu Pro Gln Asp Trp                    | Char ORF           |
| 121 | Phe Ser Leu Ile Cys Cys Phe Ser Ser Ser Leu Ile Phe Ile Gly Glu Pro Gln Asp Trp                    | Chum Salmon ORF    |
| 121 | Phe Ser Leu Ile Cys Cys Phe Ser Ser Ser Leu Ile Phe Ile Gly Glu Pro Gln Asp Trp                    | Coho Salmon ORF    |
| 121 | Phe Ser Leu Ile Cys Cys Phe Ser Ser Ser Leu Ile Phe Ile Gly Glu Pro Gln Asp Trp                    | King Salmon ORF    |
| 121 | Phe Ser Leu Ile Cys Cys Phe Ser Ser Ser Leu Ile Phe Ile Gly Glu Pro Gln Asp Trp                    | Pink Salmon ORF    |
| 121 | Phe Ser Leu Ile Cys Cys Phe Ser Ser Ser Leu Ile Phe Ile Gly Glu Pro Gln Asp Trp                    | Sockeye Salmon ORF |
| 121 | Phe Ser Leu Ile Cys Cys Phe Ser Ser Ser Leu Ile Phe Ile Gly Glu Pro Gln Asp Trp                    | Trout ORF          |

|     |                                                                                                     |                    |
|-----|-----------------------------------------------------------------------------------------------------|--------------------|
|     | 70                                                           80                                    |                    |
| 181 | Thr Cys Arg Leu Arg Gln Pro Ala Phe Gly Ile Ser Phe Val Leu Cys Ile Ser Cys Ile                    | Atlantic Salmon ORF |
| 181 | Thr Cys Arg Leu Arg Gln Pro Ala Phe Gly Ile Ser Phe Val Leu Cys Ile Ser Cys Ile                    | Char ORF           |
| 181 | Thr Cys Arg Leu Arg Gln Pro Ala Phe Gly Ile Ser Phe Val Leu Cys Ile Ser Cys Ile                    | Chum Salmon ORF    |
| 181 | Thr Cys Arg Leu Arg Gln Pro Ala Phe Gly Ile Ser Phe Val Leu Cys Ile Ser Cys Ile                    | Coho Salmon ORF    |
| 181 | Thr Cys Arg Leu Arg Gln Pro Ala Phe Gly Ile Ser Phe Val Leu Cys Ile Ser Cys Ile                    | King Salmon ORF    |
| 181 | Thr Cys Arg Leu Arg Gln Pro Ala Phe Gly Ile Ser Phe Val Leu Cys Ile Ser Cys Ile                    | Pink Salmon ORF    |
| 181 | Thr Cys Arg Leu Arg Gln Pro Ala Phe Gly Ile Ser Phe Val Leu Cys Ile Ser Cys Ile                    | Sockeye Salmon ORF |
| 181 | Thr Cys Arg Leu Arg Gln Pro Ala Phe Gly Ile Ser Phe Val Leu Cys Ile Ser Cys Ile                    | Trout ORF          |

|     |                                                                                                     |                    |
|-----|-----------------------------------------------------------------------------------------------------|--------------------|
|     | 90                                                           100                                   |                    |
| 241 | Leu Val Lys Thr Asn Arg Val Leu Leu Val Phe Glu Ala Lys Ile Pro Thr Ser Leu His                    | Atlantic Salmon ORF |
| 241 | Leu Val Lys Thr Asn Arg Val Leu Leu Val Phe Glu Ala Lys Ile Pro Thr Ser Leu His                    | Char ORF           |
| 241 | Leu Val Lys Thr Asn Arg Val Leu Leu Val Phe Glu Ala Lys Ile Pro Thr Ser Leu His                    | Chum Salmon ORF    |
| 241 | Leu Val Lys Thr Asn Arg Val Leu Leu Val Phe Glu Ala Lys Ile Pro Thr Ser Leu His                    | Coho Salmon ORF    |
| 241 | Leu Val Lys Thr Asn Arg Val Leu Leu Val Phe Glu Ala Lys Ile Pro Thr Ser Leu His                    | King Salmon ORF    |
| 241 | Leu Val Lys Thr Asn Arg Val Leu Leu Val Phe Glu Ala Lys Ile Pro Thr Ser Leu His                    | Pink Salmon ORF    |
| 241 | Leu Val Lys Thr Asn Arg Val Leu Leu Val Phe Glu Ala Lys Ile Pro Thr Ser Leu His                    | Sockeye Salmon ORF |
| 241 | Leu Val Lys Thr Asn Arg Val Leu Leu Val Phe Glu Ala Lys Ile Pro Thr Ser Leu His                    | Trout ORF          |

FIG. 21A

|     |     |     |     |     |     |     |     |     |     | 110 |     |     |     |     |     |     |     |     |     | 120 |     |                    |
|-----|-----|-----|-----|-----|-----|-----|-----|-----|-----|-----|-----|-----|-----|-----|-----|-----|-----|-----|-----|-----|-----|--------------------|
| 301 | Arg | Lys | Trp | Trp | Gly | Leu | Asn | Leu | Gln | Phe | Leu | Leu | Val | Phe | Leu | Phe | Thr | Phe | Val | Gln | | Atlantic Salmon ORF |
| 301 | Arg | Lys | Trp | Trp | Gly | Leu | Asn | Leu | Gln | Phe | Leu | Leu | Val | Phe | Leu | Phe | Thr | Phe | Val | Gln | | Char ORF |
| 301 | Arg | Lys | Trp | Trp | Gly | Leu | Asn | Leu | Gln | Phe | Leu | Leu | Val | Phe | Leu | Phe | Thr | Phe | Val | Gln | | Chum Salmon ORF |
| 301 | Arg | Lys | Trp | Trp | Gly | Leu | Asn | Leu | Gln | Phe | Leu | Leu | Val | Phe | Leu | Phe | Thr | Phe | Val | Gln | | Coho Salmon ORF |
| 301 | Arg | Lys | Trp | Trp | Gly | Leu | Asn | Leu | Gln | Phe | Leu | Leu | Val | Phe | Leu | Phe | Thr | Phe | Val | Gln | | King Salmon ORF |
| 301 | Arg | Lys | Trp | Trp | Gly | Leu | Asn | Leu | Gln | Phe | Leu | Leu | Val | Phe | Leu | Phe | Thr | Phe | Val | Gln | | Pink Salmon ORF |
| 301 | Arg | Lys | Trp | Trp | Gly | Leu | Asn | Leu | Gln | Phe | Leu | Leu | Val | Phe | Leu | Phe | Thr | Phe | Val | Gln | | Sockeye Salmon ORF |
| 301 | Arg | Lys | Trp | Trp | Gly | Leu | Asn | Leu | Gln | Phe | Leu | Leu | Val | Phe | Leu | Phe | Thr | Phe | Val | Gln | | Trout ORF |

|     |     |     |     |     |     | 130 |     |     |     |     |     |     |     |     |     | 140 |     |     |     |                    |
|-----|-----|-----|-----|-----|-----|-----|-----|-----|-----|-----|-----|-----|-----|-----|-----|-----|-----|-----|-----|--------------------|
| 361 | Val | Met | Ile | Cys | Val | Val | Trp | Leu | Tyr | Asn | Ala | Pro | Pro | Ala | Ser | Tyr | Arg | Asn | His | Asp | Atlantic Salmon ORF |
| 361 | Val | Met | Ile | Cys | Val | Val | Trp | Leu | Tyr | Asn | Ala | Pro | Pro | Ala | Ser | Tyr | Arg | Asn | His | Asp | Char ORF |
| 361 | Val | Met | Ile | Cys | Val | Val | Trp | Leu | Tyr | Asn | Ala | Pro | Pro | Ala | Ser | Tyr | Arg | Asn | His | Asp | Chum Salmon ORF |
| 361 | Val | Met | Ile | Cys | Val | Val | Trp | Leu | Tyr | Asn | Ala | Pro | Pro | Ala | Ser | Tyr | Arg | Asn | His | Asp | Coho Salmon ORF |
| 361 | Val | Met | Ile | Cys | Val | Val | Trp | Leu | Tyr | Asn | Ala | Pro | Pro | Ala | Ser | Tyr | Arg | Asn | His | Asp | King Salmon ORF |
| 361 | Val | Met | Ile | Cys | Val | Val | Trp | Leu | Tyr | Asn | Ala | Pro | Pro | Ala | Ser | Tyr | Arg | Asn | His | Asp | Pink Salmon ORF |
| 361 | Val | Met | Ile | Cys | Val | Val | Trp | Leu | Tyr | Asn | Ala | Pro | Pro | Ala | Ser | Tyr | Arg | Asn | His | Asp | Sockeye Salmon ORF |
| 361 | Val | Met | Ile | Cys | Val | Val | Trp | Leu | Tyr | Asn | Ala | Pro | Pro | Ala | Ser | Tyr | Arg | Asn | His | Asp | Trout ORF |

|     |     |     |     |     |     | 150 |     |     |     |     |     |     |     |     |     | 160 |     |     |     |                    |
|-----|-----|-----|-----|-----|-----|-----|-----|-----|-----|-----|-----|-----|-----|-----|-----|-----|-----|-----|-----|--------------------|
| 421 | Ile | Asp | Glu | Ile | Ile | Phe | Ile | Thr | Cys | Asn | Glu | Gly | Ser | Met | Met | Ala | Leu | Gly | Phe | Leu | Atlantic Salmon ORF |
| 421 | Ile | Asp | Glu | Ile | Ile | Phe | Ile | Thr | Cys | Asn | Glu | Gly | Ser | Met | Met | Ala | Leu | Gly | Phe | Leu | Char ORF |
| 421 | Ile | Asp | Glu | Ile | Ile | Phe | Ile | Thr | Cys | Asn | Glu | Gly | Ser | Met | Met | Ala | Leu | Gly | Phe | Leu | Chum Salmon ORF |
| 421 | Ile | Asp | Glu | Ile | Ile | Phe | Ile | Thr | Cys | Asn | Glu | Gly | Ser | Met | Met | Ala | Leu | Gly | Phe | Leu | Coho Salmon ORF |
| 421 | Ile | Asp | Glu | Ile | Ile | Phe | Ile | Thr | Cys | Asn | Glu | Gly | Ser | Met | Met | Ala | Leu | Gly | Phe | Leu | King Salmon ORF |
| 421 | Ile | Asp | Glu | Ile | Ile | Phe | Ile | Thr | Cys | Asn | Glu | Gly | Ser | Met | Met | Ala | Leu | Gly | Phe | Leu | Pink Salmon ORF |
| 421 | Ile | Asp | Glu | Ile | Ile | Phe | Ile | Thr | Cys | Asn | Glu | Gly | Ser | Met | Met | Ala | Leu | Gly | Phe | Leu | Sockeye Salmon ORF |
| 421 | Ile | Asp | Glu | Ile | Ile | Phe | Ile | Thr | Cys | Asn | Glu | Gly | Ser | Met | Met | Ala | Leu | Gly | Phe | Leu | Trout ORF |

|     |     |     |     |     |     | 170 |     |     |     |     |     |     |     |     |     | 180 |     |     |     |                    |
|-----|-----|-----|-----|-----|-----|-----|-----|-----|-----|-----|-----|-----|-----|-----|-----|-----|-----|-----|-----|--------------------|
| 481 | Ile | Gly | Tyr | Thr | Cys | Leu | Leu | Ala | Ala | Ile | Leu | Phe | Phe | Phe | Ala | Phe | Lys | Ser | Arg | Lys | Atlantic Salmon ORF |
| 481 | Ile | Gly | Tyr | Thr | Cys | Leu | Leu | Ala | Ala | Ile | Cys | Phe | Phe | Phe | Ala | Phe | Lys | Ser | Arg | Lys | Char ORF |
| 481 | Ile | Gly | Tyr | Thr | Cys | Leu | Leu | Ala | Ala | Ile | Cys | Phe | Phe | Phe | Ala | Phe | Lys | Ser | Arg | Lys | Chum Salmon ORF |
| 481 | Ile | Gly | Tyr | Thr | Cys | Leu | Leu | Ala | Ala | Ile | Cys | Phe | Phe | Phe | Ala | Phe | Lys | Ser | Arg | Lys | Coho Salmon ORF |
| 481 | Ile | Gly | Tyr | Thr | Cys | Leu | Leu | Ala | Ala | Ile | Cys | Phe | Phe | Phe | Ala | Phe | Lys | Ser | Arg | Lys | King Salmon ORF |
| 481 | Ile | Gly | Tyr | Thr | Cys | Leu | Leu | Ala | Ala | Ile | Cys | Phe | Phe | Phe | Ala | Phe | Lys | Ser | Arg | Lys | Pink Salmon ORF |
| 481 | Ile | Gly | Tyr | Thr | Cys | Leu | Leu | Ala | Ala | Ile | Cys | Phe | Phe | Phe | Ala | Phe | Lys | Ser | Arg | Lys | Sockeye Salmon ORF |
| 481 | Ile | Gly | Tyr | Thr | Cys | Leu | Leu | Ala | Ala | Ile | Cys | Phe | Phe | Phe | Ala | Phe | Lys | Ser | Arg | Lys | Trout ORF |

|     |     |     |     |     |     | 190 |     |     |     |     |     |     |     |     |                    |
|-----|-----|-----|-----|-----|-----|-----|-----|-----|-----|-----|-----|-----|-----|-----|--------------------|
| 541 | Leu | Pro | Glu | Asn | Phe | Thr | Glu | Ala | Lys | Phe | Ile | Thr | Phe | Ser | Met | Leu | Ile | Atlantic Salmon ORF |
| 541 | Leu | Pro | Glu | Asn | Phe | Thr | Glu | Ala | Lys | Phe | Ile | Thr | Phe | Ser | Met | Leu | Ile | Char ORF |
| 541 | Leu | Pro | Glu | Asn | Phe | Thr | Glu | Ala | Lys | Phe | Ile | Thr | Phe | Ser | Met | Leu | Ile | Chum Salmon ORF |
| 541 | Leu | Pro | Glu | Asn | Phe | Thr | Glu | Ala | Lys | Phe | Ile | Thr | Phe | Ser | Met | Leu | Ile | Coho Salmon ORF |
| 541 | Leu | Pro | Glu | Asn | Phe | Thr | Glu | Ala | Lys | Phe | Ile | Thr | Phe | Ser | Met | Leu | Ile | King Salmon ORF |
| 541 | Leu | Pro | Glu | Asn | Phe | Thr | Glu | Ala | Lys | Phe | Ile | Thr | Phe | Ser | Met | Leu | Ile | Pink Salmon ORF |
| 541 | Leu | Pro | Glu | Asn | Phe | Thr | Glu | Ala | Lys | Phe | Ile | Thr | Phe | Ser | Met | Leu | Ile | Sockeye Salmon ORF |
| 541 | Leu | Pro | Glu | Asn | Phe | Thr | Glu | Ala | Lys | Phe | Ile | Thr | Phe | Ser | Met | Leu | Ile | Trout ORF |

Decoration 'Decoration #1': Shade (with black at 40% fill) residues that differ from the Consensus.

FIG. 21B

```
aattccgttg ctgtcggttc agtccaagtc tcctccagtg caaaatgaga aatggtggtc  60
gccattacag aacatgcac  tacatctgtg ttaatgaaat attgtcagtt atctgaaggt 120
tattaaaatg tttctgcaag gatggcttca cgagaaatca attctgcacg ttttcccatt 180
gtcattgtat gaataactga ccaaagggat gtaacaaaat ggaacaaagc tgaggaccac 240
gttcacccct tcttggagca tacgatcaac cctgaaggag atggaagact tgaggaggaa 300
atggggattg atcttccagg agttctgctg taaagcgatc cctcaccatt acaaagataa 360
gcagaaatcc tccaggcatc tctgtaaac  gggctggcgt agtgtggctt ggtcaaggaa 420
cagagacagg gctgcacaat ggctcagctt cactgccaac tcttattctt gggatttaca 480
               ORF
ctcctacagt cgtacaatgt tcagggtat  ggtccaaacc aaagggccca gaagaaagga 540
gacatcatac tgggaggtct cttcccaata cactttggag tagccgccaa ggatcaggac 600
ttaaaatcga gaccggaggc gacaaaatgt attcggtaca attttcgagg cttccgatgg 660
ctccaggcga tgatattcgc aattgaagag attaacaaca gtatgacttt cctgcccaat 720
atcaccctgg gatatcgcat atttgacacg tgtaacaccg tgtccaaggc gctagaggca 780
acactcagct ttgtggccca gaacaaaatc gactcgctga acttagatga gttctgtaac 840
tgctctgacc atatccatc  cacaatagca gtggtcgcgg caaccgggtc aggaatctcc 900
acggctgtgg ccaatctatt gggattattt tacattccac aggtcagcta tgcctcctcg 960
agcaggctgc tcagcaacaa gaatgagtac aaggccttcc tgaggaccat ccccaatgat 1020
gagcaacagg ccacggccat ggccgagatc atcgagcact ccagtggaa  ctgggtggga 1080
accctggcag ccgacgatga ctatgccgc  ccaggcattg acaagttccg ggaggaggcc 1140
gttaagaggg acatctgtat tgacttcagt gagatgatct ctcagtacta cacccagaag 1200
cagttggagt tcatcgccga cgtcatccag aactcctcgg ccaaggtcat cgtggtcttc 1260
tccaatggcc ccgacctgga gccgctcatc caggagatag ttcggagaaa catcaccgat 1320
cggatctggc tggccagcga ggcttgggcc agctcttcgc tcattgccaa gccagagtac 1380
ttccacgtgg tggcggcac  catcggcttc gctctcaggg cggggcgtat cccagggttc 1440
aacaagttcc tgaaggaggt ccacccagc  aggtcctcgg acaatgggtt tgtcaaggag 1500
ttctgggagg agaccttcaa ctgctacttc accgagaaga ccctgacgca gctgaagaat 1560
tccaaggtgc cctcgcacgg accggcggct caaggggacg gctccaaggc gggaactcc  1620
agacggacag ccctacgcca ccctgcact  ggggaggaga acatcaccag cgtggagacc 1680
ccctacctgg attatacaca cctgaggatc tcctacaatg tatacgtggc cgtctactcc 1740
attgctcacg ccctgcaaga catccactct tgcaaaccg  gcacgggcat ctttgcaaac 1800
ggatcttgtg cagatattaa aaaagttgag gcctggcagg tcctcaacca tctgctgcat 1860
ctgaagttta ccaacagcat gggtgagcag gttgactttg acgatcaagg tgacctcaag 1920
gggaactaca ccattatcaa ctggcagctc tccgcagagg atgaatcggt gttgttccat 1980
gaggtgggca actacaacgc ctacgctaag cccagtgacc gactcaacat caacgaaaag 2040
aaaatcctct ggagtggctc ctccaaagtg gttcctttct ccaactgcag tcgagactgt 2100
gtgccgggca ccaggaaggg gatcatcgag ggggagccca cctgctgctt tgaatgcatg 2160
gcatgtgcag agggagagtt cagtgatgaa aacgatgcaa gtgcgtgtac aaagtgcccg 2220
aatgattct  ggtcgaatga gaaccacacg tcgtgcatcg ccaaggagat cgagtacctg 2280
tcgtggacgg agcccttcgg gatcgctctg accatcttcg ccgtactggg catcctgatc 2340
acctccttcg tgctgggggt cttcatcaag ttcaggaaca ctcccatcgt gaaggccacc 2400
aaccgggagt tgtcctacct gctgctcttc tccctcatct gctgcttctc cagctcgctc 2460
atcttcatcg gcgagcccag ggactggacc tgtcggctcc gcaaccggc  ctttggcatc 2520
agcttcgtcc tgtgcatctc ctgcatcctg gtgaagacca ccgggtgct  gctggtcttc 2580
gaggccaaga tccccaccag cctccaccgc aagtgggtgg gcctcaacct gcagttcctc 2640
ctggtcttcc tctgcatcct ggtgcaaatc gtcacctgca tcatctggct ctacaccgcg 2700
cctccctcca gctacaggaa ccatgagctg gaggacgagg tcatcttcat cacctgcgac 2760
gagggctcgc tcatggcgct gggcttcctc atcggctaca cctgcctcct cgccgccatc 2820
tgcttcttct tcgccttcaa gtcccgtaag ctgccgagaa acttcaacga ggctaagttc 2880
atcaccttca gcatgttgat cttcttcatc gtctggatct cctcatccc  cgcctatgtc 2940
agcacctacg gcaagtttgt gtcggcgtgt gaggtgattg ccatcctggc ctccagcttc 3000
gggctgctgg gctgcattta cttcaacaag tgttacatca tcctgttcaa gccgtgccgt 3060
aacaccatcg aggaggtgcg ctgcagcacg gcggccacg  cctcaaggt ggcggcccgg 3120
gccaccctcc ggcgcagcgc cgcgtctcgc aagcgctcca gcagcctgtg cggctccacc 3180
atctcctcgc ccgcctcgtc cacctgcggg ccgggcctca ccatggagat gcagcgctgc 3240
```

FIG. 22A

```
agcacgcaga aggtcagctt cggcagcggc accgtcaccc tgtcgctcag cttcgaggag 3300
acaggccgat acgccaccct cagccgcacg gcccgcagca ggaactcggc ggatggccgc 3360
agcggcgacg acctgccatc tagacaccac gaccagggcc cgcctcagaa atgcgagccc 3420
cagcccgcca acgatgcccg atacaaggcg gcgccgacca agggcaccct agagtcgccg 3480
ggcggcagca aggagcgccc cacaactatg gaggaaacct aatccaactc ctccatcaac 3540
cccaagaaca tcctccacgg cagcaccgtc gacaactgac atcaactcct aaccggtggc 3600
tgcccaacct ctcccctctc cggcactttg cgttttgctg aagattgcag catctgcagt 3660
tccttttatc cctgattttc tgacttggat atttactagt gtgcgatgga atatcacaac 3720
ataatgagtt gcacaattag gtgagcagag ttgtgtcaaa gtatctgaac tatctgaagt 3780
atctgaacta ctttattctc tcgaattgta ttacaaacat ttgaagtatt tttagtgaca 3840
ttatgttcta acattgtcaa gataatttgt tacaacatat aaggtaccac ctgaagcagt 3900
gactgagatt gccactgtga tgacagaact gttttataac atttatcatt gaaacctgga 3960
ttgcaacagg aatataatga ctgtaacaaa aaaattgttg attatcttaa aaatgcaaat 4020
tgtaatcaga tgtgtaaaat tggtaattac ttctgtacat taaatgcata tttcttgata 4080
aaaaaaaaaa aaaaaaaaaa aaaaaaaaaa aaaaaagcgg cccgacagca acgg         4134
```

FIG. 22B

METHODS FOR RAISING PRE-ADULT ANADROMOUS FISH

BACKGROUND OF THE INVENTION

In nature, many anadromous fish live most of their adulthood in seawater, but swim upstream to freshwater for the purpose of breeding. As a result, anadromous fish hatch from their eggs and are born in freshwater. As these fish grow, they swim downstream and gradually adapt to the seawater.

Fish hatcheries have experienced difficulty in raising these types of fish because the window of time in which the pre-adult fish adapts to seawater (e.g., undergoes smoltification) is short-lived, and can be difficult to pinpoint. As a result, these hatcheries experience significant morbidity and mortality when transferring anadromous fish from freshwater to seawater. Additionally, many of the fish that do survive the transfer from freshwater to seawater are stressed, and consequently, experience decreased feeding, and increased susceptibility to disease. Therefore, these anadromous fish often do not grow well after they are transferred to seawater.

The aquaculture industry loses millions of dollars each year due to problems it encounters in transferring pre-adult anadromous fish from freshwater to seawater. Hence, a need exists to improve methods involved in transferring pre-adult anadromous fish to seawater. A further need exists to increase survival, and reduce stress, of pre-adult anadromous fish that have been transferred to seawater.

SUMMARY OF THE INVENTION

The present invention relates to methods for improving the raising of pre-adult anadromous fish or preparing these fish for transfer to seawater by increasing expression of a receptor, referred to as the Polyvalent Cation Sensing Receptor (PVCR). The expression and/or sensitivity of the PVCR is increased by subjecting the pre-adult anadromous fish to calcium and magnesium. The pre-adult anadromous fish are subjected to the calcium and magnesium when they are added to the freshwater environment. The invention encompasses adding calcium and magnesium to the freshwater, and adding feed for fish consumption to the freshwater. The feed contains sodium chloride (NaCl) in an amount to contribute to a significantly increased level of calcium and/or magnesium in the serum of the pre-adult anadromous fish. Increased expression and/or sensitivity of the PVCR is maintained until the fish are ready to be transferred to seawater. The pre-adult anadromous fish can be maintained in the freshwater having calcium and magnesium until they are ready to be transferred to seawater.

In one embodiment of the invention, pre-adult anadromous fish (e.g., salmon, trout and arctic char) are prepared for transfer from freshwater to seawater by adding calcium and magnesium to the freshwater, and adding feed for fish consumption having between about 1% and about 10% NaCl by weight (e.g. between about 10,000 mg/kg and 100,000 mg/kg) to the freshwater. The amount of calcium added to the freshwater is an amount sufficient to bring the concentration up to between about 2.0 mM and about 10.0 mM, and the amount of magnesium added is an amount sufficient to bring the concentration up to between about 0.5 mM and about 10.0 mM. The present invention also includes, optionally, exposing the pre-adult anadromous fish to a photoperiod. Preferably, the photoperiod is continuous (e.g., for a continuous period of between about 12 hours and about 24 hours in a 24 hour period).

Additional embodiments of the invention include methods of increasing or improving food consumption before and/or after seawater transfer, increasing survival and/or reducing mortality, reducing osmotic damage, transferring parr (e.g., between about 10 and about 60 grams) to seawater, and transferring a pre-adult anadromous fish to seawater having a temperature of about 14° C. to about 19° C. These methods are performed by adding calcium and magnesium to the freshwater, subjecting or exposing the pre-adult anadromous fish to calcium and magnesium, or introducing the pre-adult anadromous fish to freshwater having calcium and magnesium, in amounts sufficient to increase expression and/or sensitivity of the PVCR. The methods also involve adding feed having between about 1% and about 10% NaCl by weight to the freshwater and transferring the pre-adult anadromous fish to seawater.

In other embodiments, the invention encompasses detection assays for diagnostic purposes or methods of determining whether a pre-adult anadromous fish, that are subjected to calcium and magnesium in the freshwater, and are fed with feed having between about 1% and about 10% NaCl by weight, are ready for transfer to seawater, by assessing the amount of PVCR expression in the pre-adult anadromous fish. An increased level of expression and/or sensitivity, as compared to a control (e.g., PVCR expression from a fish not subjected to calcium and magnesium), indicates that the pre-adult anadromous fish are ready for transfer to seawater. In a preferred embodiment, the assay includes contacting an anti-PVCR antibody with a sample (e.g., gill, skin, intestine, urinary bladder, kidney, brain or muscle) under conditions sufficient for the formation of a complex between the antibody and the PVCR; and detecting the formation of the complex. In another embodiment the assay relates to hybridizing a nucleic acid sequence having a detectable label to the nucleic acid sequence of the PVCR of a sample taken from the pre-adult anadromous fish and detecting the hybridization.

In yet another embodiment, the present invention relates to various compositions and mixtures. In particular, the invention pertains to an aquatic food composition having a concentration of NaCl between about 10,000 mg/kg and 100,000 mg/kg (e.g., about 12,000 mg/kg).

The invention also embodies an aquatic mixture for providing an environment to improve the raising of pre-adult anadromous fish. The mixture includes calcium and magnesium. An example of such a mixture is a calcium source, that when added to freshwater, provides a concentration of between about 2.0 mM and about 10.0 mM; and a magnesium source, that when added to freshwater, provides a concentration of between about 0.5 mM and 10.0 mM.

In yet another embodiment, the present invention relates to kits. In particular, the invention embodies kits for improving the raising of pre-adult anadromous fish, that includes calcium and magnesium for addition to the freshwater and an aquatic food composition, as described herein. In another embodiment, the invention includes kits for determining whether a pre-adult anadromous fish are ready for transfer to seawater, after being subjected to calcium and magnesium in freshwater, and feed having between about 1% and about 10% NaCl by weight. The kit includes either an anti-PVCR antibody, and a solid support; or a nucleic acid sequence having a detectable label that can hybridize to nucleic acid of an aquatic PVCR.

Surprisingly, it has been discovered that increased expression and/or altering the sensitivity of the PVCR allows these pre-adult anadromous fish to better adapt to seawater. Until the discovery of the present invention, the aquaculture industry was unable to transfer the pre-adult anadromous fish to seawater without subjecting the fish to stress, death and/or disease. Unlike this practice, carrying out the steps of the invention increases the expression and/or alters the sensitivity of the PVCR and allows for transfer of the pre-adult anadromous fish to seawater with minimal or no stress, death and/or disease, and unexpectedly provides several benefits, such as the ability to transfer these fish to water having higher temperatures, as further described herein. The present invention results in one or more of the following advantages in transferring pre-adult anadromous fish to seawater: a reduction in mortality; improvement in feeding; a decrease in the amount of diseased fish; and/or a reduction in osmotic shock. The present invention also allows for earlier harvesting of the fish with increased flexibility in producing fish year round. Additionally, the methods of the present invention can result in significant cost savings for fish hatcheries.

BRIEF DESCRIPTION OF THE DRAWINGS

FIG. 1 is a diagram illustrating the partial nucleotide (SEQ ID NO:1) and amino acid (SEQ ID NO:2) sequences of the polyvalent cation-sensing receptor (PVCR) of Atlantic salmon (Salmo salar).

FIG. 2 is a diagram illustrating the partial nucleotide (SEQ ID NO:3) and amino acid (SEQ ID NO:4) sequences of the PVCR of arctic char (Salvelinus alpinus).

FIG. 3 is a diagram illustrating the partial nucleotide (SEQ ID NO:5) and amino acid (SEQ ID NO:6) sequences of the PVCR of rainbow trout (Onchorhynchus mykiss).

FIGS. 4A–B are diagrams illustrating the alignment of the amino acids sequences for shark kidney cation receptor ("SKCaR") (SEQ ID NO:18), salmon (SEQ ID NO:2), arctic char (SEQ ID NO:4) and rainbow trout (SEQ ID NO:6).

FIGS. 20A–C are an alignment illustrating nucleic acid sequences for the PVCR of Atlantic Salmon (SEQ ID NO.: 1), Char (SEQ ID NO.: 3), Chum Salmon (SEQ ID NO.:7), Coho Salmon (SEQ ID NO.:9), King Salmon (SEQ ID NO.:11), Pink Salmon (SEQ ID NO.:13 ), Sockeye Salmon (SEQ ID NO.:15) and Trout (SEQ ID NO.: 5).

FIGS. 21 A–B are an alignment illustrating the open reading frame of the polypeptide sequences for the PVCR of Atlantic Salmon (SEQ ID NO.: 2), Char (SEQ ID NO.: 4), Chum Salmon (SEQ ID NO.: 8), Coho Salmon (SEQ ID NO.: 10), King Salmon (SEQ ID NO.: 12), Pink Salmon (SEQ ID NO.: 14), Sockeye Salmon (SEQ ID NO.: 16) and Trout (SEQ ID NO.: 6).

FIGS. 22A–B are a diagram illustrating the nucleic acid sequence of SKCaR (SEQ ID NO.: 17).

DETAILED DESCRIPTION OF THE INVENTION

Figure 5:
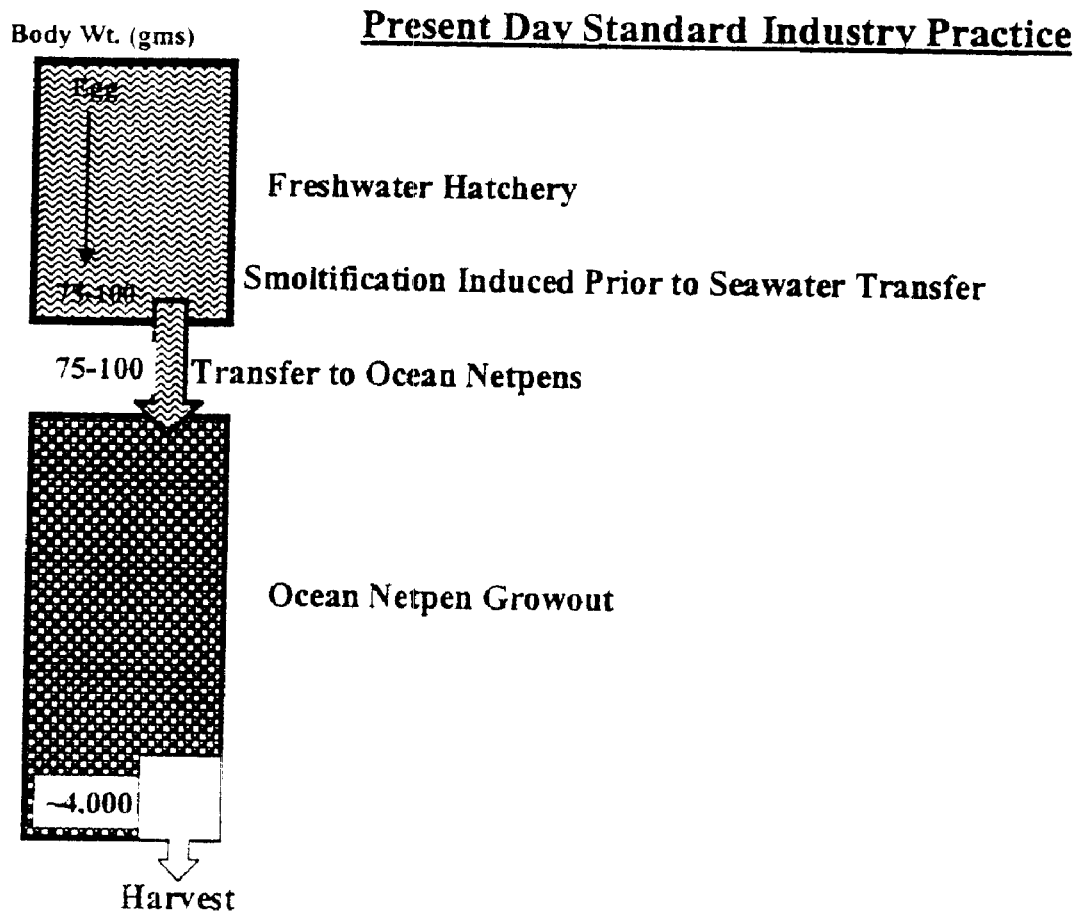
FIG. 5 is a schematic diagram illustrating industry practice for salmon aquaculture production, prior to the discovery of the present invention. The diagram depicts key steps in salmon production for S0 (75 gram) and S1 (100 gram) smolts. The wavy symbol indicates freshwater while the bubbles indicate seawater.

The present invention relates to methods for improving the raising of pre-adult anadromous fish and/or methods for preparing pre-adult anadromous fish for transfer from freshwater to seawater. The methods involve increasing expression and/or altering the sensitivity of a Polyvalent Cation Sensing Receptor (PVCR) (e.g., at least one PVCR). The invention relates to increasing expression of the PVCR that affects the fish's ability to adapt to seawater (e.g., to smolt), to undergo smoltification, to survive, to increase food consumption, and/or to be less susceptible to disease.

In particular, the methods of the present invention include adding modulators of the PVCR, calcium and magnesium to the freshwater, and adding a specially made or modified feed to the freshwater for consumption by the fish. The feed contains a sufficient amount of sodium chloride (NaCl) (e.g., between about 1% and about 10% by weight, or about 10,000 mg/kg to about 100,000 mg/kg) to significantly increase levels of calcium and/or magnesium in the serum. This amount of NaCl in the feed causes or induces the pre-adult anadromous fish to drink more freshwater. Since the freshwater contains magnesium and calcium, PVCR modulators, and the fish ingest increased amounts of it, the serum level of magnesium and/or calcium significantly increases in the fish, and causes increased PVCR expression and/or altered PVCR sensitivity. This process allows the pre-adult anadromous fish to be "pre-conditioned" and better adapt to seawater.

The methods of the present invention pertain to adapting pre-adult anadromous fish to seawater. Anadromous fish are fish that swim from seawater to freshwater to breed. Anadromous fish include, for example, salmon (e.g, Atlantic Salmon (*Salmo salar*), Coho Salmon (*Oncorhynchus kisutch*), Chinook Salmon (*Oncorhynchus tshawytscha*), Chum Salmon (*Oncorhynchus keta*), Pink Salmon (*Oncorhynchus gorbuscha*)), char (e.g., Arctic Char (*Salveninus alpinus*)) and trout (e.g., Rainbow Trout (*Oncorhynchus mykiss*)). Anadromous fish also include fish that are unable to swim to seawater (e.g., landlocked), but have the physiological mechanisms to adapt to seawater. The term "pre-adult anadromous fish," as used herein, refers to anadromous fish that have not yet adapted to seawater. These fish are generally juvenile fish. Pre-adult anadromous fish include, but are not limited to fish that are fingerlings, parr or smolts. As used herein, a "smolt" is a fish undergoing physiological changes that allows the fish to adapt to seawater, or survive upon subsequent transfer to seawater. The term, "smolt," also refers to a fish that is not at the precise developmental stage to survive uninjured upon transfer to seawater, but rather is one of a population of fish wherein, based on a statistical sampling and evaluation, the population of fish is determined to be at a physiological stage ready for transfer to seawater.

The present invention includes methods for preparing pre-adult anadromous fish undergoing the process of smoltification for transfer to seawater. Smoltification is the stage at which a fish undergoes the acclimation or adaptation from freshwater to seawater. Smoltification also refers to a process occurring in pre-adult anadromous fish that is physiological pre-adaption to seawater while still in freshwater. The smolification process varies from species to species. Different species of anadromous fish can undergo smoltification at different sizes, weights, and times in the life of the fish. The present invention induces the vast majority or all of the pre-adult anadromous fish to undergo this process and be prepared for transfer to seawater.

The pre-adult anadromous fish are maintained in freshwater prior to adding PVCR modulators (e.g., calcium and magnesium). The term, "freshwater," means water that comes from, for example, a stream, river, ponds, public water supply, or from other non-marine sources having, for example, the following ionic composition: less than about 2 mM of magnesium, calcium and NaCl. The term "freshwater" also refers to freshwater to which magnesium and calcium have been added, as described herein.

The PVCR modulators are added to the freshwater in sufficient amounts to increase expression or alter the sensitivity of the PVCR. A PVCR has been isolated from various tissue of several types of anadromous fish using molecular biology techniques, as described in Example 9. DNA was isolated from muscle samples from various species of anadromous fish including Atlantic Salmon, Char, Chum Salmon, Coho Salmon, King or Chinook Salmon, Pink Salmon, Sockeye Salmon and Trout. The DNA was amplified using polymerase Chain Reaction (PCR) methodology. The amplified DNA was purified and subcloned into vectors, and their sequences were determined, as described in Example 9.

The PVCR, which is located in various tissues (e.g., gill, skin, intestine, kidney, urinary bladder, brain or muscle) of the pre-adult anadromous fish, senses alterations in the PVCR modulators including various ions (e.g., divalent cations), for example, in the surrounding water, in their serum or in the luminal contents of tubules inside the body, such as kidney, urinary bladder, or intestine. Its ability to sense these modulators increases expression of the PVCR, thereby allowing the fish to better adapt to seawater. Increased expression of the PVCR can occur, for example, in one or all tissues.

A "PVCR modulator" is defined herein to mean a compound which increases expression of the PVCR, or increases the sensitivity or responsiveness of the PVCR. Such compounds include, but are not limited to, polycations and compounds that indirectly alter PVCR expression. Examples of polycations are divalent cations including calcium at a concentration between about 2.0 and about 10.0 mM and magnesium at a concentration between about 0.5 and about 10.0 mM. The molar concentrations refer to free or ionized concentrations of calcium or magnesium in the freshwater, and does not include amounts of bound calcium or magnesium (e.g., PVCR modulator bound to negatively charged particles including glass, proteins, or plastic surfaces).

The PVCR modulators can be administered to the fish in a number of ways. The invention encompasses administration of the PVCR in any way that is sufficient to increase the expression and/or alter the sensitivity of the PVCR. In one embodiment, the PVCR modulator is simply added to the freshwater in various concentrations, as described herein. A freshwater environment having the PVCR modulators (e.g., calcium and magnesium) is referred to herein as a "PVCR modulator environment." PVCR modulators that are added to the water increase expression and/or alter the sensitivity of the PVCR on the skin and gills of the fish.

In one preferred embodiment, the present invention is practiced by adding a combination of two PVCR agonists to the freshwater. In particular, calcium and magnesium are added to the freshwater to bring the concentrations of each to between about 2.0 mM and about 10.0 mM of calcium, and between about 0.5 mM and about 10.0 mM of magnesium. In addition to adding calcium and magnesium to the water, these ranges of ion concentrations can be achieved by providing a brackish water (e.g., diluted seawater) environment for the fish.

Calcium and magnesium can come from a variety of sources, that when added to the water, the calcium and/or magnesium levels increase expression of the PVCR, and/or are within the stated ranges. Sources of calcium and magnesium can be a mixture of a variety of compounds, or each can come from a substantially uniform or pure compound. Sources of calcium include, for example, $Ca(CO_3)_2$, $CaCl_2$, $CaSO_4$, and $Ca(OH)_2$ and sources of magnesium include, for example, $MgCl_2$, $MgSO_4$, $MgBr_2$, and $MgCO_3$.

In one embodiment, the invention includes intermittent (e.g., interrupted) as well as continuous (e.g., non-interrupted) exposure to freshwater having the PVCR modulator, while on the NaCl diet. Intermittent exposure to the PVCR modulators can occur so long as the PVCR expression and/or altered sensitivity remains increased. Continuous maintenance in or exposure to freshwater having the PVCR modulators is shown in Examples 2 and 7.

The process of the present invention pre-conditions the fish and prepares them for transfer. The pre-adult anadromous fish are maintained in a freshwater environment having the PVCR modulators long enough to increase the expression and/or alter sensitivity of the PVCR. The length of time depends on the physiological and physical maturity of the fish. Some fish will more readily adapt to the environment, and increase their expression and/or alter the sensitivity of their PVCR, while others will need more time to do so. Factors that can influence the length of time necessary to increase the expression and/or alter sensitivity of the PVCR include, but are not limited to, size of the fish, level of PVCR expression or sensitivity, if any, prior to addition of the PVCR modulators to the freshwater, the fish's ability to excrete the PVCR modulators and ions, the fish's surface to volume ratio, etc. Therefore, the length of time the fish is maintained can range from about 7 days to several months (e.g., 7, 14, 21, 30, 45, 90 and 120 days). The fish can also be maintained indefinitely so long as the fish are maintained in freshwater having the PVCR modulators and being fed a NaCl diet. For example, salmon, trout or char weighing less than 10 gms can be maintained in freshwater having calcium and magnesium, and fed a NaCl diet for at least about 180 days, prior to transfer to seawater.

The invention further includes adding feed to the freshwater. The frequency and amounts of feed that fish are fed, are taught in the art. Generally, the fish are fed 1–3 times a day, totaling about 0.25–5.0% body weight/day. The feed has enough NaCl to contribute to a significant increased level of the PVCR modulator in the serum of the pre-adult anadromous fish. More specifically, NaCl has at least two effects. The first occurs when sufficient amounts of NaCl is present in the feed. The presence of NaCl in the feed causes the pre-adult anadromous fish to drink more water from the surrounding environment. Second, NaCl is a direct negative PVCR modulator, and works to decreases PVCR sensitivity. Despite NaCl's effect in decreasing sensitivity, it surprisingly increases PVCR expression when fish are fed a NaCl diet and the surrounding freshwater environment has at least one PVCR modulator it in. The increase in the ingestion of freshwater having PVCR modulators causes an overall increase of the serum levels of the PVCR modulators.

The present invention also relates to an aquatic food composition. The feed contains between about 1%–10% of NaCl by weight, or between about 10,000 mg of NaCl/kg of feed and about 100,000 mg of NaCl/kg of feed (e.g., 12,000 mg/kg). Feed having NaCl is referred to herein as a "NaCl diet." The NaCl can be combined with other sodium salts to confer the desired effect of increasing PVCR expression, altering PVCR sensitivity and/or inducing the fish to drink more. Hence, as used herein, the term NaCl, includes a substantially pure compound, and mixtures of NaCl with other sources of sodium.

The feed can be made in a number of ways, so long as the proper concentration of NaCl is present. The feed can be made, for example, by reformulating the feed, or by allowing the feed to absorb a solution having the NaCl. A top dressing can be added for palatability. Example 8 describes in detail one way to make the feed.

Another embodiment of the present invention includes feeding pre-adult anadromous fish feed having between 1% and 10% NaCl by weight, when the fish are maintained in a freshwater environment having between about 2.0 and about 10.0 mM of calcium, and between about 0.5 mM and about 10.0 mM of magnesium. When this embodiment of the present invention is carried out, the levels of calcium, magnesium and/or sodium in the serum of the pre-adult anadromous fish increases, as compared to identically paired fish maintained in freshwater, between about 1% and 60%, between about 1% and 40%, and between about 1% and 15 %, respectively.

In another embodiment, the fish, while in the freshwater having the PVCR modulator, are also exposed to a photoperiod. A photoperiod refers to exposing the fish to light (e.g., sunlight, incandescent light or fluorescent light). Preferably, the photoperiod is substantially continuous, or occurs long enough to increase growth and/or induce smoltification. The photoperiod can occur for at least about 12 hours within a 24 hour interval, or for longer periods such as about 14, 16, 18, 20, 22 or preferably, about 24 hours.

After being exposed to the steps of the present invention, the pre-adult anadromous fish are transferred to seawater. The term, "seawater," means water that comes from the sea, or water which has been formulated to simulate the chemical and mineral composition of water from the sea. The major elemental composition of the prepared seawater preferably falls substantially within the range of the major elemental composition of the natural seawater (e.g., having the following ionic composition: greater than 30 mM of magnesium, greater than about 6 mM of calcium, and greater than about 300 mM NaCl). Methods of preparing artificial seawater are known in the art and are described in, for instance, U.S. Pat. No. 5,351,651.

When performing the methods of the present invention on pre-adult anadromous fish, the fish exhibit significant in food consumption, as compared to pre-adult anadromous fish that are not subjected to the present invention. Upon transfer to seawater, fish that are not subjected to the steps of the present invention generally experience osmotic stress, reduced or no food consumption, and even death. Osmotic stress results from differences in the osmotic pressure between the surrounding environment and body compartments of the fish. This disturbs the homeostatic equilibrium of the fish and results in decreased growth, reproductive failure and reduced resistance to disease. The fish that have been preconditioned by the steps of the present invention do not experience a significant amount of osmotic stress, and begin feeding on or soon after transfer to seawater. Elimination of low feeding or poorly feeding osmotically stressed fish in a group improves the overall feed conversion ratio of the entire group. Optimal feeding after seawater transfer by all members of the group of pre-conditioned fish permits better feed utilization and improve the overall yield of production when fish reach market size.

Similarly, the present invention allows for decreasing or reducing the time between generations of pre-adult anadromous fish. These fish begin breeding earlier because the present invention allows the fish to reach sexual maturity earlier, as described herein. Since 2–3 years are required to obtain sexually mature fish, attempts to engage in selective breeding of traits requires this 2–3 year interval before a given trait can be selected for and the fish exhibit that trait breed. Improvements in the time to reach sexual maturity produced by the invention occur. The time interval required to reach sexual maturity in fish is reduced by as much as about 6 months to about 12 months. Reducing the interval for breeding allows for the production of more fish, and the improved selection of fish that possess traits other than those that are better able to adapt to seawater (e.g., select for fish that have improved taste, increased filet thickness, increased α3 omega fatty acid content, or fish that are more readily able to increase PVCR expression).

Prior to the present invention, anadromous fish that are transferred from freshwater to seawater are generally transferred at a particular size, referred to as "critical size." The critical size varies from species to species, but generally refers to a minimum size at which a fish can be transferred to seawater. The critical size for salmon, trout and char is between about 50 and about 100 gms, between about 70 and about 120 gms, and greater than 100 gms, respectively. Critical sizes for Coho, King, and Sockeye Salmon are between about 10 and about 15 gms, between about 20 and 40 gms and between about 1 and about 2 gms, respectively. Chum and Pink Salmon each have a critical size about less than 3 gms.

Prior to the invention, a population of pre-adult anadromous fish having attained a mean critical size were transferred to seawater. Some of the fish are physiologically ready for the transfer, while others are not. This is one of the reasons for the increased mortality rate upon transfer to seawater. The methods of the present invention physiologically prepares all or mostly all of the fish for transfer to seawater by increasing PVCR expression and/or sensitivity, and/or by inducing smoltification. Greater than about 80% (e.g., 90%, 95%, 100%) undergo smoltification and are ready for transfer to seawater. In fact, in one experiment, when performing the steps of the present invention on Atlantic Salmon (e.g., subjecting the fish to a PVCR modulator environment and a NaCl diet), close to 100% of the Atlantic Salmon underwent smoltification. See Example 2. Hence, the methods of the present invention include methods of preparing pre-adult anadromous fish for transfer to seawater, as well as inducing smotification in pre-adult anadromous fish.

Since the methods of the present invention increase the expression and/or sensitivity of the PVCR in pre-adult anadromous fish, they survive better when transferred to seawater. The reduced osmotic stress results in reduced mortality. In one case, certain populations of pre-adult anadromous fish that did not undergo the methods of the present invention exhibit a 100% mortality rate after transfer to seawater (see FIG. 9, Example 2), while other populations of pre-adult anadromous fish that did not undergo the methods of the invention have survival rates of only between about 40% and 70%. See Table I, Example 2. This occurs because the fish experience osmotic shock when transferred to seawater which has a very different ionic composition than freshwater. However, when preconditioned by the methods of the present invention, the fish exhibit a survival rate that is significantly greater than the rate for unconditioned fish (e.g.,between about 80% about 100%). In fact, when performing the present invention on Atlantic Salmon, 99% of the fish survived transfer to seawater after 5 days, as compared to 33% of fish that did not undergo the steps of the present invention in one experiment. See Table I of Example 2. Hence, the present invention embodies methods of reducing the mortality rate after pre-adult anadromous fish are transferred to seawater.

Not only is the present invention useful in reducing mortality rates after transfer to seawater, the present invention is also used to increase survival rates in freshwater prior to transfer. Prior to the discovery of the present invention, a "smolt window" existed in which the hatcheries transferred the pre-adult anadromous fish to seawater, or else the fish will die if they continue to remain in freshwater after they undergo smoltification. The PVCR modulator environment and the NaCl diet of the present invention allow the fish to continue to thrive indefinitely. The fish continue to consume feed and thrive. When the present invention was performed on Atlantic Salmon, 99% of the fish survived and thrived for at least 45 days in freshwater. In contrast, only 67% of the fish that did not undergo the steps of the invention survived after 45 days in freshwater in one experiment. See Example 2.

The present invention also includes methods for transferring to seawater pre-adult anadromous fish having smaller weights, as compared to the industry recognized critical size for the particular species of fish. The methods of the present invention, as described herein, increase PVCR expression in fish that are smaller than those normally transferred to seawater, or those undergoing or about to undergo smoltification. These methods include transferring a parr, the stage of a juvenile fish prior to becoming a smolt, to seawater. Parr is a life stage of pre-adult anadromous fish that occurs after maturation of alevins or yolk sac fry. Parr or fingerlings display characteristic ovid stripes or parr marks along their flanks, and normally undergo growth and development in freshwater prior to smoltification. The term "parr" is a term that is known in the art. As yolk sac fry continue to feed, they grow into larger parr. Parr can possess a wide range of body weights depending on conditions under which they are grown. The weights of parr vary from species to species. Body weights for parr vary significantly with a range from about 0.5 gms to about 70 gms. Carrying out the present invention in one experiment, as described herein, results in a transfer of Atlantic Salmon parr weighing as little as between about 27% and about 38% of the critical size weight (between about 70 and about 100 gms). See Example 2.

The present invention additionally provides methods for transferring pre-adult anadromous fish into seawater having warmer temperatures (e.g., 14° C. and 19° C.), as compared to water temperatures into which these fish have been transferred in the past. Since the fish experience reduced or little osmotic stress when transferred to seawater using the methods of the present invention, the fish are able to withstand transfer into higher water temperatures without exhibiting an increase in mortality rates. See Example 2.

The methods of the present invention also decrease the incidence of disease among the smolts and the growing salmon. Because smolts treated with the methods of the present invention experience less stress upon transfer to seawater, their immune functions are stronger, and they are less susceptible to parasitic, viral, bacterial and fungal diseases. Fish not treated with the methods described herein are more susceptible to such diseases, and can serve as reservoirs of disease, capable of infecting healthy fish.

Methods Assessment of the PVCR

The present invention includes methods of detecting the level of the PVCR to determine whether fish are ready for transfer from freshwater to seawater. Methods that measure PVCR levels include several suitable assays. Suitable assays encompass immunological methods, such as FACS analysis, radioimmunoassay, flow cytometry, enzyme-linked immunosorbent assays (ELISA) and chemiluminescence assays. Any method known now or developed later can be used for measuring PVCR expression.

Antibodies reactive with the PVCR or portions thereof can be used. In a preferred embodiment, the antibodies specifically bind with the PVCR or a portion thereof. The antibodies can be polyclonal or monoclonal, and the term antibody is intended to encompass polyclonal and monoclonal antibodies, and functional fragments thereof. The terms polyclonal and monoclonal refer to the degree of homogeneity of an antibody preparation, and are not intended to be limited to particular methods of production.

In several of the preferred embodiments, immunological techniques detect PVCR levels by means of an anti-PVCR antibody (i.e., one or more antibodies). The term "anti- PVCR" antibody includes monoclonal and/or polyclonal antibodies, and mixtures thereof.

Anti-PVCR antibodies can be raised against appropriate immunogens, such as isolated and/or recombinant PVCR or portion thereof (including synthetic molecules, such as synthetic peptides). In one embodiment, antibodies are raised against an isolated and/or recombinant PVCR or portion thereof (e.g., a peptide) or against a host cell which expresses recombinant PVC R. In addition, cells expressing recombinant PVCR, such as transfected cells, can be used as immunogens or in a screen for antibody which binds receptor.

Any suitable technique can prepare the immunizing antigen and produce polyclonal or monoclonal antibodies. The art contains a variety of these methods (see e.g., Kohler et al., Nature, 256: 495–497 (1975) and Eur. J. Immunol. 6: 511–519 (1976); Milstein et al., Nature 266: 550–552 (1977); Koprowski et al., U.S. Pat. No. 4,172,124; Harlow, E. and D. Lane, 1988, Antibodies: A Laboratory Manual, (Cold Spring Harbor Laboratory: Cold Spring Harbor, N.Y.); Current Protocols In Molecular Biology, Vol. 2 (Supplement 27, Summer '94), Ausubel, F. M. et al., Eds., (John Wiley & Sons: New York, N.Y.), Chapter 11, (1991)). Generally, fusing a suitable immortal or myeloma cell line, such as SP2/0, with antibody producing cells can produce a hybridoma. Animals immunized with the antigen of interest provide the antibody producing cell, preferably cells from the spleen or lymph nodes. Selective culture conditions isolate antibody producing hybridoma cells while limiting dilution techniques produce them. Researchers can use suitable assays such as ELISA to select antibody producing cells with the desired specificity.

Other suitable methods can produce or isolate antibodies of the requisite specificity. Examples of other methods include selecting recombinant antibody from a library or relying upon immunization of animals such as mice.

According to the method, an assay can determine the level of PVCR in a biological sample. In determining the amounts of PVCR, an assay includes combining the sample to be tested with an antibody having specificity for the PVCR, under conditions suitable for formation of a complex between antibody and the PVCR, and detecting or measuring (directly or indirectly) the formation of a complex. The sample can be obtained directly or indirectly, and can be prepared by a method suitable for the particular sample and assay format selected.

In particular, tissue samples, e.g., gill tissue samples, can be taken from fish after they are anaesthetized with MS-222. The tissue samples are fixed by immersion in 2% paraformaldehyde in appropriate Ringers solution corresponding to the osmolality of the fish, washed in Ringers, then frozen in an embedding compound, e.g., O.C.T.™ (Miles, Inc., Elkahart, Ind., USA) using methylbutane cooled with liquid nitrogen. After cutting 8–10 $\mu$ tissue sections with a cryostat, individual sections are subjected to various staining protocols. For example, sections are: 1) blocked with goat serum or serum obtained from the same species of fish, 2) incubated with rabbit anti-CaR or anti-PVCR antiserum, and 3) washed and incubated with peroxidase-conjugated affinity-purified goat antirabbit antiserum. The locations of the bound peroxidase-conjugated goat antirabbit antiserum are then visualized by development of a rose-colored aminoethylcarbazole reaction product. Individual sections are mounted, viewed and photographed by standard light microscopy techniques. The anti-CaR antiserum used to detect fish PVCR protein is raised in rabbits using a 23-mer peptide corresponding to amino acids numbers 214–236 localized in the extracellular domain of the RaKCaR protein. The sequence of the 23-mer peptide is: ADDDYGRPGIEK-FREEAEERDIC (SEQ ID NO.: 19) A small peptide with the sequence DDYGRPGIEKFREEAEERDICI (SEQ ID NO.: 20) or ARSRNSADGRSGDDLPC (SEQ ID NO.: 21) can also be used to make antisera containing antibodies to PVCRs. Such antibodies can be monoclonal, polyclonal or chimeric.

Suitable labels can be detected directly, such as radioactive, fluorescent or chemiluminescent labels. They can also be indirectly detected using labels such as enzyme labels and other antigenic or specific binding partners like biotin. Examples of such labels include fluorescent labels such as fluorescein, rhodamine, chemiluminescent labels such as luciferase, radioisotope labels such as 32P, 125I, 131I, enzyme labels such as horseradish peroxidase, and alkaline phosphatase, β-galactosidase, biotin, avidin, spin labels and the like. The detection of antibodies in a complex can also be done immunologically with a second antibody which is then detected (e.g., by means of a label). Conventional methods or other suitable methods can directly or indirectly label an antibody.

In performing the method, the levels of the PVCR that are distinct from the control. Increased levels or the presence of PVCR expression, as compared to a control, indicate that the fish or the population of fish from which a statistically significant amount of fish were tested, are ready for transfer to freshwater. A control refers to a level of PVCR, if any, from a fish that is not subjected to the steps of the present invention, e.g., not subjected to freshwater having a PVCR modulator and/or not fed a NaCl diet. For example, FIGS. 10 and 15 show that fish not subjected to the present invention had no detectable PVCR level, whereas fish that were subjected to the steps of the invention had PVCR levels that were easily detected.

The PVCRs can also be assayed by Northern blot analysis of mRNA from tissue samples. Northern blot analysis from various shark tissues has revealed that the highest degree of PVCRs expression is in gill tissue, followed by the kidney and the rectal gland. There appear to be at least three distinct mRNA species of about 7 kb, 4.2 kb and 2.6 kb.

The PVCRs can also be assayed by hybridization, e.g., by hybridizing one of the PVCR sequences provided herein (e.g., SEQ ID NO: 1,3,5,7,9,11,13,15) or an oligonucleotide derived from one of the sequences, to a DNA-containing tissue sample from a fish. Such a hybridization sequence can have a detectable label, e.g., radioactive, fluorescent, etc., attached, to allow to detection of hybridization product. Methods for hybridization are well known, and such methods are provided in U.S. Pat. No. 5,837,490, by Jacobs et al, the entire teachings of which are herein incorporated by reference in their entirety. The design of the oligonucleotide probe should preferably follow these parameters: (a) it should be designed to an area of the sequence which has the fewest ambiguous bases ("N's"), if any, and (b) it should be designed to have a $T_m$ of approx. 80° C. (assuming 2° C. for each A or T and 4 degrees for each G or C).

Stringency conditions for hybridization refers to conditions of temperature and buffer composition which permit hybridization of a first nucleic acid sequence to a second nucleic acid sequence, wherein the conditions determine the degree of identity between those sequences which hybridize to each other. Therefore, "high stringency conditions" are those conditions wherein only nucleic acid sequences which are very similar to each other will hybridize. The sequences can be less similar to each other if they hybridize under moderate stringency conditions. Still less similarity is needed for two sequences to hybridize under low stringency conditions. By varying the hybridization conditions from a stringency level at which no hybridization occurs, to a level at which hybridization is first observed, conditions can be determined at which a given sequence will hybridize to those sequences that are most similar to it. The precise conditions determining the stringency of a particular hybridization include not only the ionic strength, temperature, and the concentration of destabilizing agents such as formamide, but also on factors such as the length of the nucleic acid sequences, their base composition, the percent of mismatched base pairs between the two sequences, and the frequency of occurrence of subsets of the sequences (e.g., small stretches of repeats) within other non-identical sequences. Washing is the step in which conditions are set so as to determine a minimum level of similarity between the sequences hybridizing with each other. Generally, from the lowest temperature at which only homologous hybridization occurs, a 1% mismatch between two sequences results in a 1° C. decrease in the melting temperature ($T_m$) for any chosen SSC concentration. Generally, a doubling of the concentration of SSC results in an increase in the $T_m$ of about 17° C. Using these guidelines, the washing temperature can be determined empirically, depending on the level of mismatch sought. Hybridization and wash conditions are explained in *Current Protocols in Molecular Biology* (Ausubel, F. M. et al., eds., John Wiley & Sons, Inc., 1995, with supplemental updates) on pages 2.10.1 to 2.10.16, and 6.3.1 to 6.3.6.

High stringency conditions can employ hybridization at either (1) 1×SSC (10×SSC=3 M NaCl, 0.3 M Na$_3$-citrate.2H$_2$O (88 g/liter), pH to 7.0 with 1 M HCl), 1% SDS (sodium dodecyl sulfate), 0.1–2 mg/ml denatured calf thymus DNA at 65° C., (2) 1×SSC, 50% formamide, 1% SDS, 0.1–2 mg/ml denatured calf thymus DNA at 42° C., (3) 1% bovine serum albumen (fraction V), 1 mM Na2.EDTA, 0.5 M NaHPO$_4$ (pH 7.2) (1 M NaHPO$_4$=134 g Na$_2$HPO$_4$.7H$_2$O, 4 ml 85% H$_3$PO$_4$ per liter), 7% SDS, 0.1–2 mg/ml denatured calf thymus DNA at 65° C., (4) 50% formamide, 5×SSC, 0.02 M Tris-HCl (pH 7.6), 1×Denhardt's solution (100×=10 g Ficoll 400, 10 g polyvinylpyrrolidone, 10 g bovine serum albumin (fraction V), water to 500 ml), 10% dextran sulfate, 1% SDS, 0.1–2 mg/ml denatured calf thymus DNA at 42° C., (5) 5×SSC, 5×Denhardt's solution, 1% SDS, 100 µg/ml denatured calf thymus DNA at 65° C., or (6) 5×SSC, 5×Denhardt's solution, 50% formamide, 1% SDS, 100 µg/ml denatured calf thymus DNA at 42° C., with high stringency washes of either (1) 0.3–0.1×SSC, 0.1% SDS at 65° C., or (2) 1 mM Na$_2$EDTA, 40 mM NaHPO$_4$ (pH 7.2), 1% SDS at 65° C. The above conditions are intended to be used for DNA-DNA hybrids of 50 base pairs or longer. Where the hybrid is believed to be less than 18 base pairs in length, the hybridization and wash temperatures should be 5–10° C. below that of the calculated $T_m$ of the hybrid, where $T_m$ in ° C.=(2×the number of A and T bases)+(4×the number of G and C bases). For hybrids believed to be about 18 to about 49 base pairs in length, the $T_m$ in ° C.=(81.5° C.+16.6(log$_{10}$M)+0.41(% G+C)−0.61 (% formamide)−500/L), where "M" is the molarity of monovalent cations (e.g., Na$^+$), and "L" is the length of the hybrid in base pairs.

Moderate stringency conditions can employ hybridization at either (1) 4×SSC, (10×SSC=3 M NaCl, 0.3 M Na$_3$-citrate.2H$_2$O (88 g/liter), pH to 7.0 with 1 M HCl), 1% SDS (sodium dodecyl sulfate), 0.1–2 mg/ml denatured calf thymus DNA at 65° C., (2) 4×SSC, 50% formamide, 1% SDS, 0.1–2 mg/ml denatured calf thymus DNA at 42° C., (3) 1% bovine serum albumen (fraction V), 1 mM Na$_2$.EDTA, 0.5 M NaHPO$_4$ (pH 7.2) (1 M NaHPO$_4$=134 g Na$_2$HPO$_4$.7H$_2$O, 4 ml 85% H$_3$PO$_4$ per liter), 7% SDS, 0.1–2 mg/ml denatured calf thymus DNA at 65° C., (4) 50% formamide, 5×SSC, 0.02 M Tris-HCl (pH 7.6), 1×Denhardt's solution (100×=10 g Ficoll 400, 10 g polyvinylpyrrolidone, 10 g bovine serum albumin (fraction V), water to 500 ml), 10% dextran sulfate, 1% SDS, 0.1–2 mg/ml denatured calf thymus DNA at 42° C., (5) 5×SSC, 5×Denhardt's solution, 1% SDS, 100 µg/ml denatured calf thymus DNA at 65° C., or (6) 5×SSC, 5×Denhardt's solution, 50% formamide, 1% SDS, 100 µg/ml denatured calf thymus DNA at 42° C., with moderate stringency washes of 1×SSC, 0.1% SDS at 65° C. The above conditions are intended to be used for DNA-DNA hybrids of 50 base pairs or longer. Where the hybrid is believed to be less than 18 base pairs in length, the hybridization and wash temperatures should be 5–10° C. below that of the calculated $T_m$ of the hybrid, where $T_m$ in ° C.=(2×the number of A and T bases)+(4×the number of G and C bases). For hybrids believed to be about 18 to about 49 base pairs in length, the $T_m$ in ° C.=(81.5° C.+16.6(log$_{10}$M)+0.41(% G+C)−0.61 (% formamide)−500/L), where "M" is the molarity of monovalent cations (e.g., Na$^+$), and "L" is the length of the hybrid in base pairs.

Low stringency conditions can employ hybridization at either (1) 4×SSC, (10×SSC=3 M NaCl, 0.3 M Na$_3$-citrate.2H$_2$O (88 g/liter), pH to 7.0 with 1 M HCl), 1% SDS (sodium dodecyl sulfate), 0.1–2 mg/ml denatured calf thymus DNA at 50° C., (2) 6×SSC, 50% formamide, 1% SDS, 0.1–2 mg/ml denatured calf thymus DNA at 40° C., (3) 1% bovine serum albumen (fraction V), 1 mM Na2.EDTA, 0.5 M NaHPO$_4$ (pH 7.2) (1 M NaHPO$_4$=134 g Na$_2$HPO$_4$.7H$_2$O, 4 ml 85% H$_3$PO$_4$ per liter), 7% SDS, 0.1–2 mg/ml denatured calf thymus DNA at 50° C., (4) 50% formamide, 5×SSC, 0.02 M Tris-HCl (pH 7.6), 1×Denhardt's solution (100=10 g Ficoll 400, 10 g polyvinylpyrrolidone, 10 g bovine serum albumin (fraction V), water to 500 ml), 10% dextran sulfate, 1% SDS, 0.1–2 mg/ml denatured calf thymus DNA at 40° C., (5) 5×SSC, 5×Denhardt's solution, 1% SDS, 100 µg/ml denatured calf thymus DNA at 50° C., or (6) 5×SSC, 5×Denhardt's solution, 50% formamide, 1% SDS, 100 µg/ml denatured calf thymus DNA at 40° C., with low stringency washes of either 2×SSC, 0.1% SDS at 50° C., or (2) 0.5% bovine serum albumin (fraction V), 1 mM Na2EDTA, 40 mM NaHPO$_4$ (pH 7.2), 5% SDS. The above conditions are intended to be used for DNA-DNA hybrids of 50 base pairs or longer. Where the hybrid is believed to be less than 18 base pairs in length, the hybridization and wash temperatures should be 5–10° C. below that of the calculated $T_m$ of the hybrid, where $T_m$ in ° C.=(2×the number of A and T bases)+(4×the number of G and C bases). For hybrids believed to be about 18 to about 49 base pairs in length, the $T_m$ in ° C.=(81.5° C.+16.6(log$_{10}$ M)+0.41(% G +C)−0.61 (% formamide)−500/L), where "M" is the molarity of monovalent cations (e.g., Na$^+$), and "L" is the length of the hybrid in base pairs.

Hence, the present invention includes kits for the detection of the PVCR or the quantification of the PVCR having either antibodies specific for the PVCR or a portion thereof, or a nucleic acid sequence that can hybridize to the nucleic acid of the PVCR.

The present invention is further and more specifically illustrated by the following Examples, which are not intended to be limiting in any way.

EXEMPLIFICATION

Example 1

Polyvalent Cation-sensing Receptors (PVCRs) Serve as Salinity Sensors in Fish

Polyvalent cation-sensing receptors (PVCRs) serve as salinity sensors in fish. These receptors are localized to the apical membranes of various cells within the fish's body (e.g., in the gills, intestine, kidney) that are known to be responsible for osmoregulation. A full-length cation receptor (CaR) from the dogfish shark has been expressed in human HEK cells. This receptor was shown to respond to alterations in ionic compositions of NaCl, Ca2+ and Mg2+ in extracellular fluid bathing the HEK cells. The ionic concentrations responded to encompassed the range which includes the transition from freshwater to seawater. Expression of PVCR mRNA is also increased in fish after their transfer from freshwater to seawater, and is modulated by PVCR agonists. Partial genomic clones of PVCRs have also been isolated from other fish species, including winter and summer flounder and lumpfish, by using nucleic acid amplification with degenerate primers.

This method was also used to isolate partial genomic clones of PVCRs for Atlantic salmon (FIG. 1), arctic char (FIG. 2) and rainbow trout (FIG. 3). The degenerate oligonucleotide primers used were 5'-TGT CKT GGA CGG AGC CCT TYG GRA TCG C-3'(SEQ ID NO:22) AND 5'-GGC KGG RAT GAA RGA KAT CCA RAC RAT GAA G-3'(SEQ ID NO:23), where K is T or G, Y is C or T, and R is A or G. The degenerate oligos were generated by standard methodologies (Preston, G. M., 1993, "Polymerase chain reaction with degenerate oligonucleotide primers to clone gene family members," in: Methods in Mol. Biol., vol. 58, ed. A. Harwood, Humana Press, pp. 303–312). Genomic bands from these three species were amplified, purified by agarose gel electrophoresis, ligated into an appropriate plasmid vector (salmon and arctic char species-pT7 Blue (Novagen, Madison, Wis.; trout used pGem-T (Promega Biotech. Madison, Wis.) , and transformed into an appropriate bacterial host strain salmon and arctic char—pT7 vector with NovaBlue (Novagen, Madison, Wis.) and trout pGEM-T used JM-109 *E. coli* cell which was then grown in liquid medium. The plasmids and inserts were purified from the host cells, and sequenced. FIG. 4 shows the deduced amino acid sequences and alignment for the PVCRs from Atlantic salmon, arctic char and rainbow trout, relative to the PVCR from the kidney of the dogfish shark (*Squalus acanthias*).

Example 2

Survival of Pre-Adult Anadromous Fish using the Methods of the Present Invention An important feature of current salmon farming is the placement of smolt from freshwater hatcheries to ocean netpens. Present day methods use smolt that have attained a critical size of approximately 70–110 grams body weight. The present invention can either be utilized both to improve the ocean netpen transfer of standard 70–110 grams smolt as well as permit the successful ocean netpen transfer of smolt weighing only 30 grams. For standard 70–100 gram smolt, application of the invention eliminates the phenomenon known as "smolt window" and permits fish to be maintained and transferred into ocean water at 15° C. or higher. Use of the invention in 30 gram or smaller smolt permits greater utilization of freshwater hatchery capacities followed by successful seawater transfer to ocean netpens. In both cases, fish that undergo the steps of the invention feed vigorously within a short interval of time after transfer to ocean netpens and thus exhibit rapid growth rates upon transfer to seawater.

FIG. 5 shows in schematic form the key features of current aquaculture of Atlantic salmon in ocean temperatures present in Europe and Chile. Eggs are hatched in inland freshwater hatcheries and the resulting fry grow into fingerlings and parr. Faster growing parr are able to undergo smoltification and placement in ocean netpens as SO smolt (70 gram) during year 01. In contrast, slower growing parr are smoltified in year 02 and placed in netpens as S1 smolt (100 gram). In both S0 and S1 transfers to seawater, the presence of cooler ocean and freshwater temperatures are desired to minimize the stress of osmotic shock to newly transferred smolt. This is particularly true for S1 smolt since freshwater hatcheries are often located at significant distances from ocean netpen growout sites and their water temperatures rise rapidly during early summer. Thus, the combination of rising water temperatures and the tendency of smolt to revert or die when held for prolonged intervals in freshwater produces a need to transfer smolt into seawater during the smolt window.

Standard smolts that are newly placed in ocean netpens are not able to grow optimally during their first 40–60 day interval in seawater because of the presence of osmotic stress that delays their feeding. This interval of osmotic adaptation prevents the smolts from taking advantage of the large number of degree days present immediately after either spring or fall placement. The combination of the presence of the smolt window together with delays in achieving optimal smolt growth prolong the growout interval to obtain market size fish. This is particularly problematic for SO's since the timing of their harvest is complicated by the occurrence of grilsing in maturing fish that are exposed to reductions in ambient photoperiod.

Methods

The following examples refer to APS Process I throughout. APS stands for "AquaBio Products Sciences®, L.L.C." APS Process I is also referred to herein as "SUPERSMOLT™ I Process" or "Process I." An "APS Process I" fish or smolt refers to a fish or smolt that has undergone the steps of APS Process I. An APS Process I smolt is also referred to as a "SUPERSMOLT™ I" or a "Process I" smolt.

APS Process 1: Pre-adult anadromous fish (this includes both commercially produced S0, S1 or S2 smolts as well as smaller parr/smolt fish) are exposed to or maintained freshwater containing either 2.0–10.0 mM Calcium and 0.5–10 mM Magnesium ions. This water is prepared by addition of calcium carbonate and/or chloride and magnesium chloride to the freshwater. Fish are fed with feed pellets containing 7% (weight/weight) NaCl. See Example 8 for further details regarding the feed. Fish are exposed to or maintained in this regimen of water mixture and feed for a total of 30–45 days, using standard hatchery care techniques. Water temperatures vary between 10–16° C. Fish are exposed to a constant photoperiod for the duration of APS Process I. A fluorescent light is used for the photoperiod.

Results and Discussion:

SECTION I

Demonstration of the Benefits of the APS Process I For Atlantic Salmon, Trout and Arctic Char Demonstration of the benefits of the APS Process I For Atlantic Salmon:

APS Process I increases the survival of small Atlantic Salmon S2 smolt after their transfer to seawater when compared to matched freshwater controls. Optimal survival is achieved by using the complete process consisting of both the magnesium and calcium water mixture as well as NaCl diet. In contrast, administration of calcium and magnesium either via the food only or without NaCl dietary supplementation does not produce results equivalent to APS Process I.

Table 1 shows data obtained from Atlantic salmon S2 smolts less than 1 year old weighing approximately 25 gm.

This single group of fish was apportioned into 4 specific groups as indicated below and each were maintained under identical laboratory conditions except for the variables tested. All fish were maintained at a water temperature of 9–13° C. and a continuous photoperiod for the duration of the experiment.

The control freshwater group that remained in freshwater for the initial 45 day interval experienced a 33% mortality rate under these conditions such that only 67% were able to be transferred to seawater. After transfer to seawater, this group also experienced high mortality where only one half of these smolts survived. Inclusion of calcium (10 mM) and magnesium (5 mM) within the feed offered to smolt (Ca2+/Mg2+diet) reduced survival as compared to controls both in freshwater (51% vs 67%) as well after seawater transfer (1% vs 50%). In contrast, inclusion of 10 mM Ca2+ and 5 mM Mg2+ in the freshwater (APS Process I Water Only) improved smolt survival in APS Process I water as well as after transfer of smolt to seawater. However, optimal results were obtained (99% survival in both the APS Process I water mixture as well as after seawater transfer) when smolt were maintained in APS Process I water mixture and fed a diet supplemented with 7% sodium chloride.

TABLE 1

Comparison of the Survival of Atlantic Salmon S2 Smolts After Various Treatments

| Parameter Sampled | Control Freshwater | Ca2+/Mg2+ Diet | APS Water Only | APS Water + NaCl Diet |
|---|---|---|---|---|
| Starting # of fish | 66 | 70 | 74 | 130 |
| # of fish | 44 | 36 | 67 | 129 |
| % of fish surviving after 45 days in freshwater or APS mixture | 67% | 51% | 91% | 99% |
| # of fish | 22 | 2 | 60 | 128 |
| % of fish surviving 5 days after transfer to seawater | 50% | 1% | 90% | 99% |

[1]Survival percentages expressed as rounded whole numbers

Application of the APS Process I to the Placement of 70–100 gm smolts in seawater.

These data show that use of the APS Process I eliminates the "smolt window" and provides for immediate smolt feeding and significant improvement in smolt growth rates.

Experimental Protocol:

Smolts derived from the St. John strain of Atlantic salmon produced by the Connors Brothers Deblois Hatchery located in Cherryfield, Me., USA were utilized for this large scale test. Smolts were produced using standard practices at this hatchery and were derived from a January 1999 egg hatching. All smolts were transferred with standard commercially available smolt trucks and transfer personnel. S1 smolt were purchased during Maine's year 2000 smolt window and smolt deliveries were taken between the dates of Apr. 29, 2000–May 15, 2000. Smolts were either transferred directly to Polar Circle netpens (24m diameter) located in Blue Hill Bay Maine (Controls) or delivered to the treatment facility where they were treated with APS Process I for a total of 45 days. After receiving the APS Process I treatment, the smolt were then transported to the identical Blue Hill Bay netpen site and placed in an adjacent rectangular steel cage (15m× 15m×5m) for growout. Both groups of fish received an identical mixture of moist (38% moisture) and dry (10% moisture) salmonid feed (Connors Bros). Each of the netpens were fed by hand or feed blower to satiation twice per day using camera visualization of feeding. Mort dives were performed on a regular basis and each netpen received identical standard care practices established on this salmon farm. Sampling of fish for growth analyses was performed at either 42 days (APS Process I) or 120 days or greater (Control) fish. In both cases, fish were removed from the netpens and multiple analyses performed as described below.

All calculations to obtain feed conversion ratio (FCR) or specific growth rate (SGR) and growth factor (GF3) were performed using standard accepted formulae (Willoughby, S. Manual of Salmonid Farming Blackwell Scientific, Oxford UK 1999) and established measurements of degree days for the Blue Hill Bay site as provided in Table 2 below. A degree day is a measure of the number of days that a month in which a salmon can grow. It is calculated by multiplying the number of days in a month by the amount of degrees in Celsius.

TABLE 2

Degree days for Blue Hill Bay Salmon Aquaculture Site

| Month | Degree Days |
|---|---|
| Jan | 60 |
| Feb | 30 |
| Mar | 15 |
| April | 120 |
| May | 210 |
| June | 300 |
| July | 390 |
| Aug | 450 |
| Sept | 420 |
| Oct | 360 |
| Nov | 240 |
| Dec | 180 |

Table 3 displays data obtained after seawater transfer of Control S1 smolt. Smolt ranging from 75–125 gm were placed into 3 independent netpens and subjected to normal farm practices demonstrated characteristics typical for present day salmon aquaculture in Maine. Significant mortalities (average 3.3%) were experienced after transfer into cool (10° C.) seawater and fill feeding was achieved only after a significant interval (~56 days) in ocean netpens. As a result, the average SGR and GF3 values for these 3 netpens were 1.09 and 1.76 respectively for the 105–121 day interval measured.

In contrast to the immediate transfer of Control S1 smolt as described above to ocean netpens (Table III), a total of 10,600 S1 smolt possessing an average size of 63.6 grams were transported on May 11, 2000 from the Deblois freshwater hatchery to the research facility. While being maintained in standard circular tanks, these fish were held for a total of 45 days at an average water temperature of 11° C. and were subjected to APS Process I. During this interval, smolt mortality was only 64 fish (0.6%). As a matched control for the APS Process I fish, a smaller group of control fish (n=220) were held under identical conditions but did not receive the APS Process I treatment. The mortalities of these control fish were minimized by the holding temperature of 10° C. and were equivalent to treated smolts prior to transfer to seawater.

TABLE 3

Characteristics of St. John S1 smolt subjected to immediate placement in ocean netpens after transport form the freshwater hatchery without APS technology (the Control fish)

| Netpen Number | #17 | #18 | #10 |
|---|---|---|---|
| Total Fish | 51,363 | 43,644 | 55,570 |
| Mean Date of Seawater Transfer | 5/1/00 | 5/5/00 | 5/14/00 |
| Average Size at Transfer (grams) | (117.6) 100–125 | 75–100 | 75–100 |
| Mortalities after 30 days (# and % total) | 1,785; 3.5% | 728; 1.7% | 2503; 4.5% |
| Time to achieve full feeding after transfer | 68 days | 48 days | 50 days |
| Interval between netpen placement and analysis | 121 | 120 | 105 |
| Average size at Analysis | | | |
| Weight (gram) | 376.8 ± 74 | 305.80 + 64 | 298.90 + 37.40 |
| Length (cm) | 33.4 + 1.9 | 28.30 + 9.0 | 30.40 + 1.17 |
| Condition Factor (k) | 1.02 | 1.34 | 1.06 |
| SGR | 0.96 | 1.10 | 1.17 | during initial 120 days

During the 45 day interval when S1 smolts were receiving APS Process I, fish grew an average of 10 grams and thus possessed an average weight of 76.6 gm when transferred to an ocean netpen. The actual smolt transfer to seawater occurring on Jun. 26, 2000 was notable for the unusual vigor of the smolt that would have normally been problematic since this time is well past the normal window for ocean placement of smolt. The ocean temperature at the time of APS Process I smolt netpen placement was 15.1° C. In contrast to the counterpart Si smolts subjected to standard industry practices described above, APS Process I smolts fed vigorously within 48 hours of ocean placement and continued to increase their consumption of food during the immediate post-transfer period. The mortality of APS Process I smolts was low (6.1 %) during initial 50 days after ocean netpen placement and two thirds of those mortalities were directly attributable to scale loss and other physical damage incurred during the transfer process itself.

In contrast, corresponding control fish (held under identical conditions without APS Process I treatment) did not fare well during transfer to the netpen (17% transfer mortality) and did not feed vigorously at any time during the first 20 days after ocean netpen placement. This smaller number of control fish (176) were held in a smaller (1.5m× 1.5m×1.5m) netpen floating within the larger netpen containing APS Process I smolts. Their mortality post-ocean netpen placement was very high at 63% within the 51 day interval. Both APS Process I and control smolts were fed on a daily basis in a manner identical to that experienced by the Industry Standard Fish shown on Table 3. APS Process I fish were sampled 51 days after their seawater placement and compared to the Industry Standard smolts shown on Table 2. As shown in Table 4, comparison of their characteristics reveals dramatic differences between Industry Standard smolts vs APS Process I.

TABLE 4

Comparison of the characteristics of St. John S1 APS Process I Smolts subjected to APS treatment and then placed in ocean netpens vs corresponding industry standard smolts.

| | APS Process I Smolts | Averaged Industry Standard Data from Table 3 in this Example |
|---|---|---|
| Total Fish | 10,600 | 150,577 |
| Mean Date of Seawater Transfer | 6/26/00 | 5/7/00 |
| Average Size at Transfer (grams) | 76.6 | 95.8 |
| Mortalities after 30 days (# and %) | 648; 6.1% | 21,618; 14.3% |
| Time to achieve full Feeding after transfer | 48 hrs | 56 days |
| Interval between netpen placement and analysis | 51 | 115 |
| Average size at Analysis | | |
| Weight (gram) | 175.48 + 50 | 327.2 |
| Length (cm) | 262.22 + 32 | 30.7 |
| Condition Factor (k) | 0.95 + 0.9 | 1.14 |
| SGR | 1.80 | 1.09 |

In summary, notable differences between APS Process I, Control smolt and Industry Standard smolt include:

1. The mortalities observed after ocean netpen placement were low in APS Process I (6.1%) vs Control (63%) despite the that fact these fish were transferred to seawater 1.5 months after the smolt window and into a very high (15.1° C.) ocean water temperature. The mortality of APS Process I was actually lower than that of Industry Standard smolt (14.3%) transferred to cooler (10° C.) seawater during the smolt window. This characteristic of APS Process I provides for a greater flexibility in freshwater hatchery operations since placement of APS Process I smolts are not rigidly confined the conventional "smolt window" currently used in industry practice.

2. The APS Process I fish were in peak condition during and immediately after seawater transfer. Unlike industry standard smolt that required 56 days to reach full feeding, the APS Process I smolts fed vigorously within 48 hours. Moreover, the growth rates (SGR 1.8) demonstrated by APS Process I smolts are significantly greater than both published data for standard smolt during their initial 50 days after seawater placement (published values (Stradmeyer, L. Is feeding nonstarters a waste of time. Fish Farmer 3:12–13, 1991; Usher, M L, C Talbot and F B Eddy. Effects of transfer to seawater on growth and feeding in Atlantic salmon smolts (Salmo salar L.) Aquaculture 94:309–326, 1991) for SGR's range between 0.2–0.8). In fact, the growth rates of APS Process I smolts are significantly larger than Industry standard smolts placed on the same site despite the fact that industry standard smolt were both larger at the time of seawater placement as well as the fact that their growth was measured 120 days after seawater placement. These data provide evidence that the APS Process I smolts were not subjected to significant osmoregulatory stress which would prevent them from feeding immediately.

3. The rapid growth of APS Process I smolts immediately upon ocean netpen placement provides for compounding increases in the size of salmon as seawater growout proceeds. Thus, it is anticipated that if Industry Standard Smolts weighing 112.5 gram were subjected to APS Process I treatment, placed in ocean netpens and examined at 120 days after ocean netpen placement their size would be average 782 gram instead of 377 gram as observed. This provides for more than a doubling in size of fish in the early stages of growout. Such fish would reach market size more rapidly as compared to industry standard fish.

Figure 6:
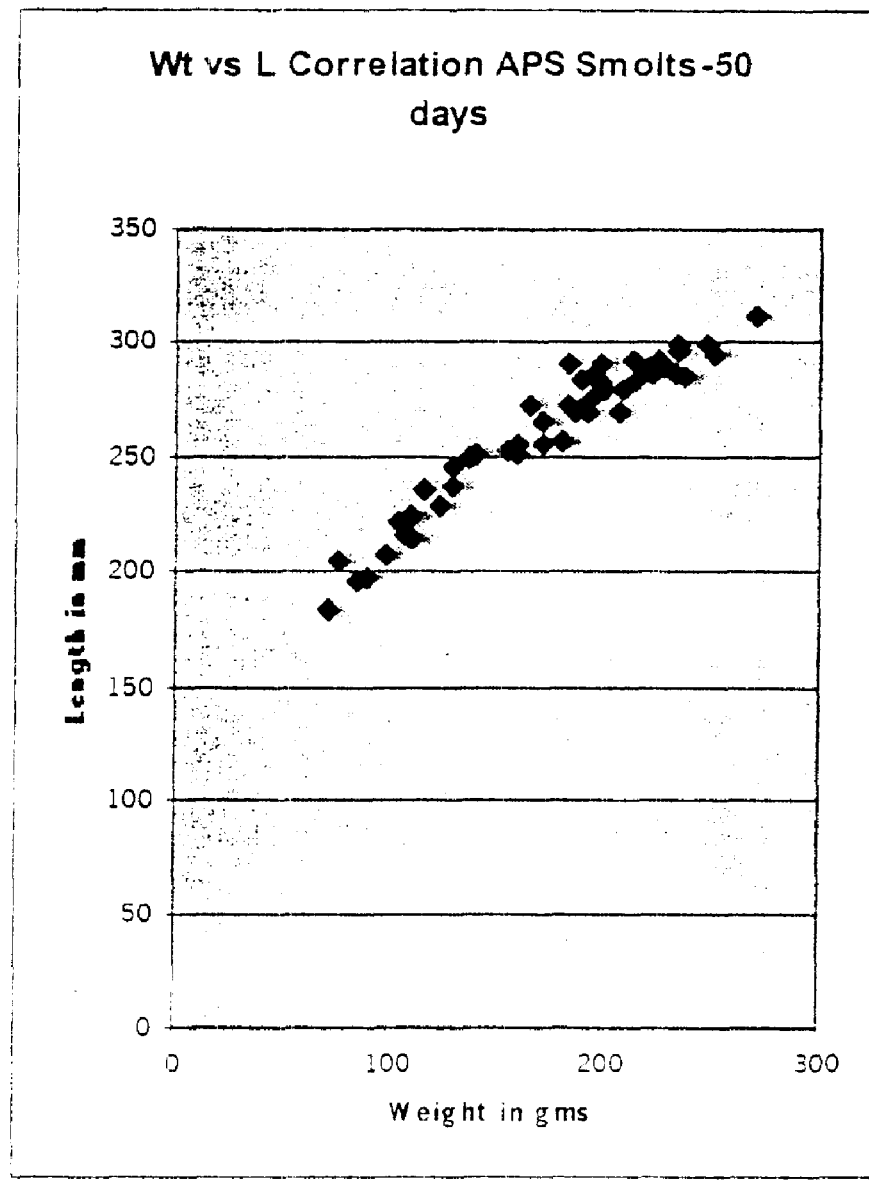
FIG. 6 is a graphical representation illustrating length (cm) and weight (gm) of APS Process I Smolts 50 days after ocean netpen placement. APS Process I smolts had an average weight of 76.6 gram when placed seawater and were sampled after 50 days. APS Process I is defined is Example 2.

FIG. 6 provides data on the characteristics of APS Process I smolts after seawater transfer.

Application of the APS Process I to Atlantic Salmon pre-adult Fish that are Smaller than the Industry Standard "Critical Size" Smolt.

A total of 1,400 Landcatch/St John strain fingerlings possessing an average weight of 20.5 gram were purchased from Atlantic Salmon of Maine Inc., Quossic Hatchery, Quossic, Me., USA on 1 August 2000. These fingerlings were derived from a egg hatching in January 2000 and considered rapidly growing fish. They were transported to the treatment facility using standard conventional truck transport. After their arrival, these fingerlings were first placed in typical freshwater growout conditions for 14 days. These fingerlings were then subjected to APS Process I for a total of 29 days while being exposed to a continuous photoperiod. The APS Process I were then vaccinated with the Lipogen Forte product (Aquahealth LTD.) and transported to ocean netpens by conventional truck transport and placed into seawater (15.6° C.) in either a research ocean netpen possessing both a predator net as well as net openings small enough (0.25 inch) to prevent loss of these smaller APS Process I smolts. Alternatively, APS Process I smolts were placed in circular tanks within the laboratory. Forty eight hours after sea water transfer, APS Process I smolts were begun on standard moist (38% moisture) smolt feed (Connors Bros.) that had been re-pelletized due to the necessity to provide for smaller size feed for smaller APS Process I smolts, as compared to normal industry salmon. In a manner identical to that described for 70 gram smolts above, the mortality, feed consumption, growth and overall health of these 30 gram APS Process I smolts were monitored closely.

Figure 7:
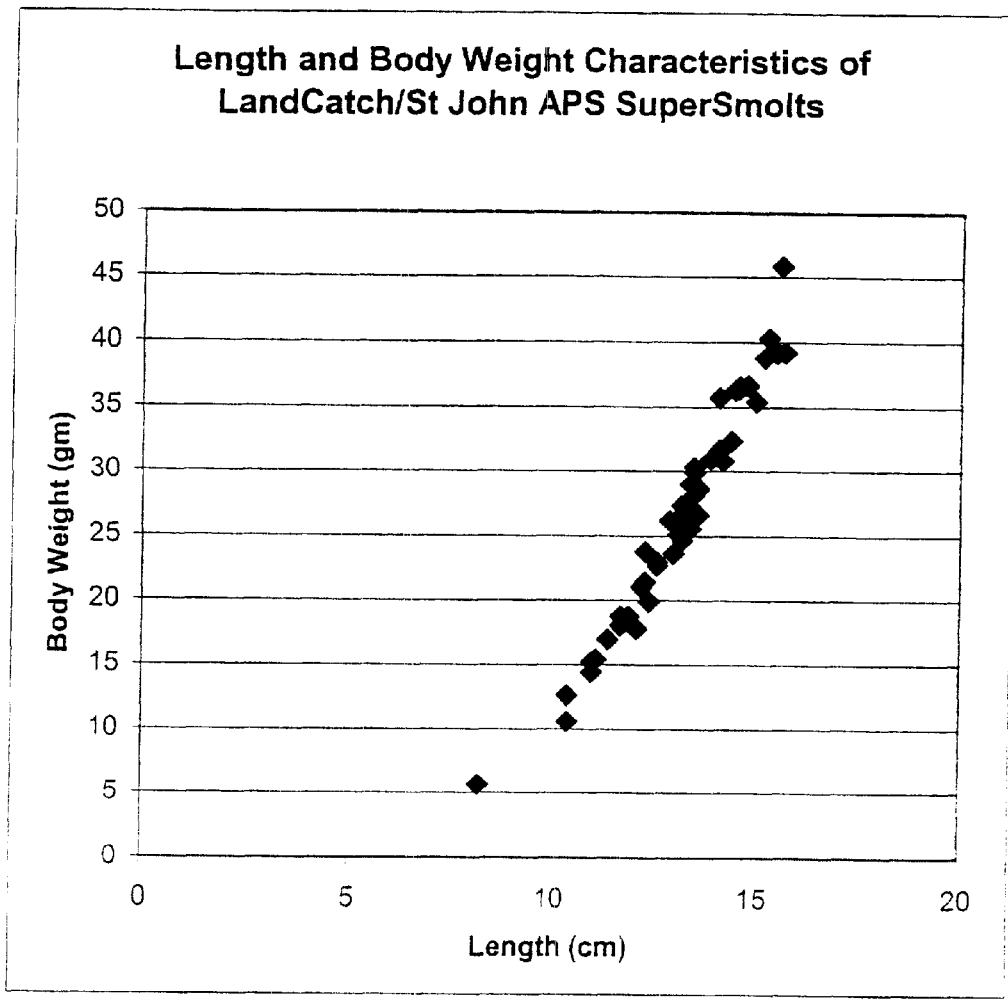
FIG. 7 is a graphical representation illustrating length (cm) and weight (gm) of representative APS Process I smolts prior to transfer to seawater.

FIG. 7 displays the characteristics of a representative sample of a larger group of 1,209 APS Process I smolts immediately prior to their transfer to seawater. These parameters included an average weight of 26.6+8.6 gram, length of 13.1+1.54 cm and condition factor of 1.12+0.06. After seawater transfer, APS Process I smolts exhibited a low initial mortality despite the fact that their average body weight is 26–38% of industry standard 70–100 gram S0–S1 smolts. As shown in Table 5, APS Process I smolts mortality within the initial 72 hr after seawater placement was $1/140$ or 0.07% for the laboratory tank. Ocean netpen mortalities after placement of APS Process I smolts were $143/1069$ or 13.4%. FIG. 7 shows representative Landcatch/St John strain APS Process I smolts possessing a range of body sizes that were transferred to seawater either in ocean netpens or corresponding laboratory seawater tanks. APS Process I smolts possess a wide range of sizes (46.8–5.6 grams body weight) with an average body weight of 26.6 gram.

TABLE 5

Characteristics and survival of APS Landcatch/St. John Supersmolts I after their placement into seawater in either an APS laboratory tank or ocean netpen.

| | Laboratory Tank | Ocean Netpen |
|---|---|---|
| Total Fish | 140 | 1,069 |
| Date of Seawater Transfer | 9/5/00 (40); 9/12/00 (100) | 9/12/00 |
| Average Size at Transfer (gram) | 26.6 | 26.6 |
| Total mortalities after 4 days (# and % total) | 1; 0.7% | 143; 13.4% |

TABLE 5-continued

Characteristics and survival of APS Landcatch/St. John Supersmolts I after their placement into seawater in either an APS laboratory tank or ocean netpen.

| | Laboratory Tank | Ocean Netpen |
|---|---|---|
| % mortality of fish weighing 25 gm and above | 0; 0.0% | 4; 0.4% |
| Time to achieve feeding | 48 hrs | 72 hrs |

Figure 8:
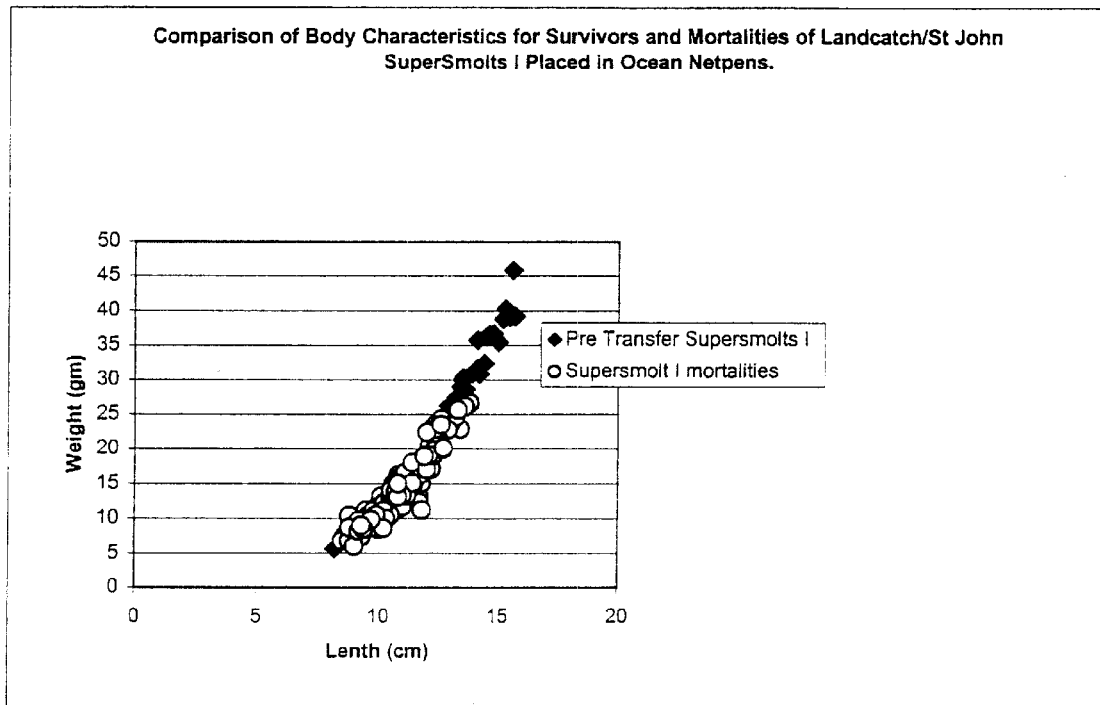
FIG. 8 is a graphical representation illustrating length (cm) and weight (gm) of APS Process I smolts before transfer, and mortalities.

FIG. 8 shows a comparison of the distributions of body characteristics for total group of Landcatch/St John APS Process I smolts vs. mortalities 72 hr after seawater ocean netpen placement. Length and body weight data obtained from the 143 mortalities occurring after seawater placement of 1,069 APS Process I smolts were plotted on data obtained from a 100 fish sampling as shown previously in FIG. 7. Note that the mortalities are distributed among the smaller fish within the larger APS Process I netpen population.

Length and weight measurements for all mortalities collected from the bottom of the ocean netpen were compared to the distribution of APS Process I smolt body characteristics obtained from analysis of a representative sample prior shown in FIG. 8. The data show that the mortalities occurred selectively amongst APS Process I smolts possessing small body sizes such that the mean body weight of mortalities was 54% of the mean body weight of the total transfer population ($14.7/27$ gram or 54%). Thus, the actual mortality rates of APS Process I smolts weighing 25–30 gram is 0.4% ($4/1069$) and those weighing 18–30 gram is 2.9% ($31/1069$).

Application of APS Process I to Trout pre-adult Fish that are Smaller than the Industry Standard "Critical Size" Smolt.

Table 6 displays data on the use of the APS Process I on small (3–5 gm) rainbow trout. Juvenile trout are much less tolerant of abrupt transfers from freshwater to seawater as compared to juvenile Atlantic salmon. As a result, many commercial seawater trout producers transfer their fish to brackish water sites located in estuaries or fresh water lenses or construct "drinking water" systems to provide fresh water for trout instead of the full strength seawater present in standard ocean netpens. After a prolonged interval of osmotic adaptation, trout are then transferred to more standard ocean netpen sites to complete their growout cycle. In general, trout are transferred to these ocean sites for growout at body weights of approximately 70–90 or 90–120 gram.

TABLE 6

Comparison of the Survival of Rainbow Trout (3–5 gm) in Seawater After Various Treatments.
Percent Survival of Fish[1]

| Hours Post Seawater Transfer | Control Freshwater | Constant 14 day Photoperiod | Constant 14 day Photoperiod APS Process | Constant 23 day Photoperiod + APS Process |
|---|---|---|---|---|
| 0 | 100 | 100 | 100 | 100 |
| 24 | 0 | 25 | 80 | 99 |
| 48 | | 0 | 70 | 81 |
| 72 | | | 40 | 68 |
| 96 | | | 30 | 58 |
| 120 | | | 30 | 46 |

TABLE 6-continued

Comparison of the Survival of Rainbow Trout (3–5 gm) in Seawater After Various Treatments.
Percent Survival of Fish[1]

| Hours Post Seawater Transfer | Control Freshwater | Constant 14 day Photoperiod | Constant 14 day Photoperiod APS Process | Constant 23 day Photoperiod + APS Process |
|---|---|---|---|---|
| Number of Fish Per Experiment | 10 | 20 | 30 | 80 |

[1]Survival percentages expressed as rounded whole numbers

A total of 140 trout from a single pool of fish less than 1 yr old were divided into groups and maintained at a water temperature of 9–13° C. and pH 7.8–8.3 for the duration of the experiment described below. When control freshwater rainbow trout are transferred directly into seawater, there is 100% mortality within 24 hr (Control Freshwater). Exposure of the trout to a constant photoperiod for 14 days results in a slight improvement in survival after their transfer to seawater. In contrast, exposure of trout to APS Process I for either 14 days or 23 days results in significant reductions in mortalties after transfer to seawater such that 30% and 46% of the fish respectively have survived after a 5 day interval in seawater. These data demonstrate that application of the APS Process I increases in the survival of pre-adult trout that are less than 7% of the size of standard "critical size" trout produced by present day industry standard techniques.

Application of the APS Process I to Arctic Char pre-adult Fish that are Smaller than the Industry Standard "Critical Size" Smolt.

Figure 9:
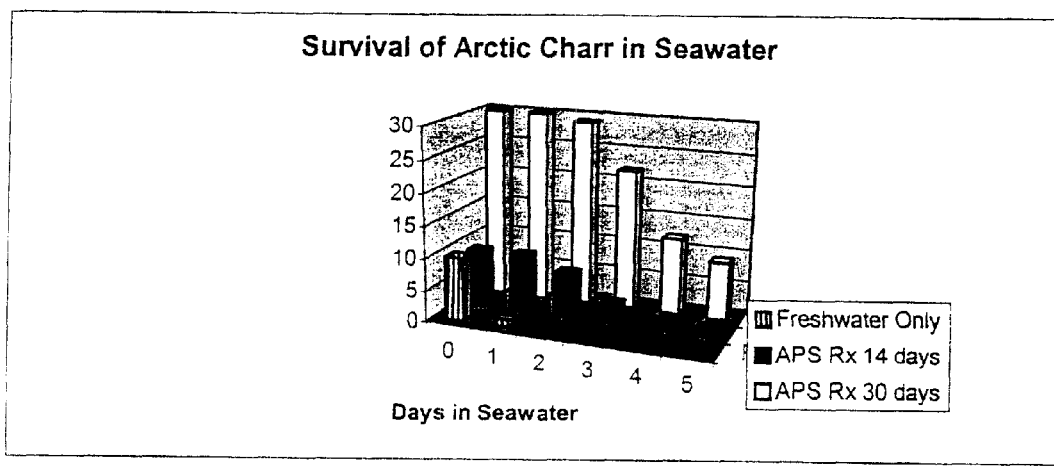
FIG. 9 is a three dimensional graph illustrating the survival over 5 days of Arctic Char in seawater after being maintained in freshwater, APS Process I for 14 days, and APS Process I for 30 days.

Although arctic char are salmonids and anadromous fish, their tolerance to seawater transfer is far less as compared to either salmon or trout. FIG. 9 shows the results of exposure of smaller char (3–5 gm) to the APS Process I for a total of 14 and 30 days. All fish shown in FIG. 9 were exposed to a continuous photoperiod. Transfer of char to seawater directly from freshwater results in the death of all fish within 24 hr. In contrast, treatment of char with the APS Process I for 14 and 30 days produces an increase in survival such that 33% (3/9) or 73% (22/30) respectively are still alive after a 3 day exposure. These data demonstrate that the enhancement of survival of arctic char that are less than 10% of the critical size as defined by industry standard methods after their exposure to the APS Process I followed by transfer to seawater.

FIG. 9 shows a comparison of survival of arctic char after various treatments. A single group of arctic char (3–5 gm were obtained from Pierce hatcheries (Buxton, Me.) and either maintained in freshwater or treated with the APS Process I prior to transfer to seawater.

Quantitation of Feeding of APS Process I smolts after Seawater Transfer:

Landcatch/St John APS Process I smolts were offered food beginning 48 hr after their seawater transfer to either laboratory tanks or ocean netpens. While these APS Process I smolts that were transferred to laboratory tanks began to feed after 48 hr, those fish transferred to ocean netpens were not observed to feed substantially until 7 days. To validate these observations, the inventors performed direct visual inspection of the gut contents from a representative sample of 49 APS Process I smolts 4 days after their seawater transfer to laboratory tanks. A total of 21/49 or 42.9% possessed food within their gut contents at that time. Taken together, these data suggest that APS Process I smolts do not suffer from a prolonged (20–40 day) interval of poor feeding after seawater transfer as is notable for the much larger industry standard Atlantic salmon smolts not treated with the process.

Due to the fact that these groups of pre-adult Atlantic salmon subjected to APS Process I have been transferred very recently to seawater, it is not possible to report on their ocean netpen growth rates, as shown for larger S1 smolts (Table 4). However, APS has quantified the growth rates of identical fish treated with APS Process I within laboratory seawater tanks. As shown in Table 9, Atlantic salmon treated with APS Process I grow rapidly during the initial interval after transfer to seawater. In contrast to industry standard smolt weighing 70–100 grams that eat poorly and thus have little or no growth during their first 20–30 days after transfer to seawater, pre-adult Atlantic salmon receiving APS Process I exhibited substantial weight gains and growth despite the fact that they are only 27–38% (APS Process I) for the critical size of industry standard smolts.

TABLE 7

Growth Rates of Pre-adult Atlantic Salmon Exposed. to APS Process I and Placed in Laboratory Tanks During Initial Interval After Seawater Transfer

|  | APS Process I |
|---|---|
| Number of Fish | 140 |
| Weight at Placement into Seawater | 26.6 |
| Days in Seawater | 22 |
| Placement Weight Corrected for Mortalities | 26.6* |
| Weight after Interval in Seawater | 30.3 |
| Weight Gained in Seawater | 3.75 |
| SGR (% body weight/day) | 0.60 |
| FCR | 1.27 |

*Weight gain corrected for selective mortalities amongst smaller fish (4/140 or 2.9% APS Process I)

Example 3

Exposure of salmon smolts to Ca2+ and Mg2+ Increases Expression of PVCR

In smolts that were exposed to 10 mM $Ca^{2+}$ and 5.2 mM $Mg^{2+}$, the expression of PVCR was found to increase in a manner similar to that in smolts that are untreated, but are transferred directly to seawater.

Tissues were taken from either Atlantic salmon or rainbow trout, after anesthesitizing the animal with MS-222. Samples of tissues were then obtained by dissection, fixed by immersion in 3% paraformaldehyde, washing in Ringers then frozen in an embedding compound, e.g., O.C.T.™ (Miles, Inc., Elkahart, Ind., USA) using methylbutane cooled on dry ice. After cutting 8 micron thick tissue sections with a cryostat, individual sections were subjected to various staining protocols. Briefly, sections mounted on glass slides were: 1) blocked with goat serum or obtained from the same species of fish, 2) incubated with rabbit anti-CaR antiserum, and 3) washed and incubated with peroxidase-conjugated affinity-purified goat antirabbit antiserum. The locations of the bound peroxidase-conjugated goat antirabbit antiserum were visualized by development of a rose-colored aminoethylcarbazole reaction product. Individual sections were mounted, viewed and photographed by standard light microscopy techniques. The methods used to produce anti-PVCR antiserum are described below.

Figure 10A:
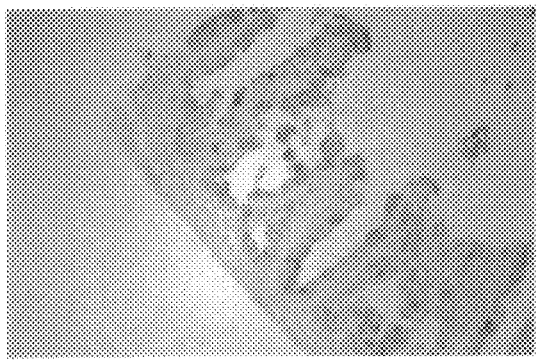
FIGS. 10A–G are photographs of immunocytochemistry of epithelia of the proximal intestine of Atlantic Salmon illustrating PVCR localization and expression.
Figure 10B:
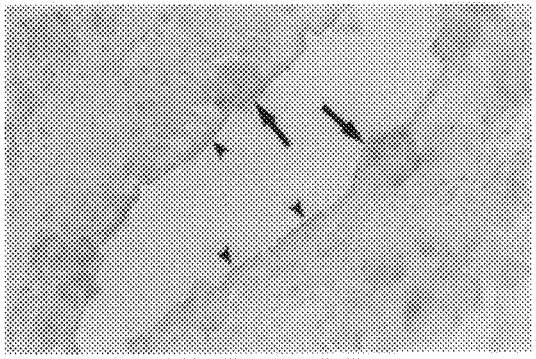
Figure 10C:
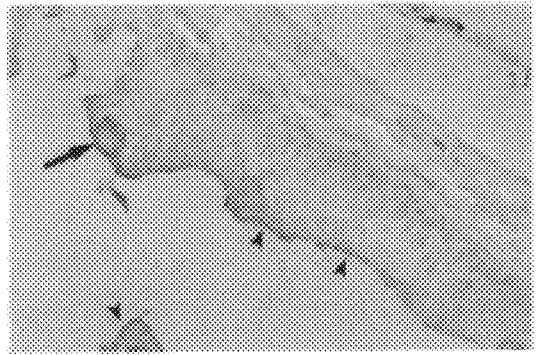
Figure 10D:
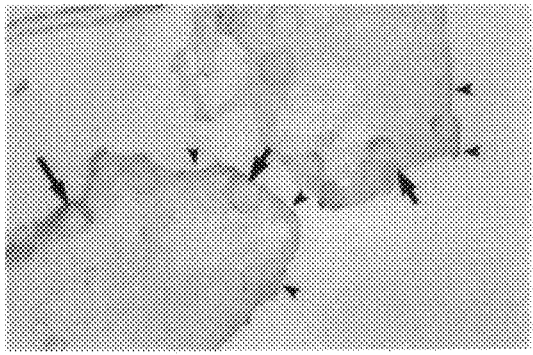
Figure 10E:
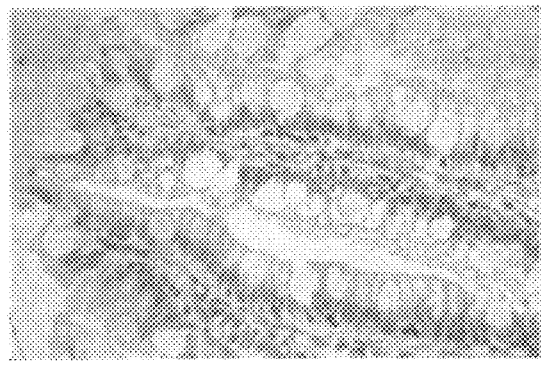
Figure 10F:
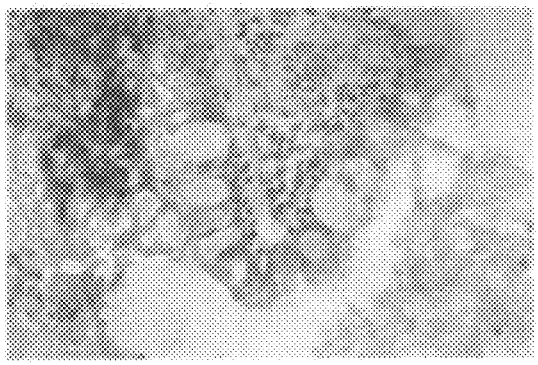
Figure 10G:
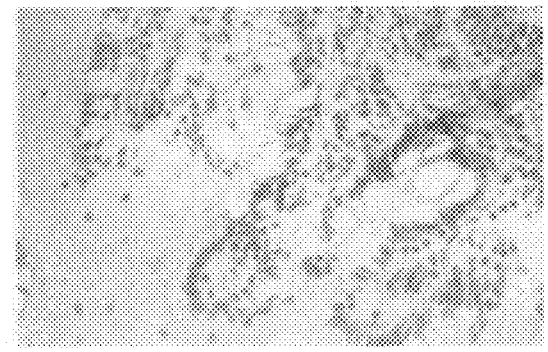
Figure 11:
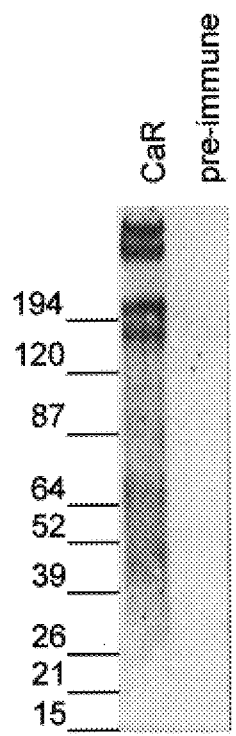
FIG. 11 is a photograph of a Western Blot of intestinal tissue from salmon maintained subjected to APS Process I for immune (lane marked CaR, e.g., a PVCR) and preim-mune (land marked preimmune) illustrating PVCR expression.

The results are shown in FIGS. 10A–10G, which are a set of seven photomicrographs showing immunocytochemistry of epithelia of the proximal intestine of Atlantic salmon smolts using anti-PVCR antiserum, and in FIG. 11, which is a Western blot of intestine of a salmon smolt exposed to Ca2+- and Mg2+-treated freshwater, then transferred to seawater. The antiserum was prepared by immunization of rabbits with a 16-mer peptide containing the protein sequence encoded by the carboxyl terminal domain of the dogfish shark PVCR ("SKCaR") (Nearing, J. et al., 1997, J. Am. Soc. Nephrol. 8:40A). Specific binding of the anti-PVCR antibody is indicated by aminoethylcarbazole (AEC) reaction product.

FIGS. 10A and 10B show stained intestinal epithelia from smolts that were maintained in freshwater then transferred to seawater and held for an interval of 3 days. Abundant PVCR immunostaining is apparent in cells that line the luminal surface of the intestine. The higher magnification (1440×) shown in FIG. 10B displays PVCR protein localized to the apical (luminal-facing) membrane of intestinal epithelial cells. The pattern of PVCR staining is localized to the apical membrane of epithelial cells (small arrowheads) as well as membranes in globular round cells (arrows). FIG. 10C shows stained intestinal epithelia from a representative smolt that was exposed APS Process I and maintained in freshwater containing 10 mM Ca2+ and 5.2 mM Mg2+ for 50 days. Note that the pattern of PVCR staining resembles the pattern exhibited by epithelial cells displayed in FIGS. 10A and 10B including apical membrane staining (small arrowheads) as well as larger globular round cells (arrows). FIG. 10D shows a 1900+ magnification of PVCR-stained intestinal epithelia from another representative fish that was exposed to the APS Process I and maintained in freshwater containing 10 mM Ca2+ and 5.2 mM Mg2+ for 50 days and fed 1% NaCl in the diet. Again, small arrowhead and arrows denote PVCR staining of the apical membrane and globular cells respectively. In contrast to the prominent PVCR staining shown in FIGS. 10A–D, FIGS. 10E (1440×) and 10F (1900×) show staining of intestinal epithelia from two representative smolt that were maintained in freshwater alone without supplementation of Ca2+ and Mg2+ or dietary NaCl. Both 13E and 13F display a marked lack of significant PVCR staining. FIG. 10G (1440×) shows the lack of any apparent PVCR staining upon the substitution of preimmune anti-PVCR antiserum on a section corresponding to that shown in FIG. 10A where anti-PVCR antiserum identified the PVCR protein. The lack of any PVCR staining is a control to demonstrate the specificity of the anti-PVCR antiserum under these immunocytochemistry conditions.

The relative amount of PVCR protein present in intestinal epithelial cells of freshwater smolts (FIGS. 10E and 10F) was negligible as shown by the faint staining of selected intestinal epithelial cells. In contrast, the PVCR protein content of the corresponding intestinal epithelial cells was significantly increased upon the transfer of these smolts to seawater (FIGS. 10A and 10B). Importantly, the PVCR protein content was also significantly increased in the intestinal epithelial cells of smolts maintained in freshwater supplemented with Ca2+ and Mg2+ (FIGS. 10C and 10D). The AEC staining was specific for the presence of the anti-PVCR antiserum, since substitution of the immune antiserum by the preimmune eliminated all reaction product from intestinal epithelial cell sections (FIG. 10G).

To further demonstrate the specificity of the anti-CaR antiserum to recognize salmon smolt PVCRs, FIG. 11 shows a Western blot of intestinal protein from salmon smolt maintained in 10 mM Ca2+, 5 mM Mg2+ and fed 1% NaCl in the diet. Portions of the proximal and distal intestine were homogenized and dissolved in SDS-containing buffer, subjected to SDS-PAGE using standard techniques, transferred to nitrocellulose, and equal amounts of homogenate proteins as determined by both protein assay (Piece Chem. Co, Rocford, Ill.) as well as Coomassie Blue staining were probed for presence of PVCR using standard western blotting techniques. The results are shown in the left lane, labeled "CaR", and shows a broad band of about 140–160 kDa and several higher molecular weight complexes. The pattern of PVCR bands is similar to that previously reported for shark kidney (Nearing, J. et al., 1997, J. Am. Soc. Nephrol. 8:40A) and rat kidney inner medullary collecting duct (Sands, J. M. et al., 1997, J. Clin. Invest. 99:1399–1405). The lane on the right was treated with the preimmune anti-PVCR antiserum used in FIG. 10G, and shows a complete lack of bands. Taken together with immunocytochemistry data shown in FIG. 10, this immunoblot demonstrates that the antiserum used is specific for detecting the PVCR protein in salmon.

Example 4

Exposure of Trout Fingerlings to Ca2+ and Mg2+ Increases Expression of PVCRs

Figure 16:
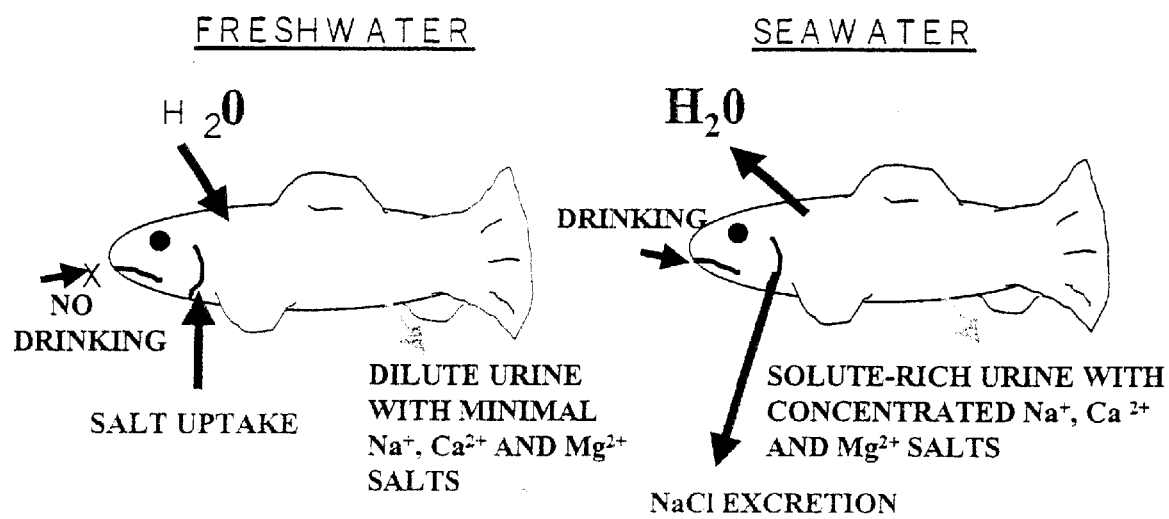
FIG. 16 is a schematic drawing illustrating adaptive changes of fish in seawater and in freshwater.

Development of specific ion transport capabilities in epithelial cells of gill, kidney and intestinal tissues are important to survival of pre-adult anadromous fish if they are to survive transfer to seawater. To determine if alterations in the PVCRs accompanied the increase in trout fingerling survival in seawater, immunoblotting and immunocytochemistry was performed on samples from the fingerlings as was done for the salmon smolt tissues. The results are shown in FIGS. 12, 13 and 16.

Figure 12:
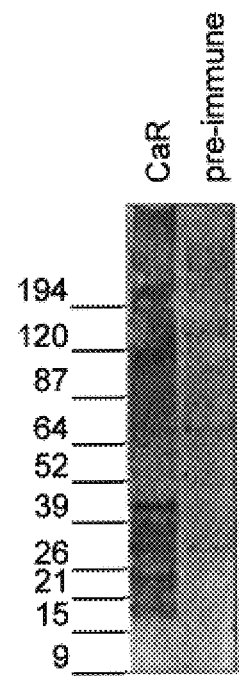
FIG. 12 is a photograph of a Western Blot of intestinal tissue from trout fingerlings for immune (lane marked CaR, e.g., a PVCR) and preimmune.(lane marked preimmune) illustrating PVCR expression.

FIG. 12 is an immunoblot of intestinal tissue from trout fingerlings. Anti-CaR antiserum identifies multiple bands that are specific for PVCR staining as determined by comparison of immune (lane marked CaR) vs. preimmune (lane marked pre-immune). Prominent among these bands includes a broad band of 120–160 kDa, together with larger molecular weight complexes present above these bands from both intestine and gill tissue.

Figure 13A:
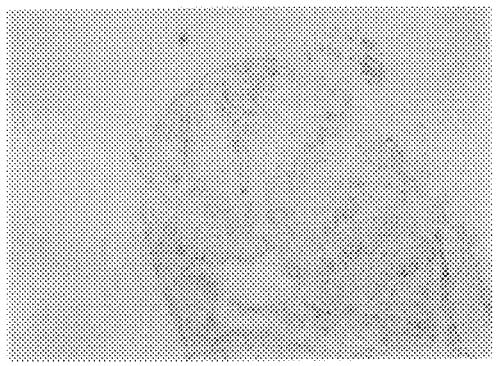
FIGS. 13A–H are photographs of immunocytochemistry of epithelia of proximal intestine of rainbow trout using anti-PVCR antiserum illustrating PVCR localization and expression.
Figure 13B:
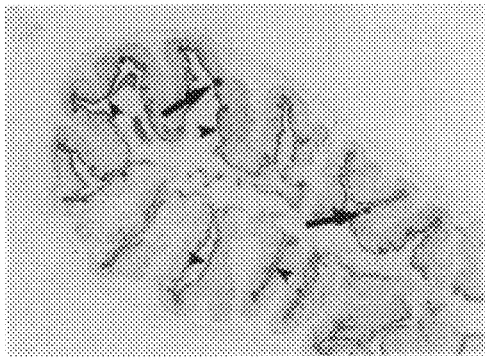
Figure 13C:
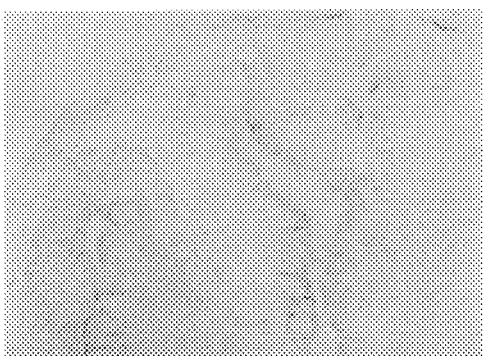
Figure 13D:
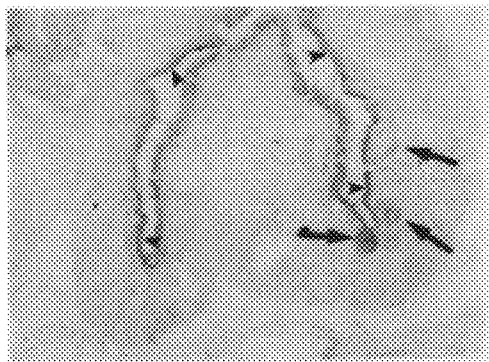
Figure 13E:
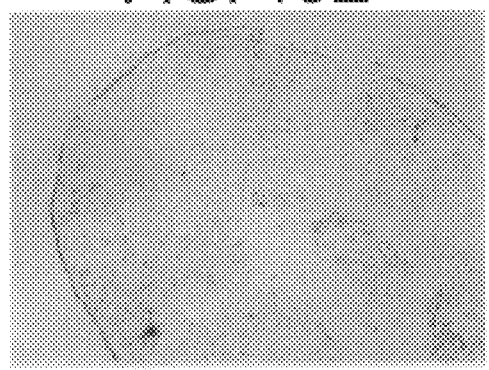
Figure 13F:
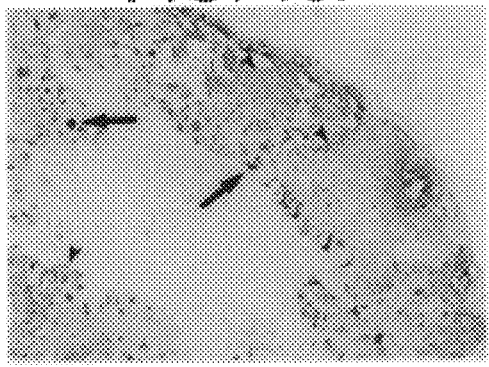
Figure 13G:
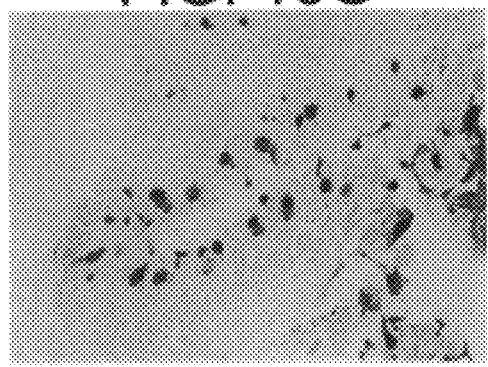
Figure 13H:
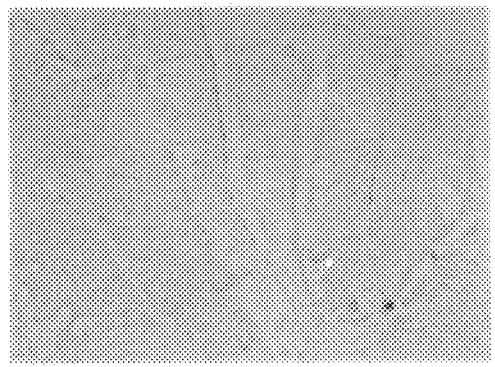

FIGS. 13A, 13B, 13C, 13D, 13E, 13F, 13G and 13H are a set of eight photomicrographs showing immunocytochemistry of epithelia of the proximal intestine of rainbow trout using anti-PVCR antiserum. FIGS. 13A, 13C and 13E show samples from trout maintained in freshwater alone, while FIGS. 13B, 13D, 13F, 13G and 13H show samples from trout maintained in freshwater supplemented with 10 mM Ca2+ and 5.2 mM Mg2+ and fed a 1% NaCl diet. Proximal intestinal segments are shown in FIGS. 13A–13D, and 13G–13H, while distal intestinal segments are shown in FIGS. 13E–13F. FIGS. 13A–13F were treated with immune rabbit anti-CaR antiserum, washed, and developed with horseradish peroxidase-conjugated goat anti-rabbit antiserum using an aminoethylcarbazole (AEC) reaction. While FIGS. 13A, 13C and 13E display little or no PVCR staining, FIGS. 13B, 13D and 13F show significant PVCR staining that is present on the apical membrane of cells lining the intestinal lumen (small arrowheads) as well as larger globular round cells (arrows). In contrast to sections exposed to immune anti-PVCR antiserum, FIG. 13H was treated with pre-immune rabbit anti-CaR antiserum and thus do not contain the colored AEC reaction product. These data indicate this method specifically detects PVCR protein bound to the anti-PVCR antiserum. FIG. 13G was stained directly with Alcian blue (Sheehan, D. C. et al., 1980, Theory and Practice of Histochemistry, Battelle Press, Columbus, Ohio, USA) to localize mucin-producing epithelial cells that are present in intestine. Note the appearance of cells staining for PVCR protein in FIG. 10D (denoted by small arrows) display a similar morphological appearance to those stained with Alcian blue in FIG. 10G. These data suggest that PVCR are expressed by mucin producing cells in the intestine where PVCR signaling actions modulate mucin production in the intestine. Immunocytochemistry of intestinal tissue shows that the content of PVCR protein is different in trout maintained in freshwater alone (FIGS. 13A, 13C and 13E) vs. freshwater supplemented with Ca2+ and Mg2+ and trout fed a NaCl supplemented diet (FIGS. 13B, 13D, 13F). Normally in freshwater, CaR expression is low in either proximal (FIGS. 12A and 13C) or distal (FIG. 13E) sections of intestine. However, PVCR expression is significantly increased in both proximal (FIGS. 13B and 13D) and distal segments (FIG. 13F) after exposure to freshwater supplemented with 10 mM Ca2+ and 5.2 mM Mg2+ and feeding of NaCl supplemented diet.

While PVCR protein is localized to several regions of multiple cells, the presence of intense staining on the apical membranes of intestinal epithelial cells (small arrowheads) as well as occasional rounded cells (large arrowheads) are identical to data localizing PVCR protein in both the dogfish shark (Nearing, J. et al., 1997, J. Am. Soc. Nephrol. 8:40A), as well as rat kidney inner medullary collecting duct (IMCD) (Sands, J. M. et al., 1997, J. Clin. Invest. 99:1399–1405). As described above for Atlantic salmon smolts, the apical PVCR in trout intestine is induced by increases in luminal Ca2+ and Mg2+ concentrations, and thereby regulates the NaCl-mediated recovery of water from intestinal contents. This recovery is important to the survival of marine fish (Evans, D. H., 1993, "Osmotic and Ionic Regulation," in: The Physiology of Fishes, ed. D. H. Evans, CRC Press, Boca Raton, Fla., USA, Chapter 11, pp. 315–341), as it replaces osmotic water losses that occur via the skin and gill.

The anti-PVCR staining of rounded cells, which are interspersed throughout the larger intestinal epithelial cells (FIG. 13D) is also consistent with these cells corresponding to mucin-producing cells which are known to stain intensely with Alcian Blue (Sheehan, D. C. et al., 1980, Theory and Practice of Histochemistry, Battelle Press, Columbus, Ohio, USA) (FIG. 13G).

Figure 14:
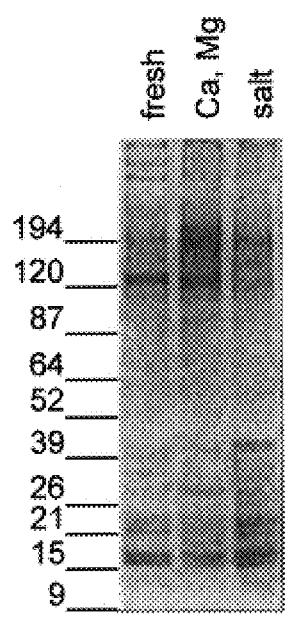
FIG. 14 is a photograph of a Western Blot comparing levels of PVCR of fish in freshwater, water having calcium and magnesium, and seawater, illustrating PVCR expression.

FIG. 14 shows a representative immunoblot that compares the overall levels of PVCR content of protein homogenates prepared from gill tissue of trout using the same anti-PVCR antiserum as described in FIGS. 10–12. Prior to dissection and homogenation of gill tissue, trout were exposed to 1 of 3 different treatments including either freshwater, freshwater with 10 mM calcium and 5.2 mM magnesium with dietary NaCl supplementation or freshwater with dietary NaCl supplementation only. In the gill, the anti-PVCR antiserum also identifies a broad 120–140 kDa and a band of large molecular mass (greater than 200 kDa) that are similar to those shown in FIGS. 11 and 12. These data are consistent with molecular masses of CaRs of known structure and similar to those observed in immunoblotting analyses of multiple organisms, including rat (Sands, J. M. et al., 1997, J. Clin. Invest. 99:1399–1405), flounder, and shark (Nearing, J. et al., 1997, J. Am. Soc. Nephrol. 8:40A). A moderate level of PVCR expression in gill as defined by PVCR reactive bands occurs when trout are maintained in freshwater (freshwater). The abundance of PVCR protein is increased when trout are exposed to the APS Process I (Ca, Mg+NaCl suppl. Feed) as shown in the middle lane (Ca, Mg). In contrast, when trout are maintained in freshwater and fed a NaCl diet without exposure to calcium and magnesium in the freshwater, there is no change in the overall PVCR staining intensity but rather a shift of PVCR reactivity from the 120 kDa to the larger 200 kDa higher molecular weight band (lane marked salt). These data demonstrate that exposure of trout to the APS Process I (freshwater containing 10 mM calcium, 5 mM magnesium and dietary NaCl supplementation) increases PVCR expression in gill tissue as compared to freshwater alone. Feeding of NaCl supplement diet while the trout are maintained in freshwater does not produce similar increased expression of the PVCR protein.

Example 5

Immunolocalization of Polyvalent Cation Receptor (PVCR) in Mucous Cells of Epidermis and in the Brain of Salmon The skin surface of salmonids is extremely important as a barrier to prevent water gain or loss depending whether the fish is located in fresh or seawater. Thus, the presence of PVCR proteins in selected cells of the fish's epidermal layer would be able to "sense" the salinity of the surrounding water as it flowed past and provide for the opportunity for continuous remodeling of the salmonid's skin based on the composition of the water where it is located.

Methods: Samples of the skin from juvenile Atlantic Salmon resident in seawater for over 1 2 days were fixed in 3% paraformaldehyde dissolved in buffer (0.1M NaP04, 0.15M NaCl, 0.3M sucrose pH 7.4), manually descaled, rinsed in buffer and frozen at −80° C. for cryosectioning. Ten micron sections were either utilized for immunolocalization of PVCR using anti-shark PVCR antiserum or stained directly with 1% Alcian Blue dye to localize cells containing acidic glycoprotein components of mucous.

Figure 15A:
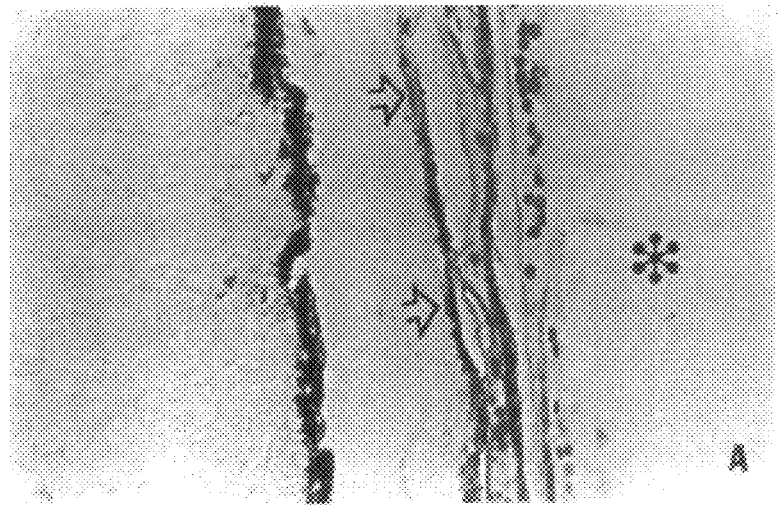
FIGS. 15A–C are photographs of immunolocalization of the PVCR in the epidermis of salmon illustrating PVCR localization and expression.
Figure 15B:
Figure 15C:
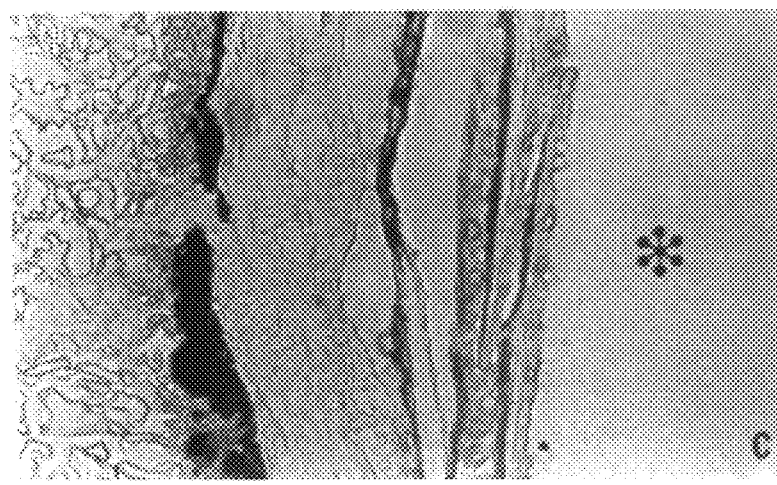

Results and Discussion: FIG. 15A shows that salmon epidermis contains multiple Alcian Blue staining cells present in the various skin layers. Note that only a portion of some larger cells (that containing acidic mucins) stains with Alcian Blue (denoted by the open arrowheads). For purposes of orientation, note that scales have been removed so asterisks denote surface that was previously bathed in seawater. FIG. 15B shows immunolocalization of salmon skin PVCR protein that is localized to multiple cells (indicated by arrowheads) within the epidermal layers of the skin. Note that anti-PVCR staining shows the whole cell body, which is larger than its corresponding apical portion that stains with Alcian Blue as shown in FIG. 15A. The presence of bound anti-CaR antibody is indicated by the rose color reaction product. Although formal quantitation has not yet been performed on these sections, it appears that the number of PVCR cells is less than the total number of Alcian Blue positive cells. These data indicate that only a subset of Alcian Blue positive cells contain abundant PVCR protein. FIG. 15C of FIG. 15 shows the Control Preimmune section where the primary anti-CaR antiserum was omitted from the staining reaction. Note the absence of rose colored reaction product in the absence of primary antibody.

These data demonstrate the presence of PVCR protein in discrete epithelial cells (probably mucocytes) localized in the epidermis of juvenile Atlantic salmon. From this location, the PVCR protein could "sense" the salinity of the surrounding water and modulate mucous production via changes in the secretion of mucous or proliferation of mucous cells within the skin itself. The PVCR agonists (Ca2+, Mg2+) present in the surrounding water activate these epidermal PVCR proteins during the interval when smolts are being exposed to the process of the present invention. This "preconditioning" of Atlantic salmon smolts by the process of the present invention is important to increased survival of smolts after their transfer to seawater.

Localization of PVCR Protein in Brain of Atlantic Salmon:

The PVCR protein can been specifically localized to the brain stem area of Atlantic salmon using immunocytochemistry and antibody raised against a peptide sequence found in the carboxyl terminal of the shark PVCR. These data are consistent with a role for a PVCR in the modulation of endocrine function as well as appetite control in Atlantic salmon.

Localization of the expression of calcium receptors to specific regions of the mammalian brain has been determined. While the exact functions of mammalian CaRs in many regions of the mammalian brain are still unknown, several lines of evidence indicate that CaRs can integrate alterations in systemic calcium, sodium and water metabolism with modulations in brain function that include differences in the secretion of hormones such as adrenocorticotrophin (ACTH) from the hypothalamus as well as behavioral changes such as regulation of thirst or eating. Of importance to disclosure findings detailed below, PVCRs (CaRs) roles in alteration of endocrine function, drinking and appetite in anadromous fish undergoing transfer from freshwater to seawater are important.

In mammalian brain, there is prominent CaR expression in the subfornical organ or SFO. The SFO is a key hypothalamic thirst center and is believed to play a role in modulation of drinking activity to integrate body calcium and water homeostasis. Stimulation of drinking behavior by systemic hypercalcemia via stimulation of CaRs located in the SFO is thought to minimize the dehydration produced by alterations in kidney function that blunt the tubular reabsorption of filtered water by the kidney. The equivalent SFO area of the fish brain is not presently been identified.

In the mammalian brain, there is CaR expression in the pons area of the brainstem particularly around the area postrema near the third ventricle. The area postrema is known to be collection of neurons believed to mediate appetite and has been termed the "nausea center". From this portion of the mammalian brain, neuronal pathways provide for integration of sensory input from vestibular function (sensing of balance) as well as visual input via pathways from optic nerves and their respective nuclei in the brain. This region of the brain is believed to be intimately involved in the nausea produced by hypercalcemia as well as the administration of opiates to humans. The equivalent area postrema of the fish brain is not presently identified.

A combination of physiological and anatomic data provide evidence for the role of CaRs to integrate a variety of endocrine functions with changes in the serum calcium levels in humans. Intravenous infusion of calcium sufficient to raise serum calcium concentrations causes selective increases in gonadotropic releasing hormones and thyroid releasing hormone (TRH) as well ACTH that are produced by the anterior pituitary. The anterior pituitary gland is known to be intimately connected with specific areas of the hypothalamus that express CaRs.

Increases in the serum calcium concentrations of humans cause multiple alterations in both behavior as well as endocrine function. Thus, hypercalcemia causes increased drinking, decreased food consumption and alterations in the circulating levels of specific hypothalamic hormones. As mentioned below, analogous changes in behavior and circulating hormone levels occur in preadult anadromous fish during smoltification and transfer from freshwater to seawater.

Methods:

Whole brains obtained from preadult Atlantic salmon (St. John/St John APS Processed smolts) that were subjected to the APS Processed and transferred to seawater were dissected free of their surroundings and fixed in 3% paraformaldehyde (PFA) in buffer [identical to other immunocytochemistry descriptions]. Eight micron sections were cut, attached to glass slides and processed for immunocytochemistry using either nonimmune control antiserum or anti-PVCR of dogfish shark. Specific antibody binding was detected by the rose-colored reaction product formed from the action of horseradish peroxidase conjugated goat anti-rabbit secondary antiserum and amino ethylcarbazole. Sections were viewed and photographed using standard light microscopy techniques.

Results and Discussion:

After examining serial sections from multiple preadult Atlantic salmon (average wt. 10.3 gm), there is consistent localization of PVCR protein in cells localized in 3 distinct regions of the salmon brain. The first region of PVCR localization is distinct staining of neurons in the vagal lobe region. The second region of PVCR staining is within neurons in the commissural nucleus of Cajal. Both of these regions of salmon brain are known to represent important nuclei in the gustatory (sensing food and eating) as well as general visceral activities including esophageal and intestinal motility (processing of food and intestinal contents for nutrient and water reabsorption). Expression of PVCR protein links alterations in both serum and CNS calcium concentrations to changes in eating and processing of intestinal contents important for anadromous fish adaptation to seawater.

A third site of PVCR localization in salmon brain is the saccus vasculosus where PVCR protein is distributed throughout multiple cell types. The saccus vasculosus is ovid and localized on the ventral surface of the brain between the inferior lobes. This structure is highly vascularized and contains connections between the cerebral spinal fluid and the vascular space. Moreover, neurons present in the saccus vasculosus possess massive nerve projections that tract to the subependymal region of the thalamus. The saccus vasculosus system modulates the function of centers of the posterior tubercle and periventricular thalamus. These areas of the brain are immediately adjacent to the pituitary gland.

The localization of PVCR protein(s) in the brain of preadult Atlantic salmon provides evidence that PVCR can be involved in a variety of functions in the central nervous system of anadromous fish in a manner similar to that described above for the mammalian brain. In particular, localization of PVCR to nuclei that are part of the gustatory system in Atlantic salmon indicates that PVCR protein is expressed in neurons that modulate appetite similar to that described for the area postrema in mammals. Stimulation of PVCR or alterations in its expression via changes in the serum calcium, magnesium or sodium concentrations as demonstrated for Atlantic salmon in this application would then be able to modulate appetite and food consumption. Alternatively, alterations in the cerebral spinal fluid concentration of these ions via exchange between the CSF and the vascular system can also be involved. Since Atlantic salmon smolt produced by present day industry standard methods experience an interval of profound anorexia after their transfer to seawater, this well known suppression of appetite can be mediated through PVCR signaling mechanisms.

In a similar manner, PVCR signaling pathways can also modulate both drinking behavior and pituitary hormone secretion. PVCR protein expressed in the saccus vasculosus can provide for both the initiation of the drinking of seawater by Atlantic salmon and can be directly analogous to increased drinking in mammals caused by hypercalcemia. Increases in serum calcium, magnesium and sodium concentrations produced by transfer of preadult anadromous fish from freshwater to seawater can also be the stimulus for increased secretion of hypothalamic hormones such as ACTH. ACTH stimulates the secretion of cortisol by the adrenal gland in fish. Cortisol is one hormone that has been shown to be a modulator of ion transport activity and involved in modulation of the parr-smolt transformation in anadromous fish. Modulation of pituitary activity via connections between the saccus vasculosus, hypothalamus and the pituitary can modulate these endocrine changes.

Example 7

Serum Level in Fish Exposed to APS Process I

The data described herein demonstrates that Alterations in the Concentrations of Calcium, Magnesium and NaCl in the Body Fluids of Anadromous Fish Occur After Seawater Transfer and Excessively High Concentrations cause or contribute to Post Seawater Transfer Deaths in Anadromous Fish. APS Process I Mimics Seawater Transfer Without Subjecting Small Preadult Anadromous Fish to Osmotic Stress. This "Preconditions" Fish thus Allowing Them to be Transferred to Seawater at Significantly Smaller Sizes and Under Conditions That are Nonpermissive using Industry Standard Practices.

PVCRs are present in multiple tissue locations where PVCRs are exposed to surrounding seawater (gills, skin), luminal contents of tubules (kidney, intestine) as well as internal body fluids (brain, endocrine tissue, muscle). When anadromous fish are transferred from fresh to seawater there is an abrupt rise in the external water concentrations of calcium, magnesium and NaCl. If the fish absorbs increased amounts of calcium, magnesium and NaCl via drinking or osmosis then PVCRs located on the apical surfaces of intestinal and kidney epithelial cells will be exposed to increased amounts of these divalent and monovalent ions. These increases in divalent cation concentrations occur since the kidney is the primary excretory organ for divalent cations and the intestine is the major water recovery organ for anadromous fish via the processing of ingested seawater. Important for this data disclosure is the fact that if the concentrations of calcium, magnesium and NaCl increase in the blood and extracellular fluid of fish, then the PVCRs that are bathed in these body fluids will become stimulated. Alterations in serum calcium and magnesium constitute an actual signaling pathway. In this regard, it is also noteworthy that there are a wide range of "normal" values for serum concentrations of calcium, sodium, magnesium and chloride in anadromous fish. While it has been recognized that steady state serum concentrations of these ions change with differing salinities, there has been no recognition that these might represent fish with differing PVCR "set points" as described herein. Current production methods for salmonids depend on the attainment of a "critical size" for preadult fish called smolt to enable them to survive the transfer from freshwater to seawater.

The production of salmonids for aquaculture is dependent on the ability for preadult fish to survive direct transfer from freshwater to seawater. For this process to occur, present day industry methods have identified a "critical size" for each species of salmonid. Below this critical size, many fish are not able to survive the dramatic alterations in water osmolality and ionic composition. Factors that contribute to the ability of "critical size" smolt include specific surface area to volume ratios as well as the maturity of ionic transport and hormonal mechanisms to cope with the new seawater ionic environment. These mechanisms involve coordinated responses from several organs including the gill, gastrointestinal tract, kidney, and skin as well as specific behavioral changes such as the initiation of drinking behavior after seawater exposure. The transfer of a fish from a freshwater to seawater environment constitutes a major challenge to these osmoregulatory systems that are rapidly remodeled to permit its survival. The basic osmoregulatory mechanisms and responses are outlined briefly on FIG. 16.

When a fish resides in freshwater, it is surrounded by an aqueous environment that possesses a significantly lower ionic and osmotic content. Due to the osmotic gradient that exists between the body fluid of the fish and the surrounding environment, the fish is constantly gaining water that continuously threatens to dilute the more concentrated ionic content of the fish's body fluids. As a result, the freshwater fish do not drink and excrete a copious dilute urine. To prevent the loss of important body salts into the environment, the gills, gastrointestinal tract as well as kidney tubules engage in active uptake of ions from either their luminal contents or the surrounding freshwater.

TABLE 7

Comparison of the Ionic[1] and Osmotic[2] Composition of Seawater and Freshwater vs Serum (Blood) of Atlantic Salmon[3]

|  | Seawater | Freshwater | Atlantic Salmon |
|---|---|---|---|
| Sodium | 450 | 0.3–5 | 135–185 |
| Calcium | 10 | 0.07–2 | 2.5–3.9 |
| Magnesium | 50 | 0.04–3 | 1.0–2.8 |
| Chloride | 513 | 0.23–10 | 120–138 |
| Sulfate | 26 | 0.05 | <0.02 |
| Osmolality | 1050 | 1–20 | 330–390 |

[1]All values expressed as mMoles/Liter.
[2]Values expressed as mOsmoles/kg $H_2O$
[3]Values vary whether fish is in freshwater or seawater. Range of average values provided.

In contrast, when a fish resides in seawater the surrounding aqueous environment possess a significantly larger ionic and osmotic content as compared to the fish's own body composition (Table 7). As shown in FIG. 16, marine salmonids are constantly losing body water content to the surrounding seawater. In this regard, both the integrity and permeability of the fish's skin layer are important in reducing these cutaneous losses to as low as possible. To replace these ongoing water losses, the fish drinks seawater and processes it in such a way to retain water and only a portion of its constituent ions. Ingested seawater is processed by epithelial cells lining the gastrointestinal tract. In this process, the intestinal uptake of water and some NaCl by the fish is permitted while Ca2+ and Mg 2+ are either not absorbed or excreted by kidney tubules. Absorbed NaCl is pumped from the fish's body via gill epithelial cells.

FIG. 16 compares adaptive changes present in fish in freshwater vs seawater. Specific physiological adaptations present in freshwater fish are shown schematically on the left panel. In contrast, alterations in these same physiological responses when fish are in seawater are shown on the right.

It is important for the pre-adult anadromous fish to accomplish all of these adaptative changes rapidly after transfer from freshwater to seawater. Deployment and maturation of these mechanisms requires the synthesis of new proteins and remodeling of epithelial cells involved in transepithelial transport. These changes occur in a time scale that will permit the smolt to survive in its new seawater environment. The smaller the fish, the larger its surface area/volume ratio. Thus, smaller fish lose their body water more rapidly and have less body water stores to buffer changes in body ionic composition. As a result, small fish rapidly lose water and they cannot replace this water via drinking seawater since their ionic removal mechanisms are not mature. As a result, smaller or nonmature smolts rapidly die of electrolyte and water imbalances produced by their inability to adapt to the new osmotic and ionic environment of seawater. In contrast, larger smolts that are larger than the "critical size" possess a lower surface area to volume ratio, lose water less rapidly and have more body water to buffer ionic changes. This larger body size provides them the interval of time necessary to deploy their more mature ionic transport mechanisms enabling them to survive.

In smolts that are either less than the critical size or possess immature physiological ion transport mechanisms, the combination of the osmotic removal of water from their bodies coupled with ingestion of ion rich seawater produces specific alterations in body fluid and electrolyte composition. These changes include: a decrease in total body water content, increases in the concentrations of calcium, magnesium and sodium chloride. Abnormally high concentrations of these monovalent and divalent cations causes a wide range of specific changes in organ and cellular functions including alterations in cellular metabolism and nerve conduction, depression of normal nervous system and muscle activity as well as cessation of normal ingestion of food and its digestion. The abnormal behavior and appearance of highly stress pre-moribund fish after seawater transfer are actually attributable to the physiological effects of elevated ions including calcium and magnesium within the body fluids of the fish.

As described herein, measurements of serum calcium, magnesium and sodium confirm these data as well as demonstrate that the present invention causes a preconditioning of physiological and ionic transport mechanisms permitting the successful seawater transfer of preadult anadromous fish that are significantly smaller than the critical size as defined by present day industry standard methods.

Methods:

Blood was obtained from fish (salmon and trout) via venipuncture into the caudal sinus and prevented from coagulation by the addition of lithium heparin. The blood was centrifuged at 4,000 rpm for 10 minutes and the resulting serum collected and stored until assay. Calcium and magnesium concentrations of 2 microliter aliquots of serum were quantified using calcium and magnesium assay kits (Kit #595, #587 Sigma Aldrich, St Louis, Mo.) and Na was determined by commercial testing (NorDx Laboratories, Scarborough, Me.) using a Hitachi 747 analyzer.

Results and Discussion:

The APS Process I Mimics Exposure to Seawater Without the Presence of a Large Osmotic Gradient Between the Fish's Body Fluids and Surrounding Hypertonic Seawater.

Transfer of trout to seawater results in a significant rise in serum calcium to approximately 3.80 mM within the initial 24 hr after seawater transfer. This increase in serum calcium is sustained for an interval of approximately 108 hr (4.5 days) but then declines to a slightly lower average concentration of $3.20+0.42$ mM by 126 hr. Thus, internal PVCRs are exposed to a rise in serum calcium upon transfer of freshwater trout to seawater. The aquatic PVCRs would actually sense and respond to alterations in calcium this concentration range. Thus, the increase in serum calcium (a PVCR agonist) likely constitutes a signal for the initiation of multiple PVCR-activated processes in various organs to permitting the survival of juvenile trout in seawater.

Placement of trout in the water mixture of the present invention which contains 3 mM calcium and 1 mM magnesium, and feeding the trout a standard freshwater diet (Moore Clarke Feeds) results in no significant increases in serum calcium as compared to serum calcium values for trout maintained in freshwater despite the presence of a net inward gradient of calcium from external water mixture (3 mM) to internal body fluids (2.72 mM). Moreover, serum calcium concentrations of trout maintained in the water mixture are not changed by alterations of the ambient photoperiod from a normal (10 hr daylight; 14 hr darkness) to continuous daylight exposure.

Figure 17:
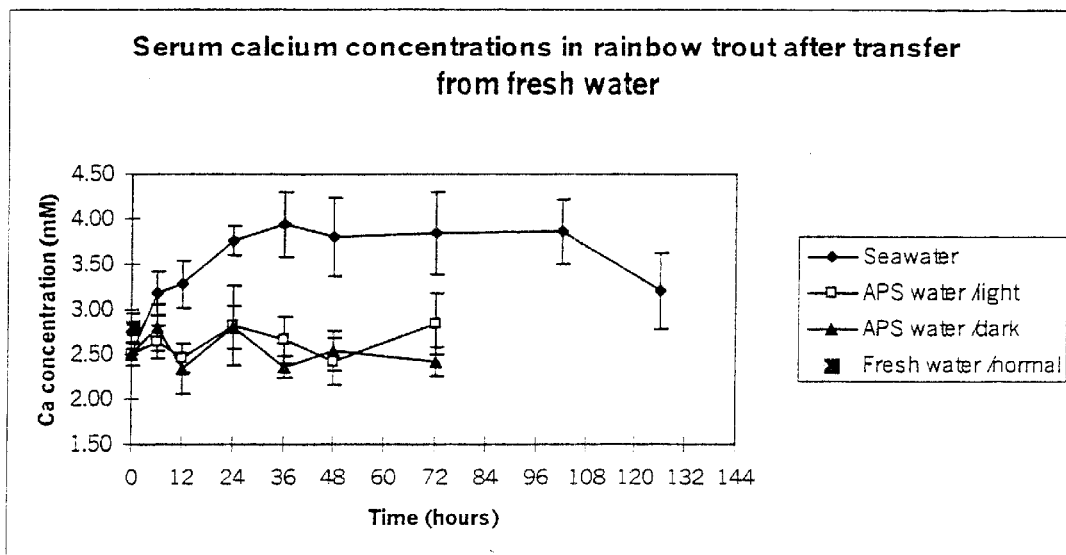
FIG. 17 is a graphical representation showing increases in serum calcium concentrations (mM) over time induced by feeding trout maintained in a water mixture (3 mM calcium, 1 mM magnesium) and a standard freshwater pelleted diet containing additional 1% sodium chloride (w/w).

FIG. 17 shows increases in serum calcium concentrations induced by feeding trout maintained in water mixture (3 mM calcium, 1 mM magnesium) a standard freshwater pelleted diet containing additional 1% sodium chloride (w/w). Feeding of NaCl supplemented diet began immediately after determination of baseline serum calcium concentrations at time zero. Note that serum calcium concentrations became elevated after an interval of 24 hr. Data points shown represent a total of 5 or more independent determinations from a single representative experiment. Values at 24 hr and 72 hr are significantly ($p<0.05$) increased as compared to the value at zero time.

In contrast, the feeding of trout maintained in the water mixture of the present invention with the identical standard feed except with the addition of 1% NaCl (weight/weight) produces a significant increase in serum calcium concentrations within 24 hr (FIG. 17). This increase in the serum calcium concentrations of trout mimics the rise produced by transfer of trout into seawater (FIG. 17). This effect of dietary NaCl to increase serum calcium levels likely occurs because the fish is obligated to excrete this excess NaCl that it has ingested. Ingestion of this excess NaCl activates the fish's drinking behavior thereby causing it to ingest water mixture containing 3 mM calcium and thereby increases its body fluid calcium content via the intestinal absorption of calcium. Ingestion of 1% NaCl alone does not alter serum calcium concentrations. Thus, the serum calcium concentration of trout maintained in freshwater ($2.72+0.43$ n=6) was not altered significantly after consumption of feed containing 1% NaCl (w/w) for as long as 30 days ($2.37+0.25$ n=5). These data provide a demonstration that this protocol is necessary to achieve increase the serum calcium concentrations in anadromous fish.

Figure 18A:
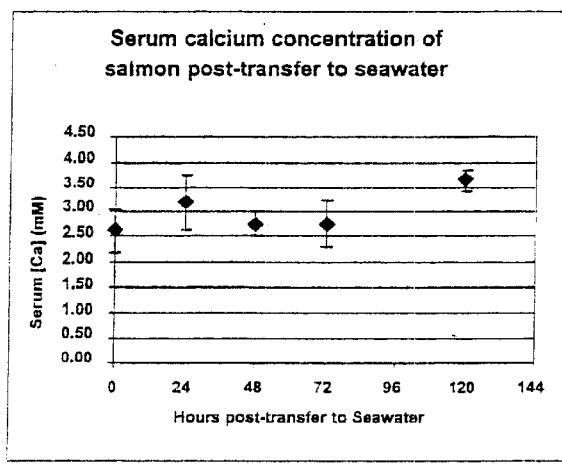
FIGS. 18A and 18B are graphical representations of alterations in serum calcium and sodium after seawater transfer of S1 Altantic salmon smolts.
Figure 18B:
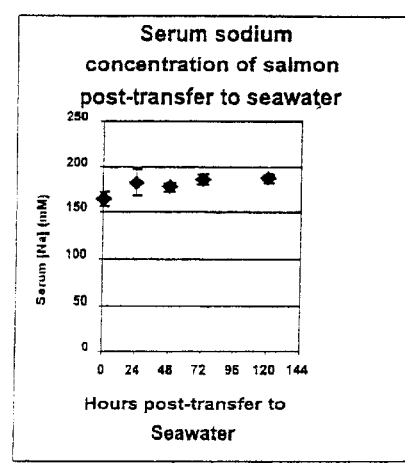

Transfer of Larger Atlantic Salmon Smolts Raised in Freshwater that Possess the Industry Standard "Critical Size" to Seawater Raises their Serum Calcium and Sodium Concentrations:

The mean serum calcium concentration increases by approximately 40% when trout are transferred from freshwater to seawater. The magnitude of this increase is associated with significant trout mortality (approximately 30–40%) due to osmoregulatory failure in these fish that are smaller than the "critical size" for trout. In contrast, the magnitude of increases in serum calcium concentrations is smaller (approximately 30% increase) when larger Atlantic salmon smolts that possess the critical size 60–70 gms are transferred to seawater (FIGS. 18A–B). During this same interval after seawater transfer, serum sodium concentrations in these same fish increase by approximately 17%. Data derived from both trout (FIG. 17) and salmon (FIGS. 18A–B) were only collected from fish that exhibited no visible signs of stress (i.e. stressed fish exhibit body discoloration, bizarre swimming behavior or markedly decreased activity levels) during this experiment.

Figures 19A, 19B:
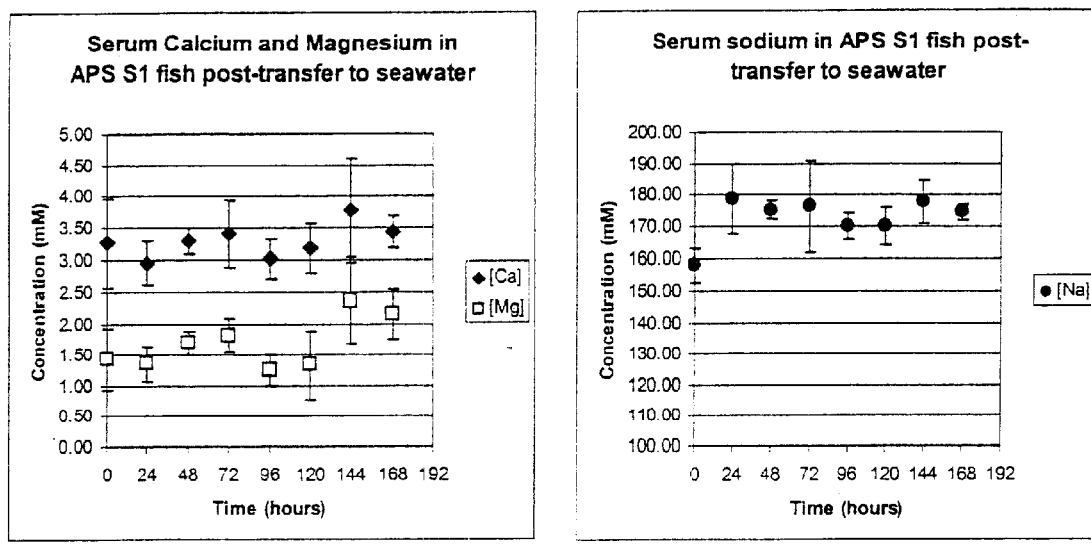
FIGS. 19A and B are graphical representations of serum calcium, magnesium and sodium levels (mM) over time from Atlantic Salmon S1 APS Process I treated fish. Each value displays the mean +/−S.D. of a minimum of 10 independent determination from this single representative experiment.

FIG. 18 shows alterations in serum calcium (FIG. 18A) and sodium (FIG. 18B) after seawater transfer of S1 Atlantic salmon smolt that possess the critical size as defined by standard present day practices. Each data point represents the mean ±S.D of 5–10 independent determinations FIGS. 19A–B show post seawater transfer values for serum calcium, magnesium and sodium obtained from a cohort of 80 S1 Atlantic salmon smolt identical to that shown in FIG. 18 after a total of 45 days of treatment with APS Process I (3 mM $Ca^{2+}$, 1 mM $Mg^{2+}$ in water) and 7% NaCl dietary supplement in food. Note that the initial serum calcium in fish exposed to APS Process I is slightly larger (2.5 vs 3.0 mM) and changes in serum concentrations of calcium and sodium are similar to those displayed in FIG. 18. Moreover, calcium and magnesium do not undergo dramatic increases during the initial 120 hr interval as these fish are transferred from calcium/magnesium water mixture to seawater. In contrast, the serum sodium concentration increases approximatley 12% (178.8 mM from 158.0 mM) within the first 24 hr.

Taken together, these data shown in FIGS. 16–19 demonstrate that increases in both the serum calcium and sodium occur after transfer of preadult anadromous fish from freshwater to seawater. Moreover, the overall expression of PVCR protein increases in specific cells involved in this osmoregulatory response such as intestine. Since PVCRs are capable of responding to alterations of both calcium and sodium within these concentrations ranges, these data indicate that a new "set point" for PVCR activity is established after transfer of fish to seawater.

The data shown in FIGS. 17–19 demonstrate that treatment of preadult anadromous fish with APS Process I causes increases in the serum calcium concentrations of the fish that mimic those produced by their transfer from freshwater to seawater. Exposure of the fish to the combination of calcium and magnesium in the water and NaCl in the feed causes increased calcium intake that mirrors the drinking of hypertonic seawater without the accompanying osmotic stress. Thus, the PVCRs in the APS Process I fish have been "preconditioned" by their exposure to calcium and magnesium and, as a result, the fish is more readily able to adapt to seawater when it is subsequently transferred to it.

Anadromous Fish Exhibiting Visible Symptoms of Stress After Transfer to Seawater Possess Elevated Serum Values of Calcium and/or Magnesium. The Inability of Fish to Excrete These Ions is the Major Cause for Their Death After Seawater Transfer:

When pre-adult anadromous fish are transferred to seawater either directly from freshwater or after exposure to the APS Process I, some portion of the total number of fish are often unable to adapt to the dramatic differences in osmolality and ionic composition between freshwater and seawater and die of resulting electrolyte imbalances. Observations that include tracking of fish that will ultimately expire within a short time interval (24–120 hr) after seawater transfer demonstrates that they begin to exhibit visible signs of high levels of stress including alterations in their normal light silver body coloration to a darker duskier hue as well as displaying of bizarre swimming behavior or markedly decreased activity levels 24–72 hr before their death.

Comparison of serum calcium, magnesium and sodium concentrations from control nonstressed fish vs fish exhibiting signs of high levels of stress show that serum ion concentrations in stressed fish are significantly higher as compared to control (Table 8).

TABLE 8

Comparison of serum concentrations of juvenile Atlantic salmon and trout in seawater judged by visual inspection as either nonstressed or stressed fish.

| | Serum Concentrations in mM | |
|---|---|---|
| | Calcium | Magnesium |
| Industry Standard Juvenile Trout | | |
| Nonstressed Fish | 4.03 ± 0.71 (n = 49) | Not Done |
| Stressed Fish | 4.58 ± 0.78** (n = 63) | Not Done |
| APS Treated Atlantic Salmon | | |
| Nonstressed Fish | 3.74 ± 0.52 | 2.40 ± 0.77 (n = 15) |
| Stressed fish | 3.97 ± 0.66 | 4.07 + 0.60** (n = 16) |

**$P < 0.01$

These signs of high stress are directly referable to abnormally elevated concentrations of calcium, magnesium and sodium ions within the body fluids of the fish. Thus, preadult anadromous fish that are unable to excrete excess divalent cations as well as process seawater to replace body water that is lost via osmosis die from the consequences of electrolyte imbalances. Anadromous fish below the critical size are not able to rapidly adapt to the new osmotic environment of seawater and die as a result.

Example 8

The Feed

There are two general methods to prepare feed for consumption by fish as part of APS Process I. These two processes involve either reformulation of feed or addition of a concentration solution for absorption by the feed followed by a top dressing for palatability. This disclosure describes the methodology to prepare feed using each of these 2 methods.

Methods:

Feed Manufacture for Salmon Experiments

To reformulate feed, the ingredients are as follows: Base Diet was made using the following ingredients and procedure: 30% Squid (liquefied in blender), 70% Corey Aquafeeds flounder diet (powderized in blender). Ingredients were blended into a semi moist "dough" ball. Other ingredients including NaCl or PVCR active compounds were blended into the base diet by weight according to what the experiment called for.

Moore Clark standard freshwater salmonid diet (sizes 1.2,1.5.2.0, 2.5, and 3.5 mm) can also be used. A top dressing was applied to the pellets such that top dressing is composed of 4% of the weight of the Base Diet. Top dressing is composed of 50% krill hydrolysate (Specialty Marine Products Ltd.) and 50% Menhaden fish oil. The top dressing is added for palatability and sealing of added ingredients.

Other ingredients can include NaCl, MgCl12, or CaCl12 that are added by weight to the base diet by weight.

Preparation of Feed Containing 7% (weight/weight) NaCl:

For the APS Process 1: Solid sodium chloride or NaCl apportioned at a ratio of 7% of the weight of the Moore Clark standard freshwater salmonid diet weight was added to a volume of tap water approximately 3–4 times the weight of NaCl. The mixture was heated to 60–70° C. with mixing via use of a magnetic stirring bar to dissolve salt. The NaCl solution was then poured into a hand held sprayer and applied to the Moore Clark standard freshwater salmonid diet that is tumbling inside of a 1.5 cubic meter motorized cement mixer. After absorption of the NaCl rich solution, the wetted Moore Clark standard freshwater salmonid diet is spread out thinly on window screening and placed in an enclosed rack system equipped with a fan and 1500 watt heater to expedite drying process. After drying for approximately 6 hr, the dried NaCl-rich pellets are returned to the cement mixer and a top dressing is applied. The feed is stored at room temperature until use.

Example 9

DNA and Putative Protein Sequences from Partial Genomic Clones of Polyvalent Cation Receptor Protein Amplified by PCR from the DNA of 8 Species of Anadromous Fish These data provide the partial genomic sequences derived from the PVCR gene in 8 species of anadromous fish. Each of these nucleotide sequences is unique and thus could be used as a unique probe to isolate the full-length cDNA from each species. Moreover, this DNA fragment could form the basis for a specific assay kit(s) for detection of PVCR expression in various tissues of these fish.

The PVCR has been isolated in several species of salmon, char and trout. Sequences of mammalian CaRs together with the nucleotide sequence of SKCaR (FIGS. 22A and 22B) were used to design degenerate olioonucleotide primers to highly conserved regions in the extracellular domain of polyvalent cation receptor proteins using standard methodologies (See GM Preston, Polymerase chain reaction with degenerate oligonucleotide primers to clone gene family members, Methods in Mol. Biol. Vol. 58 Edited by A. Harwood, Humana Press, pages 303–312, 1993). Using these primers, cDNA or genomic DNA from various fish species representing important commercial products are amplified using standard PCR methodology. Amplified bands are then purified by agarose gel electrophoresis and ligated into appropriate plasmid vector that is transformed into a bacterial strain. After growth in liquid media, vectors and inserts are purified using standard techniques, analyzed by restriction enzyme analysis and sequenced where appropriate. Using this methodology, nucleotide sequences were amplified.

To generate the data displayed in FIGS. 20 and 21, DNA was isolated from muscle samples of each of the species indicated using standard published techniques. DNA was then amplified using polymerase chain reaction (PCR) methodology including 2 degenerate PCR primers (DSK-F3 and DSK-R4; SEQ ID NO: 22 and 23). Amplified DNAs were then purified by agarose gel electrophoresis, subcloned into plasmid vectors, amplified, purified and sequenced using standard methods.

FIG. 20 shows an aligned genomic DNA sequences of 594 nucleotides for 8 anadromous fish species, each of which codes for an identical region of the PVCR protein. Note that each nucleotide sequence derived from each specific species is unique. However, alterations in the DNA sequences of these genes often occur at common specific nucleotides within each sequence of 594 nucleotides.

FIG. 21 shows aligned corresponding predicted protein sequences derived from genomic nucleotide sequences displayed in FIG. 20. Note that only 3 alterations in the amino acid sequence of this portion of the PVCR occur as a consequence of alterations in the nucleotide sequence as shown in FIG. 20. All of these changes (Ala to Val; Arg to Lys; and Cys to Tyr) are known as "conservative" substitutions of amino acids in that they preserve some combination of the relative size, charge and hydrophobicity of the peptide sequence.

All cited references, patents, and patent applications are incorporated herein by reference in their entirety. Also, companion patent application Ser. No. 09/687,373, entitled "Growing Marine Fish in Fresh Water" filed on Oct. 12, 2000; patent application Ser. No. 09/687,477, entitled "Methods for Raising Pre-adult Anadromous Fish," filed on Oct. 12, 2000; patent application Ser. No. 09/687,476, entitled "Methods for Raising Pre-adult Anadromous Fish," filed on October 12, 2000; Provisional Patent Application No. 60/240,392, entitled "Polyvalent Cation Sensing Receptor Proteins in Aquatic Species," filed on Oct. 12, 2000; Provisional Patent Application No. 60/240,003, entitled "Polyvalent Cation Sensing Receptor Proteins in Aquatic Species," filed on October 12, 2000, are all hereby incorporated by reference in their entirety. Additionally, application Ser. No. 09/162,021, filed on Sep. 28, 1998, International PCT application No. PCT/US97/05031, filed on Mar. 27, 1997, and application Ser. No. 08/622,738 filed Mar. 27, 1996, all entitled, "Polycation Sensing Receptor in Aquatic Species and Methods of Use Thereof" are all hereby incorporated by reference in their entirety.

While this invention has been particularly shown and described with references to preferred embodiments thereof, it will be understood by those skilled in the art that various changes can be made therein without departing from the scope of the invention encompassed by the appended claims.

What is claimed is:

1. A method of improving the raising of pre-adult anadromous fish, wherein the pre-adult anadromous fish are maintained in freshwater prior to transfer to seawater, comprising:
   a) adding magnesium and calcium to the freshwater in an amount sufficient to increase expression and/or sensitivity of at least one PVCR; and
   b) adding feed for fish consumption to the freshwater, wherein the feed contains an amount of NaCl sufficient to contribute to a significantly increased level of calcium and/or magnesium in serum of the pre-adult anadromous fish.

2. The method of claim 1, wherein the increased expression of at least one PVCR is maintained until the pre-adult anadromous fish are transferred to seawater.

3. The method of claim 2, wherein the calcium is added to the freshwater sufficient to bring the calcium concentration up to an amount between about 2.0 mM and about 10.0 mM.

4. The method of claim 3, wherein the magnesium is added to the freshwater sufficient to bring the magnesium concentration up to an amount between about 0.5 mM and about 10.0 mM.

5. The method of claim 4, wherein the feed contains at least about 1% NaCl by weight.

6. The method of claim 5, further including exposing the pre-adult anadromous fish to a photoperiod.

7. A method of preparing pre-adult anadromous fish for transfer from freshwater to seawater, comprising:
   a) adding calcium sufficient to bring the calcium concentration up to an amount between about 2.0 mM and about 10.0 mM to the freshwater;
   b) adding magnesium sufficient to bring the magnesium concentration up to an amount between about 0.5 mM and about 10.0 mM to the freshwater; and
   c) adding feed for fish consumption to the freshwater, wherein the feed contains at least about 1% NaCl by weight.

8. The method of claim 7, wherein the pre-adult anadromous fish are maintained in the freshwater having magnesium and calcium until the pre-adult anadromous fish are transferred to seawater.

9. The method of claim 8, wherein the feed contains between about 10,000 mg/kg and about 100,000 mg/kg of NaCl.

10. The method of claim 9, further including exposing the pre-adult anadromous fish to a photoperiod.

11. The method of claim 10, wherein the photoperiod is continuous.

12. The method of claim 11, wherein the photoperiod is at least about 12 hours in a 24 hour period.

13. A method of improving the raising of pre-adult salmon, wherein the pre-adult salmon are maintained in freshwater prior to transfer to seawater, comprising:
   a) adding magnesium and calcium to the freshwater in an amount sufficient to increase expression and/or sensitivity of at least one PVCR; and
   b) adding feed for fish consumption to the freshwater, wherein the feed contains an amount of NaCl sufficient to contribute to a significantly increased level of calcium and/or magnesium in serum of the salmon fish.

14. The method of claim 13, wherein the increased expression of at least one PVCR is maintained until the pre-adult salmon are transferred to seawater.

15. The method of claim 14, wherein the calcium is added to the freshwater sufficient to bring the calcium concentration up to an amount between about 2.0 mM and about 10.0 mM.

16. The method of claim 15, wherein the magnesium is added to the freshwater sufficient to bring the magnesium concentration up to an amount between about 0.5 mM and about 10.0 mM.

17. The method of claim 16, wherein the feed contains at least about 1% NaCl by weight.

18. The method of claim 17, further comprising exposing the pre-adult salmon to a photoperiod.

19. A method for preparing pre-adult salmon for transfer from freshwater to seawater, comprising:
   a) adding calcium sufficient to bring the calcium concentration up to an amount between about 2.0 mM and about 10.0 mM to the freshwater;
   b) adding magnesium sufficient to bring the magnesium concentration up to an amount between about 0.5 mM and about 10.0 mM to the freshwater; and
   c) adding feed for fish consumption to the freshwater, wherein the feed contains at least about 1% NaCl by weight.

20. The method of claim 19, wherein the calcium is added in the form of $CaCO_3$.

21. The method of claim 20, wherein the magnesium is added in the form of $MgCl_2$.

22. The method of claim 21, wherein the feed contains between about 10,000 mg/kg and about 100,000 mg/kg of NaCl.

23. The method of claim 22, wherein the pre-adult salmon are maintained in the freshwater having magnesium and calcium, and are fed said feed comprising NaCl, until the pre-adult salmon are transferred to seawater.

24. The method of claim 23, further including detecting the level of expression of at least one PVCR to determine whether the pre-adult salmon are ready for transfer to seawater.

25. A method of increasing food consumption of pre-adult anadromous fish, wherein the pre-adult anadromous fish are maintained in freshwater prior to transfer to seawater, comprising:
   a) subjecting the pre-adult anadromous fish to magnesium and calcium in an amount sufficient to increase expression and/or sensitivity of at least one PVCR; and
   b) adding feed for fish consumption to the freshwater, wherein the feed contains an amount of NaCl sufficient to contribute to a significantly increased level of calcium and/or magnesium in serum of the pre-adult anadromous fish.

26. A method of increasing food consumption of pre-adult anadromous fish after transfer to seawater, wherein the pre-adult anadromous fish are maintained in freshwater prior to transfer to seawater, comprising:

a) adding magnesium and calcium to the freshwater in an amount sufficient to increase expression and/or sensitivity of at least one PVCR; and b) adding feed for fish consumption to the freshwater, wherein the feed contains an amount of NaCl sufficient to contribute to a significantly increased level of calcium and/or magnesium in serum of the pre-adult anadromous fish; and c) transferring the pre-adult anadromous fish to seawater.

27. A method of increasing survival of pre-adult anadromous fish undergoing smoltification in freshwater, comprising:

a) introducing the pre-adult anadromous fish to freshwater having magnesium and calcium in an amount sufficient to increase expression and/or sensitivity of at least one PVCR; and b) adding feed for fish consumption to the freshwater, wherein the feed contains at least about 1% NaCl by weight; wherein the pre-adult anadromous fish are maintained in the freshwater sufficient to increase expression of at least one PVCR.

28. A method of preparing pre-adult anadromous parr for transfer from freshwater to seawater, comprising:

a) adding magnesium and calcium to the freshwater in an amount sufficient to increase expression and/or sensitivity of at least one PVCR; and b) adding feed for fish consumption to the freshwater, wherein the feed contains an amount of NaCl sufficient to contribute to a significantly increased level of calcium and/or magnesium in serum of the pre-adult anadromous parr; and c) transferring the pre-adult anadromous parr to seawater.

29. The method of claim 28, wherein the parr weighs between 10 grams and 30 grams upon transfer to seawater.

30. A method for reducing osmotic stress upon transfer of pre-adult anadromous fish from freshwater to seawater, comprising:

a) adding magnesium and calcium to the freshwater in an amount sufficient to increase expression and/or sensitivity of at least one PVCR; and b) adding feed for fish consumption to the freshwater, wherein the feed contains an amount of NaCl sufficient to contribute to a significantly increased level of calcium and/or magnesium in serum of the pre-adult anadromous fish; and c) transferring the pre-adult anadromous fish to seawater; wherein, once transferred to seawater, the pre-adult anadromous fish have decreased stress, as compared to pre-adult anadromous fish that are not subjected to steps a) and b).

31. A method of reducing mortality of pre-adult anadromous fish upon transfer from freshwater to seawater, comprising:

a) adding magnesium and calcium to the freshwater in an amount sufficient to increase expression and/or sensitivity of at least one PVCR; and b) adding feed for fish consumption to the freshwater, wherein the feed contains an amount of NaCl sufficient to contribute to a significantly increased level of calcium and/or magnesium in serum of the pre-adult anadromous fish; and c) transferring the pre-adult anadromous fish to seawater.

32. A method of improving feeding in pre-adult anadromous fish immediately after transfer from freshwater to seawater, comprising:

a) adding magnesium and calcium to the freshwater in an amount sufficient to increase expression and/or sensitivity of at least one PVCR; and b) adding feed for fish consumption to the freshwater, wherein the feed contains an amount of NaCl sufficient to contribute to a significantly increased level of calcium and/or magnesium in serum of the pre-adult anadromous fish; and c) transferring the pre-adult anadromous fish to seawater.

33. A method of transferring a pre-adult anadromous fish from freshwater to seawater having a temperature of about 14° C. to about 19° C., comprising:

a) adding magnesium and calcium to the freshwater in an amount sufficient to increase expression and/or sensitivity of at least one PVCR; and b) adding feed for fish consumption to the freshwater, wherein the feed contains an amount of NaCl sufficient to contribute to a significantly increased level of calcium and/or magnesium in serum of the pre-adult anadromous fish; and c) transferring the pre-adult anadromous fish to seawater.

34. A method of reducing an amount of time between generations of pre-adult anadromous fish, comprising:

a) maintaining pre-adult anadromous fish in a freshwater environment having magnesium and calcium in an amount sufficient to increase expression and/or sensitivity of at least one PVCR; and b) adding feed for fish consumption to the freshwater, wherein the feed contains an amount of NaCl sufficient to contribute to a significantly increased level of calcium and/or magnesium in serum of the pre-adult anadromous fish.

35. The method of claim 34, further including growing the pre-adult anadromous fish until the pre-adult anadromous fish are ready for breeding.

36. A method of preparing pre-adult anadromous fish for transfer from freshwater to seawater, comprising:

a) adding magnesium and calcium to the freshwater in an amount sufficient to increase expression and/or sensitivity of at least one PVCR in the brain of the pre-adult anadromous fish; and b) adding feed for fish consumption to the freshwater, wherein the feed contains an amount of NaCl sufficient to contribute to a significantly increased level of calcium and/or magnesium in serum of the pre-adult anadromous fish.

37. A method of preparing pre-adult anadromous char for transfer from freshwater to seawater, comprising:

a) adding magnesium and calcium to the freshwater in an amount sufficient to increase expression and/or sensitivity of at least one PVCR; and b) adding feed for fish consumption to the freshwater, wherein the feed contains an amount of NaCl sufficient to contribute to a significantly increased level of calcium and/or magnesium in serum of the pre-adult anadromous char.

38. A method of preparing pre-adult anadromous trout for transfer from freshwater to seawater, comprising:

a) adding magnesium and calcium to the freshwater in an amount sufficient to increase expression and/or sensitivity of at least one PVCR; and b) adding feed for fish consumption to the freshwater, wherein the feed contains an amount of NaCl sufficient to contribute to a significantly increased level of calcium and/or magnesium in serum of the pre-adult anadromous trout.

39. A kit for improving the raising of pre-adult anadromous fish, comprising:
 a) an aquatic mixture for providing an environment to improve the raising of pre-adult anadromous fish, wherein the aquatic mixture comprises:
  i) a calcium source that when added to freshwater, provides a concentration of between about 2.0 mM and about 10.0 mM; and
  ii) a magnesium source that when added to freshwater, provides a concentration of between about 0.5 mM and 10.0 mM; and
 b) an aquatic food composition containing a concentration of NaCl between about 10,000 mg/kg and about 100,000 mg/kg.

* * * * *

SEQUENCE LISTING

```
<160> NUMBER OF SEQ ID NOS: 23

<210> SEQ ID NO 1
<211> LENGTH: 594
<212> TYPE: DNA
<213> ORGANISM: Atlantic Salmon

<400> SEQUENCE: 1
cttggcatta tgctctgtgc tggggtatt cttgacagca ttcgtgatgg gagtgtttat      60
```

```
caaatttcgc aacaccccaa ttgttaaggc cacaaacaga gagctatcct acctcctcct      120
gttctcactc atctgctgtt tctccagttc cctcatcttc attggtgaac cccaggactg      180
gacatgccgt ctacgccagc ctgcattcgg gataagtttt gttctctgca tctcctgcat      240
cctggtaaaa actaaccgag tacttctagt gttcgaagcc aagatcccca ccagtctcca      300
tcgtaagtgg tgggggctaa acttgcagtt cctgttagtg ttcctgttca catttgtgca      360
agtgatgata tgtgtggtct ggctttacaa tgctcctccg gcgagctaca ggaaccatga      420
cattgatgag ataattttca ttacatgcaa tgagggctct atgatggcgc ttggcttcct      480
aattgggtac acatgcctgc tggcagccat atrcttcttc tttgcattta aatcacgaaa      540
actgccagag aactttactg aggctaagtt catcaccttc agcatgctca tctt           594
```

<210> SEQ ID NO 2
<211> LENGTH: 199
<212> TYPE: PRT
<213> ORGANISM: Atlantic Salmon
<220> FEATURE:
<223> OTHER INFORMATION: Xaa=any amino acid

<400> SEQUENCE: 2

```
Leu Ala Leu Cys Ser Val Leu Gly Val Phe Leu Thr Ala Phe Val Met
 1               5                  10                  15

Gly Val Phe Ile Lys Phe Arg Asn Thr Pro Ile Val Lys Ala Thr Asn
             20                  25                  30

Arg Glu Leu Ser Tyr Leu Leu Leu Phe Ser Leu Ile Cys Cys Phe Ser
         35                  40                  45

Ser Ser Leu Ile Phe Ile Gly Glu Pro Gln Asp Trp Thr Cys Arg Leu
     50                  55                  60

Arg Gln Pro Ala Phe Gly Ile Ser Phe Val Leu Cys Ile Ser Cys Ile
 65                  70                  75                  80

Leu Val Lys Thr Asn Arg Val Leu Leu Val Phe Glu Ala Lys Ile Pro
                 85                  90                  95

Thr Ser Leu His Arg Lys Trp Trp Gly Leu Asn Leu Gln Phe Leu Leu
            100                 105                 110

Val Phe Leu Phe Thr Phe Val Gln Val Met Ile Cys Val Val Trp Leu
        115                 120                 125

Tyr Asn Ala Pro Pro Ala Ser Tyr Arg Asn His Asp Ile Xaa Asp Glu
    130                 135                 140

Ile Ile Phe Ile Thr Cys Asn Glu Gly Ser Met Met Ala Leu Gly Phe
145                 150                 155                 160

Leu Ile Gly Tyr Thr Cys Leu Leu Ala Ala Ile Xaa Phe Phe Phe Ala
                165                 170                 175

Phe Lys Ser Arg Lys Leu Pro Glu Asn Phe Thr Glu Ala Lys Phe Ile
            180                 185                 190

Thr Phe Ser Met Leu Ile Phe
        195
```

<210> SEQ ID NO 3
<211> LENGTH: 594
<212> TYPE: DNA
<213> ORGANISM: Arctic Char

<400> SEQUENCE: 3

```
cttggcatta tgctctgtgc tgggggtatt cttgacagca ttcgtgatgg gagtgtttat       60
cagatttcgc aacaccccaa ttgttaaggc cacaaacaga gagctatcct acctcctcct      120
```

-continued

```
gttctcactc atctgctgtt tctccagctc cctcatcttc attggtgaac cccaggactg    180
gacatgccgt ctacgccagc ctgcattcgg gataagtttt gttctctgca tctcctgcat    240
cctggtcaaa actaaccgag tacttctagt gttcgaagcc aagatcccca ccagtctcca    300
tcgtaagtgg tgggggctaa acttgcagtt cctgttggtg ttcctgttca catttgtgca    360
agtgatgata tgtgtggtct ggctttacaa tgctcctccg gcgagctaca ggaaccatga    420
cattgatgag ataattttca ttacatgcaa tgagggctct atgatggcgc tcggcttcct    480
aattgggtac acatgcctgc tggcagccat atgcttcttc tttgcattta aatcacgaaa    540
actgccagag aactttaccg aggctaagtt catcaccttc agcatgctca tctt          594
```

<210> SEQ ID NO 4
<211> LENGTH: 199
<212> TYPE: PRT
<213> ORGANISM: Arctic Char
<220> FEATURE:
<223> OTHER INFORMATION: Xaa = Any amino acid
<400> SEQUENCE: 4

```
Leu Ala Leu Cys Ser Val Leu Gly Val Phe Leu Thr Ala Phe Val Met
 1               5                   10                  15

Gly Val Phe Ile Arg Phe Arg Asn Thr Pro Ile Val Lys Ala Thr Asn
             20                  25                  30

Arg Glu Leu Ser Tyr Leu Leu Leu Phe Ser Leu Ile Cys Cys Phe Ser
         35                  40                  45

Ser Ser Leu Ile Phe Ile Gly Glu Pro Gln Asp Trp Thr Cys Arg Leu
     50                  55                  60

Arg Gln Pro Ala Phe Gly Ile Ser Phe Val Leu Cys Ile Ser Cys Ile
 65                  70                  75                  80

Leu Val Lys Thr Asn Arg Val Leu Leu Val Phe Glu Ala Lys Ile Pro
                 85                  90                  95

Thr Ser Leu His Arg Lys Trp Trp Gly Leu Asn Leu Gln Phe Leu Leu
            100                 105                 110

Val Phe Leu Phe Thr Phe Val Gln Val Met Ile Cys Val Val Trp Leu
        115                 120                 125

Tyr Asn Ala Pro Pro Ala Ser Tyr Arg Asn His Asp Ile Xaa Asp Glu
    130                 135                 140

Ile Ile Phe Ile Thr Cys Asn Glu Gly Ser Met Met Ala Leu Gly Phe
145                 150                 155                 160

Leu Ile Gly Tyr Thr Cys Leu Leu Ala Ala Ile Cys Phe Phe Phe Ala
                165                 170                 175

Phe Lys Ser Arg Lys Leu Pro Glu Asn Phe Thr Glu Ala Lys Phe Ile
            180                 185                 190

Thr Phe Ser Met Leu Ile Phe
        195
```

<210> SEQ ID NO 5
<211> LENGTH: 593
<212> TYPE: DNA
<213> ORGANISM: Trout
<400> SEQUENCE: 5

```
ttggcattat gctctgtgct ggggtattc ttgacagtat tcgtgatggg agtgtttatc      60
agatttcgca acccccaat tgttaaggcc acaaacagag agctatccta cctcctcctg    120
ttctcactta tctgctgttt ctccagctcc ctcatcttca ttggtgaacc ccaggactgg    180
```

```
acatgccgtc tacgccagcc tgcattcggg ataagttttg ttctctgcat ctcctgcatc    240
ctggtcaaaa ctaaccgagt acttctagtg ttcgaagcaa agatcccac cagtctccat     300 cgtaagtggt gggggctaaa cttgcagttc ctgttggtgt tcctgttcac atttgtgcaa    360
gtgatgatat gtgtggtctg gctttacaat gctcctccgg cgagctacag gaaccatgac   420
attgatgaga tcattttcat tacatgcaat gagggctcta tgatggcgct tggcttccta   480
attgggtaca catgcctgct ggcagccata tgcttcttct ttgcatttaa atcacgaaaa    540
ctgccagaga attttaccga ggctaagttc atcaccttca gcatgctcat ctt          593

<210> SEQ ID NO 6
<211> LENGTH: 199
<212> TYPE: PRT
<213> ORGANISM: Trout
<220> FEATURE:
<223> OTHER INFORMATION: Xaa = Any amino acid

<400> SEQUENCE: 6
```

Leu Ala Leu Cys Ser Val Leu Gly Val Phe Leu Thr Val Phe Val Met
 1               5                  10                  15

Gly Val Phe Ile Arg Phe Arg Asn Thr Pro Ile Val Lys Ala Thr Asn
            20                  25                  30

Arg Glu Leu Ser Tyr Leu Leu Leu Phe Ser Leu Ile Cys Cys Phe Ser
        35                  40                  45

Ser Ser Leu Ile Phe Ile Gly Glu Pro Gln Asp Trp Thr Cys Arg Leu
    50                  55                  60

Arg Gln Pro Ala Phe Gly Ile Ser Phe Val Leu Cys Ile Ser Cys Ile
65                  70                  75                  80

Leu Val Lys Thr Asn Arg Val Leu Leu Val Phe Glu Ala Lys Ile Pro
                85                  90                  95

Thr Ser Leu His Arg Lys Trp Trp Gly Leu Asn Leu Gln Phe Leu Leu
            100                 105                 110

Val Phe Leu Phe Thr Phe Val Gln Val Met Ile Cys Val Val Trp Leu
        115                 120                 125

Tyr Asn Ala Pro Pro Ala Ser Tyr Arg Asn His Asp Ile Xaa Asp Glu
    130                 135                 140

Ile Ile Phe Ile Thr Cys Asn Glu Gly Ser Met Met Ala Leu Gly Phe
145                 150                 155                 160

Leu Ile Gly Tyr Thr Cys Leu Leu Ala Ala Ile Cys Phe Phe Phe Ala
                165                 170                 175

Phe Lys Ser Arg Lys Leu Pro Glu Asn Phe Thr Glu Ala Lys Phe Ile
            180                 185                 190

Thr Phe Ser Met Leu Ile Phe
        195

```
<210> SEQ ID NO 7
<211> LENGTH: 594
<212> TYPE: DNA
<213> ORGANISM: Chum Salmon

<400> SEQUENCE: 7
cttggcatta tgctctgtgc tgggggtatt cttgacagca ttcgtgatgg gagtgtttat    60
cagatttcgc aacaccccaa ttgttaaggc cacaaacaga gagctatcct acctcctcct   120
gttctcactt atctgctgtt tttccagctc cctcatcttc attggtgaac cccaggactg   180
gacatgccgt ctacgccagc ctgcattcgg gataagtttt gttctctgca tctcctgcat   240
```

```
cctggtcaaa actaaccgag tacttctagt gttcgaagca aagatcccca ccagtctcca      300
tcgtaagtgg tgggggctaa acttgcagtt cctgttggtg ttcctgttca catttgtgca      360
agtgatgata tgtgtggtct ggctttacaa tgctcctccg gcgagctaca ggaaccatga      420
cattgatgag atcattttca ttacatgcaa tgagggctct atgatggcgc ttggcttcct      480
aattgggtac acatgcctgc tggcagccat atgcttcttc tttgcattta aatcacgaaa      540
actgccagag aattttaccg aggctaagtt catcaccttc agcatgctca tctt           594
```

```
<210> SEQ ID NO 8
<211> LENGTH: 197
<212> TYPE: PRT
<213> ORGANISM: Chum Salmon

<400> SEQUENCE: 8
```

```
Leu Ala Leu Cys Ser Val Leu Gly Val Phe Leu Thr Ala Phe Val Met
 1               5                  10                  15

Gly Val Phe Ile Arg Phe Arg Asn Thr Pro Ile Val Lys Ala Thr Asn
             20                  25                  30

Arg Glu Leu Ser Tyr Leu Leu Leu Phe Ser Leu Ile Cys Cys Phe Ser
         35                  40                  45

Ser Ser Leu Ile Phe Ile Gly Glu Pro Gln Asp Trp Thr Cys Arg Leu
     50                  55                  60

Arg Gln Pro Ala Phe Gly Ile Ser Phe Val Leu Cys Ile Ser Cys Ile
 65                  70                  75                  80

Leu Val Lys Thr Asn Arg Val Leu Leu Val Phe Glu Ala Lys Ile Pro
                 85                  90                  95

Thr Ser Leu His Arg Lys Trp Trp Gly Leu Asn Leu Gln Phe Leu Leu
            100                 105                 110

Val Phe Leu Phe Thr Phe Val Gln Val Met Ile Cys Val Val Trp Leu
        115                 120                 125

Tyr Asn Ala Pro Pro Ala Ser Tyr Arg Asn His Asp Ile Asp Glu Ile
    130                 135                 140

Ile Phe Ile Thr Cys Asn Glu Gly Ser Met Met Ala Leu Gly Phe Leu
145                 150                 155                 160

Ile Gly Tyr Thr Cys Leu Leu Ala Ala Ile Cys Phe Phe Ala Phe
                165                 170                 175

Lys Ser Arg Lys Leu Pro Glu Asn Phe Thr Glu Ala Lys Phe Ile Thr
            180                 185                 190

Phe Ser Met Leu Ile
        195
```

```
<210> SEQ ID NO 9
<211> LENGTH: 594
<212> TYPE: DNA
<213> ORGANISM: Coho Salmon

<400> SEQUENCE: 9
```

```
cttggcatta tgctctgtgc tgggggtatt cttgacagya ttcgtgatgg gagtgtttat       60
cagatttcgc aacaccccaa ttgttaaggc cacaaacaga gagctatcct acctcctcct      120
gttctcactt atctgctgtt tctccagctc cctcatcttc attggtgaac cccaggactg      180
gacatgccgt ctacgccagc ctgcattcgg gataagtttt gttctctgca tctcctgcat      240
cctggtcaaa actaaccgag tacttctagt gttcgaagca aagatcccca ccagtctcca      300
tcgtaagtgg tgggggctaa acttgcagtt cctgttggtg ttcctgttca catttgtgca      360
```

```
agtgatgata tgtgtggtct ggctttacaa tgctcctccg gcgagctaca ggaaccatga    420
cattgatgag atcattttca ttacatgcaa tgagggctct atgatggcgc ttggcttcct    480
aattgggtac acatgcctgc tggcagccat atgcttcttc tttgcattta aatcacgaaa    540
actgccagag aattttacmg aggctaagtt catcaccttc agcatgctca tctt          594
```

```
<210> SEQ ID NO 10
<211> LENGTH: 197
<212> TYPE: PRT
<213> ORGANISM: Coho Salmon
<220> FEATURE:
<223> OTHER INFORMATION: Xaa= Any Amino Acid

<400> SEQUENCE: 10
```

Leu Ala Leu Cys Ser Val Leu Gly Val Phe Leu Thr Xaa Phe Val Met
1               5                   10                  15

Gly Val Phe Ile Arg Phe Arg Asn Thr Pro Ile Val Lys Ala Thr Asn
            20                  25                  30

Arg Glu Leu Ser Tyr Leu Leu Leu Phe Ser Leu Ile Cys Cys Phe Ser
        35                  40                  45

Ser Ser Leu Ile Phe Ile Gly Glu Pro Gln Asp Trp Thr Cys Arg Leu
    50                  55                  60

Arg Gln Pro Ala Phe Gly Ile Ser Phe Val Leu Cys Ile Ser Cys Ile
65                  70                  75                  80

Leu Val Lys Thr Asn Arg Val Leu Leu Val Phe Glu Ala Lys Ile Pro
                85                  90                  95

Thr Ser Leu His Arg Lys Trp Trp Gly Leu Asn Leu Gln Phe Leu Leu
            100                 105                 110

Val Phe Leu Phe Thr Phe Val Gln Val Met Ile Cys Val Val Trp Leu
        115                 120                 125

Tyr Asn Ala Pro Pro Ala Ser Tyr Arg Asn His Asp Ile Asp Glu Ile
    130                 135                 140

Ile Phe Ile Thr Cys Asn Glu Gly Ser Met Met Ala Leu Gly Phe Leu
145                 150                 155                 160

Ile Gly Tyr Thr Cys Leu Leu Ala Ala Ile Cys Phe Phe Ala Phe
                165                 170                 175

Lys Ser Arg Lys Leu Pro Glu Asn Phe Thr Glu Ala Lys Phe Ile Thr
            180                 185                 190

Phe Ser Met Leu Ile
            195

```
<210> SEQ ID NO 11
<211> LENGTH: 594
<212> TYPE: DNA
<213> ORGANISM: King Salmon

<400> SEQUENCE: 11
cttggcatta tgctctgtgc tgggggtatt cttgacagca ttcgtgatgg gagtgtttat     60
cagatttcgc aacaccccaa tgttaaggc cacaaacaga gagctatcct acctcctcct    120
gttctcactt atctgctgtt tttccagctc cctcatcttc attggtgaac ccaggactg    180 gacatgccgt ctacgccagc ctgcattcgg gataagtttt gttctctgca tctcctgcat    240
cctagtcaaa actaaccgag tacttctagt gttcgaagca aagatcccca ccagtctcca    300
tcgtaagtgg tgggggctaa acttgcagtt cctgttggtg ttcctgttca catttgtgca    360
agtgatgata tgtgtggtct ggctttacaa tgctcctcca gcgagctaca ggaatcatga    420
```

```
cattgatgag atcattttca ttacatgcaa tgagggctct atgatggcgc ttggcttcct    480
aattgggtac acgtgcctgc tggcagccat atgcttcttc tttgcattta aatcacgaaa    540
actgccagag aatttaccg aggctaagtt cattaccttc agcatgctca tctt           594
```

<210> SEQ ID NO 12
<211> LENGTH: 197
<212> TYPE: PRT
<213> ORGANISM: King Salmon

<400> SEQUENCE: 12

```
Leu Ala Leu Cys Ser Val Leu Gly Val Phe Leu Thr Ala Phe Val Met
 1               5                  10                  15

Gly Val Phe Ile Arg Phe Arg Asn Thr Pro Ile Val Lys Ala Thr Asn
                20                  25                  30

Arg Glu Leu Ser Tyr Leu Leu Leu Phe Ser Leu Ile Cys Cys Phe Ser
            35                  40                  45

Ser Ser Leu Ile Phe Ile Gly Glu Pro Gln Asp Trp Thr Cys Arg Leu
        50                  55                  60

Arg Gln Pro Ala Phe Gly Ile Ser Phe Val Leu Cys Ile Ser Cys Ile
 65                  70                  75                  80

Leu Val Lys Thr Asn Arg Val Leu Leu Val Phe Glu Ala Lys Ile Pro
                85                  90                  95

Thr Ser Leu His Arg Lys Trp Trp Gly Leu Asn Leu Gln Phe Leu Leu
            100                 105                 110

Val Phe Leu Phe Thr Phe Val Gln Val Met Ile Cys Val Val Trp Leu
        115                 120                 125

Tyr Asn Ala Pro Pro Ala Ser Tyr Arg Asn His Asp Ile Asp Glu Ile
    130                 135                 140

Ile Phe Ile Thr Cys Asn Glu Gly Ser Met Met Ala Leu Gly Phe Leu
145                 150                 155                 160

Ile Gly Tyr Thr Cys Leu Leu Ala Ala Ile Cys Phe Phe Ala Phe
                165                 170                 175

Lys Ser Arg Lys Leu Pro Glu Asn Phe Thr Glu Ala Lys Phe Ile Thr
            180                 185                 190

Phe Ser Met Leu Ile
        195
```

<210> SEQ ID NO 13
<211> LENGTH: 594
<212> TYPE: DNA
<213> ORGANISM: Pink Salmon

<400> SEQUENCE: 13

```
cttggcatta tgctctgtgc tgggggtatt cttgacagct tcgtgatgg gagtgtttat     60 cagatttcgc aacaccccaa ttgttaaggc cacaaacaga gagctatcct acctcctcct    120
gttctcactt atctgctgtt tttccagctc cctcatcttc attggtgaac ccaggactg     180 gacatgccgt ctacgccagc ctgcattcgg gataagtttt gttctctgca tctcctgcat    240
cctggtcaaa actaaccgag tacttctagt gttcgaagca agatcccca ccagtctcca     300 tcgtaagtgg tggggctaa acttgcagtt cctgttggtg ttcctgttca catttgtgca     360
agtgatgata tgtgtggtct ggctttacaa tgctcctccg gcgagctaca ggaaccatga    420
cattgatgag atcattttca ttacatgcaa tgagggctct atgatggcgc ttggcttcct    480
aattgggtac acatgcctgc tggcagccat atgcttcttc tttgcattta aatcacgaaa    540
```
actgccagag aattttactg aggctaagtt catcaccttc agcatgctca tctt        594

<210> SEQ ID NO 14
<211> LENGTH: 197
<212> TYPE: PRT
<213> ORGANISM: Pink Salmon

<400> SEQUENCE: 14

```
Leu Ala Leu Cys Ser Val Leu Gly Val Phe Leu Thr Ala Phe Val Met
 1               5                  10                  15

Gly Val Phe Ile Arg Phe Arg Asn Thr Pro Ile Val Lys Ala Thr Asn
                20                  25                  30

Arg Glu Leu Ser Tyr Leu Leu Leu Phe Ser Leu Ile Cys Cys Phe Ser
        35                  40                  45

Ser Ser Leu Ile Phe Ile Gly Glu Pro Gln Asp Trp Thr Cys Arg Leu
    50                  55                  60

Arg Gln Pro Ala Phe Gly Ile Ser Phe Val Leu Cys Ile Ser Cys Ile
65                  70                  75                  80

Leu Val Lys Thr Asn Arg Val Leu Leu Val Phe Glu Ala Lys Ile Pro
                85                  90                  95

Thr Ser Leu His Arg Lys Trp Trp Gly Leu Asn Leu Gln Phe Leu Leu
            100                 105                 110

Val Phe Leu Phe Thr Phe Val Gln Val Met Ile Cys Val Val Trp Leu
        115                 120                 125

Tyr Asn Ala Pro Pro Ala Ser Tyr Arg Asn His Asp Ile Asp Glu Ile
    130                 135                 140

Ile Phe Ile Thr Cys Asn Glu Gly Ser Met Met Ala Leu Gly Phe Leu
145                 150                 155                 160

Ile Gly Tyr Thr Cys Leu Leu Ala Ala Ile Cys Phe Phe Ala Phe
                165                 170                 175

Lys Ser Arg Lys Leu Pro Glu Asn Phe Thr Glu Ala Lys Phe Ile Thr
                180                 185                 190

Phe Ser Met Leu Ile
            195
```

<210> SEQ ID NO 15
<211> LENGTH: 594
<212> TYPE: DNA
<213> ORGANISM: Sockeye Salmon

<400> SEQUENCE: 15
cttggcatta tgctctgtgc tgggggtatt cttgacagca ttcgtgatgg gagtgtttat        60
cagatttcgc aacaccccaa tgttaaggc cacaaacaga gaactatcct acctcctcct        120
gttctcactt atctgctgtt tttccagctc cctcatcttc attggtgaac ccaggactg        180 gacatgccgt ctacgccagc ctgcattcgg gataagtttt gttctctgca tctcctgcat        240
cctagtcaaa actaaccgag tacttctagt gttcgaagca agatcccca ccagtctcca        300 tcgtaagtgg tggggctaa acttgcagtt cctgttggtg ttcctgttca catttgtgca        360
agtgatgata tgtgtggtct ggctttacaa tgctcctcca gcgagctaca ggaatcatga        420
cattgatgag ataatttca ttacatgcaa tgagggctct atgatggcgy ttggcttcct        480
aattgggtac acgtgcctgc tggcagccat atgcttcttc tttgcattta aatcacgaaa        540
actgccagag aattttacag aggctaagtt catcaccttc agcatgctca tctt        594

-continued

```
<210> SEQ ID NO 16
<211> LENGTH: 197
<212> TYPE: PRT
<213> ORGANISM: Sockeye Salmon
<220> FEATURE:
<223> OTHER INFORMATION: Xaa=Any Amino Acid

<400> SEQUENCE: 16

Leu Ala Leu Cys Ser Val Leu Gly Val Phe Leu Thr Ala Phe Val Met
  1               5                  10                  15

Gly Val Phe Ile Arg Phe Arg Asn Thr Pro Ile Val Lys Ala Thr Asn
             20                  25                  30

Arg Glu Leu Ser Tyr Leu Leu Leu Phe Ser Leu Ile Cys Cys Phe Ser
         35                  40                  45

Ser Ser Leu Ile Phe Ile Gly Glu Pro Gln Asp Trp Thr Cys Arg Leu
 50                  55                  60

Arg Gln Pro Ala Phe Gly Ile Ser Phe Val Leu Cys Ile Ser Cys Ile
 65                  70                  75                  80

Leu Val Lys Thr Asn Arg Val Leu Leu Val Phe Glu Ala Lys Ile Pro
                 85                  90                  95

Thr Ser Leu His Arg Lys Trp Trp Gly Leu Asn Leu Gln Phe Leu Leu
            100                 105                 110

Val Phe Leu Phe Thr Phe Val Gln Val Met Ile Cys Val Val Trp Leu
        115                 120                 125

Tyr Asn Ala Pro Pro Ala Ser Tyr Arg Asn His Asp Ile Asp Glu Ile
    130                 135                 140

Ile Phe Ile Thr Cys Asn Glu Gly Ser Met Met Ala Xaa Gly Phe Leu
145                 150                 155                 160

Ile Gly Tyr Thr Cys Leu Leu Ala Ala Ile Cys Phe Phe Phe Ala Phe
                165                 170                 175

Lys Ser Arg Lys Leu Pro Glu Asn Phe Thr Glu Ala Lys Phe Ile Thr
            180                 185                 190

Phe Ser Met Leu Ile
        195

<210> SEQ ID NO 17
<211> LENGTH: 4134
<212> TYPE: DNA
<213> ORGANISM: Dogfish Shark

<400> SEQUENCE: 17
aattccgttg ctgtcggttc agtccaagtc tcctccagtg caaaatgaga aatggtggtc      60
gccattacag gaacatgcac tacatctgtg ttaatgaaat attgtcagtt atctgaaggt     120
tattaaaatg tttctgcaag gatggcttca cgagaaatca attctgcacg ttttcccatt     180
gtcattgtat gaataactga ccaaagggat gtaacaaaat ggaacaaagc tgaggaccac     240
gttcacccct tcttggagca tacgatcaac cctgaaggag atggaagact tgaggaggaa     300
atggggattg atcttccagg agttctgctg taaagcgatc cctcaccatt acaaagataa     360
gcagaaatcc tccaggcatc ctctgtaaac gggctggcgt agtgtggctt ggtcaaggaa     420
cagagacagg gctgcacaat ggctcagctt cactgccaac tcttattctt gggatttaca     480
ctcctacagt cgtacaatgt ctcagggtat ggtccaaacc aaagggccca gaagaaagga     540
gacatcatac tgggaggtct cttcccaata cactttggag tagccgccaa ggatcaggac     600
ttaaaatcga gaccggaggc gacaaaatgt attcggtaca attttcgagg cttccgatgg     660
ctccaggcga tgatattcgc aattgaagag attaacaaca gtatgacttt cctgcccaat     720
```

-continued

```
atcaccctgg gatatcgcat atttgacacg tgtaacaccg tgtccaaggc gctagaggca    780
acactcagct ttgtggccca gaacaaaatc gactcgctga acttagatga gttctgtaac    840
tgctctgacc atatcccatc cacaatagca gtggtcgggg caaccgggtc aggaatctcc    900
acggctgtgg ccaatctatt gggattattt tacattccac aggtcagcta tgcctcctcg    960
agcaggctgc tcagcaacaa gaatgagtac aaggccttcc tgaggaccat ccccaatgat   1020
gagcaacagg ccacggccat ggccgagatc atcgagcact ccagtggaa ctgggtggga    1080 accctggcag ccgacgatga ctatggccgc ccaggcattg acaagttccg ggaggaggcc   1140
gttaagaggg acatctgtat tgacttcagt gagatgatct ctcagtacta cacccagaag   1200
cagttggagt tcatcgccga cgtcatccag aactcctcgg ccaaggtcat cgtggtcttc   1260
tccaatggcc ccgacctgga gccgctcatc caggagatag ttcggagaaa catcaccgat   1320
cggatctggc tggccagcga ggcttgggcc agctcttcgc tcattgccaa gccagagtac   1380
ttccacgtgg tcggcggcac catcggcttc gctctcaggg cggggcgtat cccagggttc   1440
aacaagttcc tgaaggaggt ccaccccagc aggtcctcgg acaatgggtt tgtcaaggag   1500
ttctgggagg agaccttcaa ctgctacttc accgagaaga ccctgacgca gctgaagaat   1560
tccaaggtgc cctcgcacgg accggcggct caaggggacg gctccaaggc ggggaactcc   1620
agacggacag ccctacgcca cccctgcact ggggaggaga acatcaccag cgtggagacc   1680
ccctacctgg attatacaca cctgaggatc tcctacaatg tatacgtggc cgtctactcc   1740
attgctcacg ccctgcaaga catccactct tgcaaacccg gcacgggcat ctttgcaaac   1800
ggatcttgtg cagatattaa aaagttgag gcctggcagg tcctcaacca tctgctgcat   1860
ctgaagttta ccaacagcat gggtgagcag gttgactttg acgatcaagg tgacctcaag   1920
gggaactaca ccattatcaa ctggcagctc tccgcagagg atgaatcggt gttgttccat   1980
gaggtgggca actacaacgc ctacgctaag cccagtgacc gactcaacat caacgaaaag   2040
aaaatcctct ggagtggctt ctccaaagtg gttcctttct ccaactgcag tcgagactgt   2100
gtgccgggca ccaggaaggg gatcatcgag ggggagccca cctgctgctt tgaatgcatg   2160
gcatgtgcag agggagagtt cagtgatgaa acgatgcaa gtgcgtgtac aaagtgcccg   2220
aatgatttct ggtcgaatga gaaccacacg tcgtgcatcg ccaaggagat cgagtacctg   2280
tcgtggacgg agcccttcgg gatcgctctg accatcttcg ccgtactggg catcctgatc   2340
acctccttcg tgctgggggt cttcatcaag ttcaggaaca ctcccatcgt gaaggccacc   2400
aaccgggagt tgtcctacct gctgctcttc tccctcatct gctgcttctc cagctcgctc   2460
atcttcatcg gcgagcccag ggactggacc tgtcggctcc gccaaccggc ctttggcatc   2520
agcttcgtcc tgtgcatctc ctgcatcctg gtgaagacca accgggtgct gctggtcttc   2580
gaggccaaga tccccaccag cctccaccgc aagtgggtgg gcctcaacct gcagttcctc   2640
ctggtcttcc tctgcatcct ggtgcaaatc gtcacctgca tcatctggct ctacaccgcg   2700
cctccctcca gctacaggaa ccatgagctg gaggacgagg tcatcttcat cacctgcgac   2760
gagggctcgc tcatggcgct gggcttcctc atcggctaca cctgcctcct cgccgccatc   2820
tgcttcttct tcgccttcaa gtcccgtaag ctgccggaga cttcaacga ggctaagttc    2880 atcaccttca gcatgttgat cttcttcatc gtctggatct ccttcatccc cgcctatgtc   2940
agcacctacg gcaagtttgt gtcggccgtg gaggtgattg ccatcctggc ctccagcttc   3000
gggctgctgg gctgcatttta cttcaacaag tgttacatca tcctgttcaa gccgtgccgt   3060
```

-continued

```
aacaccatcg aggaggtgcg ctgcagcacg gcggcccacg ccttcaaggt ggcggcccgg    3120
gccaccctcc ggcgcagcgc cgcgtctcgc aagcgctcca gcagcctgtg cggctccacc    3180
atctcctcgc ccgcctcgtc cacctgcggg ccgggcctca ccatggagat gcagcgctgc    3240
agcacgcaga aggtcagctt cggcagcggc accgtcaccc tgtcgctcag cttcgaggag    3300
acaggccgat acgccaccct cagccgcacg gcccgcagca ggaactcggc ggatggccgc    3360
agcggcgacg acctgccatc tagacaccac gaccagggcc cgcctcagaa atgcgagccc    3420
cagcccgcca cgatgcccg atacaaggcg gcgccgacca agggcaccct agagtcgccg      3480
ggcggcagca aggagcgccc cacaactatg gaggaaacct aatccaactc ctccatcaac    3540
cccaagaaca tcctccacgg cagcaccgtc gacaactgac atcaactcct aaccggtggc    3600
tgcccaacct ctcccctctc cggcactttg cgttttgctg aagattgcag catctgcagt    3660
tccttttatc cctgattttc tgacttggat atttactagt gtgcgatgga atatcacaac    3720
ataatgagtt gcacaattag gtgagcagag ttgtgtcaaa gtatctgaac tatctgaagt    3780
atctgaacta ctttattctc tcgaattgta ttacaaacat ttgaagtatt tttagtgaca    3840
ttatgttcta acattgtcaa gataatttgt tacaacatat aaggtaccac ctgaagcagt    3900
gactgagatt gccactgtga tgacagaact gttttataac atttatcatt gaaacctgga    3960
ttgcaacagg aatataatga ctgtaacaaa aaaattgttg attatcttaa aaatgcaaat    4020
tgtaatcaga tgtgtaaaat tggtaattac ttctgtacat taaatgcata tttcttgata    4080
aaaaaaaaaa aaaaaaaaaa aaaaaaaaaa aaaaaagcgg cccgacagca acgg          4134
```

<210> SEQ ID NO 18
<211> LENGTH: 199
<212> TYPE: PRT
<213> ORGANISM: Dogfish Shark

<400> SEQUENCE: 18

```
Leu Thr Ile Phe Ala Val Leu Gly Ile Leu Ile Thr Ser Phe Val Leu
  1               5                  10                  15

Gly Val Phe Ile Lys Phe Arg Asn Thr Pro Ile Val Lys Ala Thr Asn
             20                  25                  30

Arg Glu Leu Ser Tyr Leu Leu Leu Phe Ser Leu Ile Cys Cys Phe Ser
         35                  40                  45

Ser Ser Leu Ile Phe Ile Gly Glu Pro Arg Asp Trp Thr Cys Arg Leu
     50                  55                  60

Arg Gln Pro Ala Phe Gly Ile Ser Phe Val Leu Cys Ile Ser Cys Ile
 65                  70                  75                  80

Leu Val Lys Thr Asn Arg Val Leu Leu Val Phe Glu Ala Lys Ile Pro
                 85                  90                  95

Thr Ser Leu His Arg Lys Trp Val Gly Leu Asn Leu Gln Phe Leu Leu
            100                 105                 110

Val Phe Leu Cys Ile Leu Val Gln Ile Val Thr Cys Ile Ile Trp Leu
        115                 120                 125

Tyr Thr Ala Pro Pro Ser Ser Tyr Arg Asn His Glu Leu Glu Asp Glu
    130                 135                 140

Val Ile Phe Ile Thr Cys Asp Glu Gly Ser Leu Met Ala Leu Gly Phe
145                 150                 155                 160

Leu Ile Gly Tyr Thr Cys Leu Leu Ala Ala Ile Cys Phe Phe Phe Ala
                165                 170                 175

Phe Lys Ser Arg Lys Leu Pro Glu Asn Phe Asn Glu Ala Lys Phe Ile
            180                 185                 190
```

Thr Phe Ser Met Leu Ile Phe
        195

<210> SEQ ID NO 19
<211> LENGTH: 23
<212> TYPE: PRT
<213> ORGANISM: Artificial Sequence
<220> FEATURE:
<223> OTHER INFORMATION: 23-mer peptide

<400> SEQUENCE: 19

Ala Asp Asp Asp Tyr Gly Arg Pro Gly Ile Glu Lys Phe Arg Glu Glu
 1               5                  10                  15

Ala Glu Glu Arg Asp Ile Cys
            20

<210> SEQ ID NO 20
<211> LENGTH: 22
<212> TYPE: PRT
<213> ORGANISM: Artificial Sequence
<220> FEATURE:
<223> OTHER INFORMATION: peptide

<400> SEQUENCE: 20

Asp Asp Tyr Gly Arg Pro Gly Ile Glu Lys Phe Arg Glu Glu Ala Glu
 1               5                  10                  15

Glu Arg Asp Ile Cys Ile
            20

<210> SEQ ID NO 21
<211> LENGTH: 17
<212> TYPE: PRT
<213> ORGANISM: Artificial Sequence
<220> FEATURE:
<223> OTHER INFORMATION: peptide

<400> SEQUENCE: 21

Ala Arg Ser Arg Asn Ser Ala Asp Gly Arg Ser Gly Asp Asp Leu Pro
 1               5                  10                  15

Cys

<210> SEQ ID NO 22
<211> LENGTH: 28
<212> TYPE: DNA
<213> ORGANISM: Artificial Sequence
<220> FEATURE:
<223> OTHER INFORMATION: primer
<220> FEATURE:
<223> OTHER INFORMATION: K=T OR G
     Y=C OR T
     R=A OR G

<400> SEQUENCE: 22
tgtcktggac ggagccctty ggratcgc                                    28

<210> SEQ ID NO 23
<211> LENGTH: 31
<212> TYPE: DNA
<213> ORGANISM: Artificial Sequence
<220> FEATURE:
<223> OTHER INFORMATION: primer
<220> FEATURE:
<223> OTHER INFORMATION: K=T OR G
     Y=C OR T
     R=A OR G -continued

```
<400> SEQUENCE: 23
ggckggratg aargakatcc aracratgaa g                                      31
```